United States Patent
Popovic

(10) Patent No.: US 8,032,027 B2
(45) Date of Patent: Oct. 4, 2011

(54) WIDE FREE-SPECTRAL-RANGE, WIDELY TUNABLE AND HITLESS-SWITCHABLE OPTICAL CHANNEL ADD-DROP FILTERS

(75) Inventor: Milos Popovic, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 721 days.

(21) Appl. No.: 11/995,301

(22) PCT Filed: Jul. 25, 2006

(86) PCT No.: PCT/US2006/028848
§ 371 (c)(1),
(2), (4) Date: Aug. 13, 2008

(87) PCT Pub. No.: WO2007/014218
PCT Pub. Date: Feb. 1, 2007

(65) Prior Publication Data
US 2009/0220228 A1    Sep. 3, 2009

Related U.S. Application Data

(60) Provisional application No. 60/702,150, filed on Jul. 25, 2005, provisional application No. 60/727,964, filed on Oct. 18, 2005.

(51) Int. Cl.
*H04J 14/02* (2006.01)
(52) U.S. Cl. ............................................. 398/82; 398/85
(58) Field of Classification Search .................. 398/82, 398/83, 85, 147, 149, 154, 158, 161
See application file for complete search history.

(56) References Cited

U.S. PATENT DOCUMENTS
3,558,213 A    1/1971    Marcatili
(Continued)

FOREIGN PATENT DOCUMENTS
EP    0 646 832    4/1995
(Continued)

OTHER PUBLICATIONS

Altug et al., "Ultrafast Photonic Crystal Nanocavity Laser," Nature Physics 2 (2006) pp. 484-488.
(Continued)

*Primary Examiner* — Dalzid Singh
(74) *Attorney, Agent, or Firm* — Goodwin Procter LLP

(57) ABSTRACT

Optical devices extending the free spectral range and tunability of, and enabling hitless switching of, integrated optical filters suitable for add-drop filters. Devices include (i) a splitter device configured to split an input spectrum among a plurality of output ports, and a combiner device configured to combine at least a portion of the split input spectrum into a single output port, splitter and combiner having respective first and second input and output ports, and a respective transfer matrix, the matrix of the combiner being the diagonal transpose of that of the splitter; (ii) a first optical path coupling the first output port of the splitter and the first input port of the combiner; (iii) a second optical path coupling the second output port of the splitter and the second input port of the combiner, wherein the first and second optical paths are configured to introduce, at least at a wavelength of the input spectrum, a relative phase shift of π radians; and (iv) an optical filter coupled to at least one of the first and second optical paths.

25 Claims, 28 Drawing Sheets

U.S. PATENT DOCUMENTS

| | | | |
|---|---|---|---|
| 4,142,775 A | 3/1979 | Ramaswamy et al. | |
| 4,679,893 A | 7/1987 | Ramer | |
| 4,852,117 A | 7/1989 | Po | |
| 5,371,817 A | 12/1994 | Revelli, Jr. et al. | |
| 5,592,500 A | 1/1997 | Shirasaki | |
| 5,625,403 A | 4/1997 | Hazman et al. | |
| 5,900,637 A | 5/1999 | Smith | |
| 6,025,943 A | 2/2000 | Meekers et al. | |
| 6,052,495 A | 4/2000 | Little et al. | |
| 6,289,151 B1 | 9/2001 | Kazarinov et al. | |
| 6,442,311 B1 | 8/2002 | Barbarossa et al. | |
| 6,480,644 B1 | 11/2002 | MacDonald | |
| 6,529,277 B1 | 3/2003 | Weitekamp | |
| 6,563,631 B2 | 5/2003 | Delprat et al. | |
| 6,636,669 B1 | 10/2003 | Chin et al. | |
| 6,668,111 B2 | 12/2003 | Tapalian et al. | |
| 6,711,200 B1 | 3/2004 | Scherer et al. | |
| 6,839,482 B2 | 1/2005 | Margalit et al. | |
| 6,847,750 B1 | 1/2005 | Baumann et al. | |
| 6,947,632 B2 | 9/2005 | Fischer et al. | |
| 7,062,126 B2 | 6/2006 | Kersey et al. | |
| 7,102,469 B2 | 9/2006 | Kim et al. | |
| 7,110,632 B2 | 9/2006 | Abeles | |
| 7,123,800 B2 | 10/2006 | Kaplan | |
| 7,145,660 B2 | 12/2006 | Margalit et al. | |
| 7,149,378 B2 | 12/2006 | Baumann et al. | |
| 7,164,838 B2 | 1/2007 | Blauvelt et al. | |
| 7,215,848 B2 | 5/2007 | Tan et al. | |
| 7,292,751 B2 | 11/2007 | Popovic | |
| 7,339,724 B2 | 3/2008 | Hochberg et al. | |
| 7,450,811 B2 | 11/2008 | Hashimoto | |
| 7,539,375 B2 | 5/2009 | Popovic | |
| 7,583,874 B2 | 9/2009 | Rakich et al. | |
| 2001/0040681 A1 | 11/2001 | Paiam et al. | |
| 2001/0046344 A1 | 11/2001 | Hayashi et al. | |
| 2002/0076188 A1 | 6/2002 | Kimerling et al. | |
| 2002/0122648 A1 | 9/2002 | Mule' et al. | |
| 2002/0136481 A1 | 9/2002 | Mule' et al. | |
| 2002/0172466 A1 | 11/2002 | Baumann et al. | |
| 2003/0015770 A1 | 1/2003 | Talin et al. | |
| 2003/0128922 A1 | 7/2003 | Kolodziejski et al. | |
| 2003/0138178 A1 | 7/2003 | Kimerling et al. | |
| 2003/0156780 A1 | 8/2003 | Margalit et al. | |
| 2003/0174974 A1 | 9/2003 | Yasuda et al. | |
| 2003/0210860 A1 | 11/2003 | Margalit | |
| 2003/0219052 A1 | 11/2003 | Goodhue et al. | |
| 2004/0008942 A1 | 1/2004 | Scheuer et al. | |
| 2004/0008968 A1 | 1/2004 | Lee et al. | |
| 2004/0013355 A1 | 1/2004 | Margalit | |
| 2004/0056243 A1 | 3/2004 | Atanackovic et al. | |
| 2004/0114899 A1 | 6/2004 | Mattsson | |
| 2004/0161188 A1 | 8/2004 | Su et al. | |
| 2005/0036737 A1 | 2/2005 | Stuart | |
| 2005/0068602 A1 | 3/2005 | Tormen et al. | |
| 2005/0077526 A1 | 4/2005 | Shin et al. | |
| 2005/0147348 A1 | 7/2005 | Grunnet-Jepsen et al. | |
| 2005/0163418 A1 | 7/2005 | Wong et al. | |
| 2005/0259937 A1 | 11/2005 | Whaley et al. | |
| 2005/0275921 A1 | 12/2005 | Haus et al. | |
| 2006/0029325 A1 | 2/2006 | Fardi et al. | |
| 2006/0034569 A1 | 2/2006 | Shih et al. | |
| 2006/0083456 A1 | 4/2006 | Burns et al. | |
| 2006/0134535 A1 | 6/2006 | Porque | |
| 2006/0198566 A1 | 9/2006 | Watts | |
| 2006/0239614 A1 | 10/2006 | Montgomery et al. | |
| 2006/0274995 A1 | 12/2006 | Lee et al. | |
| 2006/0291791 A1 | 12/2006 | Hochberg et al. | |
| 2007/0035800 A1 | 2/2007 | Hochberg et al. | |
| 2007/0133934 A1 | 6/2007 | Blauvelt et al. | |
| 2007/0211992 A1 | 9/2007 | chu et al. | |
| 2007/0230867 A1 | 10/2007 | Chen et al. | |
| 2007/0253663 A1 | 11/2007 | Keyser et al. | |
| 2008/0002992 A1 | 1/2008 | Hochberg et al. | |
| 2008/0013876 A1 | 1/2008 | Gill et al. | |
| 2008/0014534 A1 | 1/2008 | Barwicz et al. | |
| 2008/0044184 A1 | 2/2008 | Popovic | |
| 2008/0166095 A1 | 7/2008 | Popovic et al. | |
| 2008/0199123 A1 | 8/2008 | Pan et al. | |
| 2008/0266639 A1 | 10/2008 | Melloni et al. | |
| 2009/0022445 A1 | 1/2009 | Hochberg et al. | |
| 2009/0028567 A1* | 1/2009 | Socci et al. | 398/85 |
| 2009/0032805 A1 | 2/2009 | Ty Tan et al. | |
| 2009/0142019 A1 | 6/2009 | Popovic | |
| 2009/0239323 A1 | 9/2009 | Tan et al. | |
| 2009/0256136 A1 | 10/2009 | Tan et al. | |
| 2009/0290835 A1 | 11/2009 | Popovic | |
| 2009/0314763 A1* | 12/2009 | Chu et al. | 219/476 |
| 2010/0002994 A1 | 1/2010 | Baehr-Jones et al. | |
| 2010/0158429 A1 | 6/2010 | Popovic | |
| 2010/0209038 A1 | 8/2010 | Popovic et al. | |
| 2010/0303122 A1 | 12/2010 | Popovic | |
| 2011/0026879 A1 | 2/2011 | Popovic et al. | |

FOREIGN PATENT DOCUMENTS

| | | |
|---|---|---|
| EP | 0 909 963 | 4/1999 |
| EP | 1024378 A2 | 8/2000 |
| EP | 1 241 497 | 9/2002 |
| EP | 1717616 A1 | 11/2006 |
| EP | 1 785 771 | 5/2007 |
| JP | 2001-194160 A | 7/2001 |
| WO | WO-85/01123 | 3/1985 |
| WO | WO-00/50938 A1 | 8/2000 |
| WO | WO-01/23955 A2 | 4/2001 |
| WO | WO-01/55814 A2 | 8/2001 |
| WO | WO-01/88580 | 11/2001 |
| WO | WO-01/96913 A1 | 12/2001 |
| WO | WO-02/17004 | 2/2002 |
| WO | WO-02/063389 | 8/2002 |
| WO | WO-02/101421 A2 | 12/2002 |
| WO | WO-03/036841 | 5/2003 |
| WO | WO-03/043247 A2 | 5/2003 |
| WO | WO-2005/010618 | 2/2005 |
| WO | WO-2005/104147 | 11/2005 |
| WO | WO-2006/025760 | 3/2006 |
| WO | WO-2006/076585 A2 | 7/2006 |
| WO | WO-2007/086888 A2 | 8/2007 |

OTHER PUBLICATIONS

Badolato et al., "Deterministic Coupling of Single Quantum Dots to Single Nanocavity Modes," Science 308 (2005) pp. 1158-1161.

Baehr-Jones et al., "High-Q Ring Resonators in Thin Silicon-on-Insulator," 85 Appl. Phys. Lett. 16 (Oct. 2004) pp. 3346-3347.

Barwicz, "3D analysis of scattering losses due to sidewall roughness in microphotonic waveguides: high index-contrast," 2005 Conf. on Lasers and Electro-Optics (CLEO), vol. 2, pp. 1333-1335.

Becker et al., "Optical Properties of Semiconductors. III. Infra-red Transmission of Silicon," 76 Physical Rev. A, pp. 1531-1532 (1949).

Bogaerts et al., "Low-loss, low-cross-talk crossings for silicon-on-insulator nanophotonic waveguides," 32 Optics Letters 19, pp. 2801-2803 (1995).

Bozhevolnyi et al., "Channel Plasmon Subwavelength Waveguide Components Including Interferometers and Ring Resonators," Nature 440 (2006) pp. 508-511.

Bustillo et al., "Surface Micromachining for Microelectromechanical Systems," Proc. of the IEEE 86 (1998) pp. 1552-1574.

Chan et al., "Single-mode and Polarization-independent Silicon-on-insulator waveguides with Small Cross Section," 23 J. Lightwave Tech. 6 (Jun. 2005) pp. 2103-2111.

Chen et al., "Low-loss multimode-interference-based crossings for Silicon Wire Waveguides," 18 IEEE Photonics Letters 21, pp. 2260-2262 (2006).

Chuang, S.L., *Physics of Optoelectronic Devices*, (Wiley, NY, 1995).

Daldosso et al., "Fabrication and Optical Characterization of thin two-dimensional $Si_3N_4$ Waveguides," Mat. Sci. in Semicond. Proc. 7, (2004) pp. 453-458.

Daldosso et al., "Comparison Among Various $Si_3N_4$ Waveguide Geometries Grown within a CMOS Fabrication Pilot Line," 22 J. Lightwave Tech. 7 (Jul. 2004) pp. 1734-1740.

Dumon et al., "Low-loss photonic wires and compact ring resonators in silicon-on-insulator," 5450 Proc. SPIE 1, pp. 360-368 (2004).

Eichenfield et al., "Actuation of Micro-optomechanical Systems via Cavity-enhanced Optical Dipole Forces," 1 Nature Photonics 7, pp. 416-422 (2007).

Examination Report in European Patent Application No. 04786154.7, mailed Jul. 16, 2008.
Guo et al., "Characterization of $Si_3N_4/SiO_2$ Planar Lightwave Circuits and Ring Resonators," Proc. of SPIE, vol. 5350 (2004) pp. 13-22.
Guo et al., "High-Q Microring Resonator for Biochemical Sensors," 5728 Proc. SPIE, pp. 83-92 (2005).
Gritsenko et al., "Short-range order in non-stoichiometric amorphous silicon oxynitride and silicon-rich nitride," 297 J. Non-Crystalline Solids 1, pp. 96-101 (Jan. 2002).
Haus, H.A. *Waves and Fields in Optoelectronics*, (Prentice-Hall, Englewood Cliffs, NJ, 1984).
In et al., "Origami Fabrication of Nanostructured, Three-dimensional Devices: Electrochemical Capacitors with Carbon Electrodes," Appl. Phys. Lett. 88 (2006) 83104.
International Search Report & Written Opinion for PCT/US2007/026513, mailed Jun. 19, 2008.
International Search Report & Written Opinion for PCT/US2008/082054, mailed Mar. 18, 2009.
International Search Report & Written Opinion for PCT/US2005/043762, mailed Jun. 19, 2008.
International Search Report & Written Opinion for PCT/US2007/015740, dated Feb. 18, 2008.
Jackson, J.D., *Classical Electrodynamics* (Wiley, NY, 1999).
Johnson et al., "Perturbation Theory for Maxwell's Equations with Shifting Boundaries," Phys. Rev. E, 65, 066611 (2002).
Kippenberg et al., "Analysis of Radiation-pressure Induced Mechanical Oscillation of an Optical Microcavity," Phys. Rev. Lett. 95 (2005) 033901.
Little et al., "Very High-order Microring Resonator Filters for WDM Applications," 16 IEEE Photonics Tech. Lett. 10 (Oct. 2004) pp. 2263-2265.
Liu et al., "Low-loss waveguide crossing using a multimode interference structure," 241 Optics Communications 1-3, pp. 99-104 (2004).
Maboudian et al., "Critical Review: Adhesion in Surface Micromechanical Structures," J. Vac. Sci. Tech. B, 15 (1997).
Madsen et al., Optical Filter Design and Analysis: A Signal Processing Approach, (Wiley, NY, 1999).
Melchiorri et al., "Propogation Losses of Silicon Nitride Waveguides in the Near Infrared Range," Appl. Phys. Lett. 86, 121111 (2005).
Mizrahi et al., "Two Slab Optical Spring," Optics Lett. 32 (2007) pp. 692-694.
Mizrahi et al., "Mirror Manipulation by Attractive and Repulsive Forces of Guided Waves," Opt. Express 13 (2005) pp. 9804-9811.
Nichol et al., "Thin Membrane Self-alignment using Nanomagnets for Three-dimensional Nanomanufacturing," J. Vac. Sci. Tech B (Microelectronics & Nanometer Structures) 24 (2006) pp. 3128-3132.
Nichols et al., "A Preliminary Communication on the Pressure of Heat and Light Radiation," Phys. Rev. 13 (1901) pp. 307-320.
Nielson et al., "Integrated Wavelength-selective Optical MEMS Switching using Ring Resonator Filters," IEEE Photonics Tech. Lett. 17 (2005) pp. 1190-1192.
Nielson, G.N., "Micro-opto-mechanical Switching and Tuning for Integrated Optical Systems," Ph.D. Thesis, Massachusetts Institute of Technology (2004).
Notomi et al., "Optomechanical Wavelength and Energy Conversion in High-Q Double-layer Cavities of Photonic Crystal Slabs," Phys. Rev. Lett. 97 (2006) 023903.
Okamoto, K., *Fundamentals of Optical Waveguides*, (Elsevier Academic Press, MA, 2006).
Partial International Search Report for International Application No. PCT/US2008/080749, mailed Mar. 24, 2009.
Philipp et al., "Amorphous Silicon Rich Silicon Nitride Optical Waveguides for High Density Integrated Optics," 40 IEEE Electronics Letters 7, pp. 419-420. (Apr. 2004).
Popovic et al., "Multistage High-Order Microring-Resonator add-drop Filters," 31 Optics Lett. 17 (Sep. 2006) pp. 2571-2573.
Popovic et al., "High-index-contrast, Wide-FSR Microring-Resonator Filter Design and Realization with Frequency-shift Compensation," *in* Optical Fiber Communication Conf., Tech. Dig. (2005) Paper OFK1, vol. 5, pp. 213-215.

Popovic, M., "Complex-frequency Leaky Mode Computations using PML Boundary Layers for Dielectric Resonant Structures," Proc. of Integ. Photonics Res. (Jun. 2003).
Popovic, "Air Trenches for Dense Silica Integrated Optics," MS Thesis, Massachusetts Institute of Technology, Dept. of Electrical Engineering & Computer Science, Feb. 2002, p. 53.
Popovic, "Theory and Design of High-Index-Contrast Microphotonic Circuits," Ph.D. Thesis, Massachusetts Institute of Technology, Dept. of Electrical Engineering & Computer Science, Feb. 2008.
Povinelli et al., "Evanescent-wave Bonding Between Optical Waveguides," Optical Lett. 30 (2005) pp. 3042-3044.
Povinelli et al., "High-Q Enhancement of Attractive and Repulsive Optical Forces between Coupled Whispering-gallery-mode Resonators," Opt. Express 13 (2005) pp. 8286-8295.
Povinelli et al., "Enhancement mechanisms for optical forces in integrated optics," 6326 Proc. of SPIE Optical Trapping & Optical Manip. III 15, (2006).
Qi et al., "A Three-dimensional Optical Photonic Crystal with Designed Point Defects," Nature 429 (2004) pp. 538-542.
Rakich et al., "Trapping, corraling and spectral bonding of optical resonances through optically induced potentials," 1 Nature Photonics 11, pp. 658-665 (2007).
Rakich et al., "Ultrawide Tuning of Photonic Microcavities via Evanescent Field Perturbation," Optics Lett. 31 (2006) pp. 1241-1243.
Rakich et al., "Cavity-Trapping via Optical-forces in Integrated Photonics," Massachusetts Institute of Technology, (Jul. 2004).
Rakich et al., "Achieving Centimeter-scale supercollimation in a Large-area Two-dimensional Photonic Crystal," Nature Materials 5 (2006) pp. 93-96.
Sarid, D., Scanning Force Microscopy with Applications to Electric, Magnetic, and Atomi Forces, (Oxford University Press, NY, 1994).
Saynatjoki et al., "High-index-contrast Optical Waveguides on Silicon," 2 pages, (Jun. 2005).
Song et al., "Ultra-high-Q Photonic Double-heterostructure Nanocavity," Nature Materials 4 (2005) pp. 207-210.
Spector et al., "Hybrid multi-mode/single-mode Waveguides for Low Loss," Massachusetts Institute of Technology, 3 pages, (Jun. 1998).
Srinivasan et al., "Alkyltrichlorosilane-based Self-assembled Monolayer Films for Stiction Reduction in Silicon Micromachines," J. of Microelectromechanical Sys. 7 (1998) pp. 252-260.
Tang et al., Highly efficient optical phase modulator in SOI waveguides, 31 Electronics Letters 6, pp. 451-452 (1995).
Van Spengen et al., "A Physical Model to Predict Stiction in MEMS," J. of Micromechanics & Microengineering 12 (2002) pp. 702-713.
Xu et al., "Micrometre-scale silicon electro-optic modulator," Nature, vol. 435, pp. 325-327 (2005).
International Preliminary Report on Patentability and Written Opinion for PCT/US2006/028848, mailed Feb. 7, 2008.
International Search Report for Application No. PCT/US06/28848 mailed Feb. 16, 2007.
Kogelnik et al., "Switched Directional Couplers with Alternating $\Delta\beta$," *IEE Journal of Quantum Electronics*, (1976) vol. 12, No. 7 pp. 396-401.
Korotky, "Three-Space Representation of Phase-Mismatch Switching in Coupled Two-State Optical System," *IEEE Journal of Quantum Electronics*, (1986) vol. 22, No. 6 pp. 952-958.
Madsen et al., "A Multi-port Add/Drop Router Using UV-induced Gratings in Planar Waveguides," *Lucent Technologies*, pp. 104-106, (Jun. 1999).
Oda et al., "A Wide-FSR Waveguide Double-Ring Resonator for Optical FDM Transmission Systems," *Journal of Lightwave Technology*, (1991) vol. 9, No. 6 pp. 728-736.
Popovic et al., "General Approach to Hitless Switching and FSR Extension Resonators in Integrated Photonic Circuits," (2006) Paper OW166.
Scotti et al., "A Hitless Reconfigurable Add-Drop Multiplexer for WDM Networks Utilizing Planar Waveguides, Thermo-Optic Switches and UV-Induced Gratings," OFC 98 *Technical Digest*, (1998) pp. 142-143.
Tormen, "Passive Optical Integrated Components for Telecommunication," Universite De Nice-Sophia Antipolis (2003) 196 pages.

Yanagase et al., "Box-Like Filter Response and Expansion of FSR by a Vertically Triple Coupled Microring Resonator Filter," *Journal of Lightwave Technology*, (2002) vol. 20, No. 8 pp. 1525-1529.
Barbarossa et al., "Novel Double-Ring Optical-Guided-Wave Vernier Resonator," 144 IEE Proc.-Optoelectron. 4, pp. 203-208 (Aug. 1997).
Barbarossa et al., "Theoretical Analysis of Triple-Coupler Ring-Based Optical Guided-Wave Resonator," 13 J. Lightwave Tech. 2, pp. 148-157 (Feb. 1995).
Barbarossa et al., "Triple-Coupler Ring-Based Optical Guided-Wave Resonator," 30 IEEE Electronics Lett. 2, pp. 131-133 (Jan. 20, 1994).
Barwicz et al., "Polarization-transparent microphotonic devices in the Strong Confinement Limit," Nature Photonics 1, pp. 57-60 (Jan. 2007).
Batten et al., "Building Manycore Processor-to-DRAM Networks with Monolithic CMOS Si Photonics," IEEE Micro, p. 8-21 (Jul. 2009).
Bethe, "Theory of Diffraction by Small Holes," 66 Phys. Rev. 7-8, pp. 163-182 (Oct. 1944).
Campbell et al., "GaAs Electro-Optic Directional-coupler switch," 27 Applied Physics Lett. 4, pp. 202-205 (Aug. 1975).
Chremmos et al., "Properties of Regular Polygons of Coupled Microring Resonators," 46 Applied Optics Optical Society of America 31, pp. 7730-7738 (Nov. 1, 2007).
Darmawan et al., "Nested Ring Mach-Zender Interferometer," 15 Optics Express Opt. Soc. America 2, pp. 437-448 (Jan. 2001).
DeVaux et al., "High-speed tandem of MQW modulators for coded pulse generation with 14-DB fiber-to-fiber gain," 8 IEEE Photonics Tech. Lett. 2, pp. 218-220 (Feb. 1996).
Doerr et al., "Wavelength Add-Drop Node Using Silica Waveguide Integration," 22 J. Lightwave Tech. 12, pp. 2755-2762 (Dec. 2004).
Domash et al., "Tunable and Switchable Multiple-Cavity Thin Film Filters," 22 J. Lightwave Tech. 1, pp. 126-135 (Jan. 2004).
Espinola et al., "Fast and Low-Power Thermooptic Switch on Thin Silicon-on-Insulator," 15 IEEE Photon. Tech. Lett. 10, pp. 1366-1368 (2003).
Fan et al., "Theoretical Analysis of Channel Drop Tunneling Processes," 59 Phys. Rev. B 24, pp. 15882-15892 (Jun. 15, 1999).
Findakly et al., "On the Crosstalk of Reversed-$\Delta\beta$ Durectional Coupler Switches," 6 J. of Lightwave Tech. 1, pp. 36-40 (Jan. 1988).
Geuzebroek et al., "Thermally Tuneable, Wide FSR Switch based on Micro-ring Resonators," Proc. Symp. IEEE/LEOS Benelux Chapter, pp. 155-158 (2002).
Gheorma et al., IEEE Photon. Tech. Lett. 14, 795 (2002).
Goebuchi et al., "Fast and Stable Wavelength-Selective Switch Using Double-Series Coupled Dielectric Microring Resonator," 18 IEEE Photonics Tech. Lett. 3, pp. 538-540 (Feb. 1, 2006).
Green et al., Optics Express 15, 17264 (2007).
Green et al., Optics Express 15, 17106 (2007).
Gunn, "CMOS Photonics for High-Speed Interconnects," IEEE Micro 26 (2), pp. 58-66 (Mar./Apr. 2006).
Gupta et al., Conf. on Lasers and Electro-Optics (CLEO), p. paper CTuNN5 (2008).
Haus et al., "Elimination of Cross Talk in Optical Directional Couplers," 46 Applied Physics Lett. 1, pp. 1-3 (Jan. 1, 1985).
Haus et al., "Broadband Hitless Bypass Switch for Integrated Photonic Circuits," 18 IEEE Photonics Tech. Lett. 10, pp. 1137-1139 (May 15, 2006).
Holzwarth et al., "High Speed analog-to-digital conversion with silicon photonics," in Proc. SPIE 7220, 72200B (2009).
International Preliminary Report on Patentability in International Patent Application No. PCT/US2008/003957, dated Sep. 29, 2009 (11 pages).
International Preliminary Report on Patentability for PCT/US2009/041668, mailed Nov. 11, 2010 (7 pages).
International Search Report & Written Opinion for PCT/US2009/041668, mailed Sep. 11, 2009 (14 pages).
International Search Report & Written Opinion for PCT/US2010/036630, mailed Sep. 15, 2010, 12 pages.
International Search Report & Written Opinion for International Patent Application No. PCT/US2007/018207, mailed Jul. 29, 2008 (13 pages).
International Search Report & Written Opinion for PCT/US2008/00330, mailed Oct. 14, 2008.
International Search Report & Written Opinion for PCT/US2009/066537, mailed Apr. 16, 2010 (17 pages).
Kelly et al., "Monolithic Suspended Optical Waveguides for InP MEMS," 16 IEEE Photonics Tech. Letters 5, pp. 1298-1300 (2004).
Khan et al., "Mode-Coupling Analysis of Multipole Symmetric Resonant Add/Drop Filters," 35 IEEE J. Of Quantum Elec. 10, pp. 1451-1460 (Oct. 1999).
Khurgin et al., "Expanding the Bandwidth of Slow-Light Photonic Devices Based on Coupled Resonators," 30 Optics Lett. 5, pp. 513-515 (Mar. 1, 2005).
Kyle et al., "High-Speed all-optical modulation using polycrystalline silicon microring resonators," 92 Appl. Phys. Lett. 15 (Apr. 15, 2008).
Lee et al., "MEMS-Actuated Microdisk Resonators with Variable Power Coupling Ratios," 17 IEEE Photonics Tech. Lett. 5, pp. 1034-1036 (May 2005).
Lee et al., "Tunable Coupling Regimes of Silicon Microdisk Resonators using MEMS Actuators," 14 Optics Express 11, pp. 4703-4712 (May 29, 2006).
Li et al., Optics Express 16, 13342 (2008).
Little et al., "Filter Synthesis for Periodically Coupled Microring Resonators," 25 Optics Lett. 5, pp. 344-346 (Mar. 1, 2000).
Little et al., "Microring Resonator Channel Dropping Filters," J. Lightwave Tech. 15, pp. 998-1005 (1997).
Little et al., "Wavelength Switching and Routing using Absorption and Resonance," 10 IEEE Photonics Tech. Lett. 6, pp. 816-818 (Jun. 1998).
Madsen, "Efficient Architectures for Exactly Realizing Optical Filters with Optimum Bandpass Designs," 10 IEEE Photonics Tech. Lett. 8, pp. 1136-1138 (Aug. 1998).
Madsen et al., "Hitless Reconfigurable Add/Drop Multiplexers using Bragg Gratings in Planar Waveguides," OSA TOPS, v. 29, WDM Components, pp. 54-60.
Manolatou et al., "High-Density Integrated Optics," 17 J. Lightwave Tech. 9, pp. 1682-1692 (Sep. 1999).
Manolatou et al., "Coupling of Modes Analysis of Resonant Channel Add-Drop Filters," 35 IEEE J. Of Quantum Elec. 9, pp. 1322-1331 (Sep. 1999).
McDonald, "Electric and Magnetic Coupling through Small Apertures in Shield Walls of any Thickness," MTT-20 IEEE Trans. On Microwave Theory & Techniques 10, pp. 689-695 (Oct. 1972).
Melloni et al., "Synthesis of Direct-Coupled-Resonators Bandpass Filters for WDM Systems Lightwave Technology," 20 J. Lightwave Tech. 2, pp. 296-303 (2002).
Melloni et al., Integr. Photon. Research and Applications/Nanophotonics (IPNRA), p. paper IMC1 (2006).
Papuchon et al., "Electrically switched Optical Directional Coupler: Cobra," 27 Applied Physics Lett. 5, pp. 289-291 (Sep. 1, 1975).
Partial International Search Report for International Application No. PCT/US2007/018207, mailed Jun. 2, 2008 (5 pages).
Partial International Search Report for International Application No. PCT/US2008/00330, mailed Jul. 30, 2008 (5 pages.)
Partial International Search Report for International Application No. PCT/US2008/003957, mailed Jul. 16, 2008 (8 pages).
Poon et al., "Wavelength-selective reflector based on a circular array of coupled microring resonators," 16 IEEE Photonics Technology Letters 5, pp. 1331-1333 (May 2004).
Popovic, "Optimally efficient resonance-tuned optical modulators," *in*CLEO 2009, paper CTuV6 (2 pages) (May 2009).
Popovic et al., Optics Express 14, 1208 (2006).
Popovic, Resonant optical modulators beyond conventional energy-efficiency and modulation frequency limitations (2010).
Rabiei et al., "Polymer Micro-Ring Filters and Modulators," J. Lightwave Tech. 20, 1968 (2002).
Rezzonico et al., Optics Express 16, 613 (2008).
Rhodes, "A Low-Pass Filter Prototype Network for Microwave Linear Phase Filters," MTT-18 IEEE Trans. Microwave Theory Tech. 6, pp. 290-301 (Jun. 1970).
Sacher et al., Optics Express 16, 15741 (2008).
Sugimoto et al., "Waveguide polarization-independent Optical Circulator," 11 IEEE Photon. Tech. Lett. 3, pp. 355-357 (Mar. 1999).

Suh et al., "Temporal Coupled-Mode Theory and the Presence of Non-Orthogonal Modes in Lossless Multimode Cavities," 40 IEEE J. of Quantum Elec. 10, pp. 1511-1518 (Oct. 2004).

Takahashi et al., "Tunable Chromatic Dispersion Compensator Utilizing Silica Waveguide Ring Resonator having Mach-Zehnder Interferometric Variable Coupler Eliminating Crossing Point of Waveguides," 15th Annual Meeting of IEEE Lasers and Electro-Optics Society, v.2, pp. 665-666 (Nov. 10-14, 2002).

Watts et al., "Maximally Confined Silicon Microphotonic Modulators and Switches," IEEE Proc. of the LEOS Ann. Meet., p paper WF1, pp. 457-458 (2008).

Weber et al., "Crosstalk and Switching Characteristics in Directional Couplers," 24 IEEE J. Of Quantum Elect. 3, pp. 537-548 (Mar. 1988).

Wei et al., "Compound Ring Resonator with Double Couplers," 186 Optics Communications 4-6, pp. 283-290 (Dec. 15, 2000).

Williamson, "Sensitivity-bandwidth product for electro-optic modulators," Optics Letters 26, 1362 (2001).

Xu et al., "Experimental Realization of an on-Chip All-Optical Analogue to Electromagnetically Induced Transparency," Phys. Rev. Lett. 96, pp. 1-4 (2006).

Yanik et al., "Stopping Light All Optically," 92 Phy. Rev. Lett. 8, pp. 1-4 (Feb. 27, 2004).

Yariv et al., "Coupled-Resonator Optical Waveguide: a Proposal and Analysis, " 24 Optics Lett. 11, pp. 711-713 (Jun. 1, 1999).

International Search Report and Written Opinion for PCT/US2008/080749 dated May 25, 2009 (19 pages).

International Search Report and Written Opinion for PCT/US2007/026513 dated Dec. 28, 2007 (15 pages).

International Preliminary Report on Patentability for PCT/US2007/026513 dated Jun. 30, 2009.

* cited by examiner

MZI (feed-fwd) based FSR x2 extension

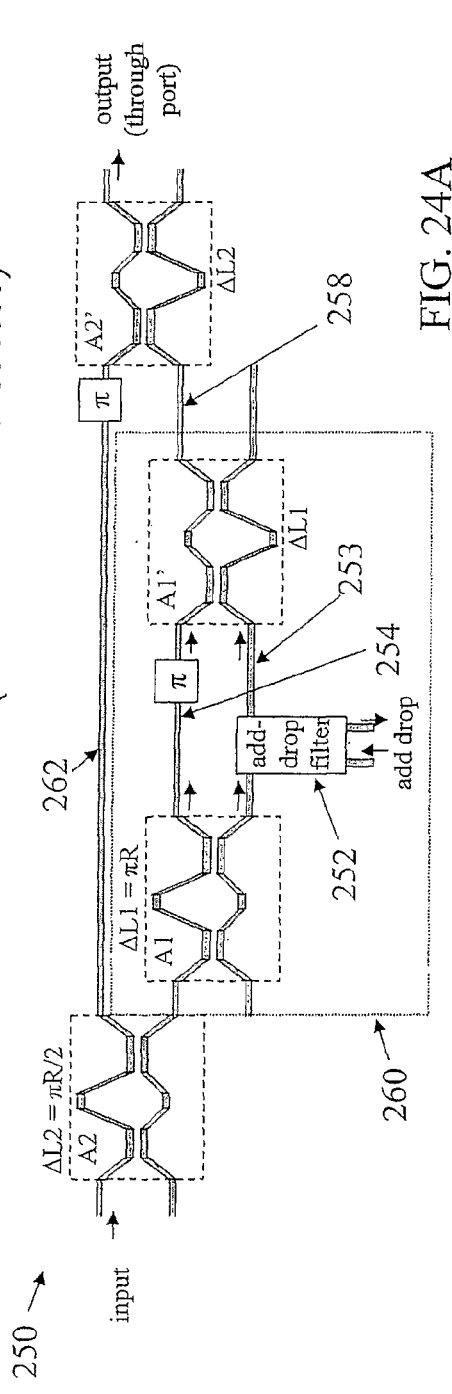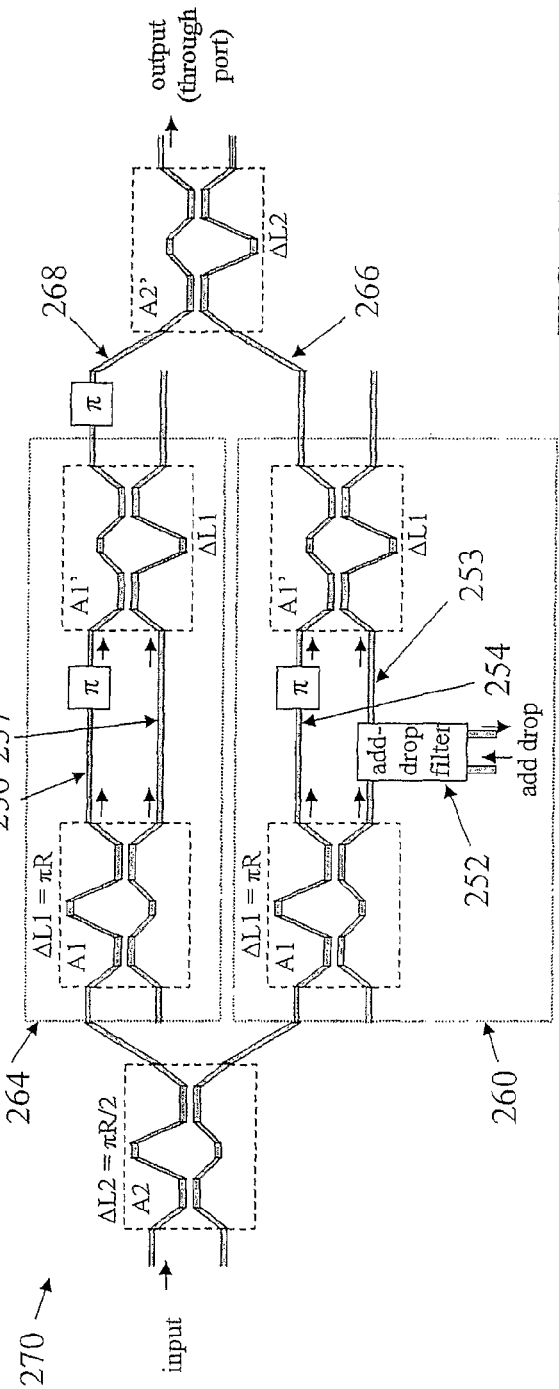
FIG. 24A
FIG. 24B

2-3 Stage Hitless Filter Responses vs. Switch State

WIDE FREE-SPECTRAL-RANGE, WIDELY TUNABLE AND HITLESS-SWITCHABLE OPTICAL CHANNEL ADD-DROP FILTERS

RELATED APPLICATION

This application is the U.S. national stage application of International (PCT) Patent Application Serial No. PCT/US2006/28848, filed Jul. 25, 2006, which claims the benefit of priority to U.S. Provisional Application Nos. 60/702,150, filed Jul. 25, 2005 and 60/727,964 filed Oct. 18, 2005; the entire disclosures of these three applications are hereby incorporated by reference in their entirety.

FIELD OF THE INVENTION

The invention relates to the field of integrated optics, and in particular to a scheme for extending the free spectral range and tunability of, and enabling hitless switching of, integrated optical filters suitable for optical channel add-drop filters for integrated optics.

BACKGROUND

Wavelength-division-multiplexed (WDM) optical transmission systems carry multiple wavelength channels simultaneously on a single guiding optical line. Integrated optical circuits, comprising various functional optical components, employ waveguiding structures that can couple light efficiently to and from optical fibers, and offer the possibility of WDM signal processing, such as switching and routing, on a chip in the optical domain. Dynamic reconfiguration of functional optical components that operate on a subset of the used WDM spectrum may be employed to reroute one or more WDM signals around a broken link in the network, to add/drop one or more wavelength channels on a WDM fiber at a network node, or to perform other signal processing operations on a wavelength-selective basis. A device that performs such functions is referred to as a reconfigurable optical add-drop multiplexer (R-OADM), and employs channel add-drop filters.

Optical channel add-drop filters are devices that typically have an input port, at least a drop or add port, a through port, and preferably a further port which, in combination with the drop or add port, forms a pair of add and drop ports, and support narrow passbands covering typically a single wavelength channel. They enable transmission of a signal in the selected wavelength channel within the passband from the input port to the drop port with low loss (preferably less than 3 dB), while suppressing crosstalk from signals in other wavelength channels in the operating wavelength range (OWR) of the filter (preferably by at least 30 dB). All channels outside the filter passband and in the OWR of the filter are transmitted from the input port to the through (or express) port, preferably with much less than 3 dB insertion loss. The selected wavelength channel within the filter passband is preferably fully removed from the input spectrum with preferably over 30-40 dB extinction of the signal remaining in the through port. This high extinction is required to prevent crosstalk with a new signal, incident at the add port, that is inserted into the through port at the selected channel wavelength. Wavelength channel passbands are typically 10-100 GHz wide and are typically spaced by 25-200 GHz as, for example, specified by the International Telecommunications Union (ITU) wavelength grid standards. For 40 GHz wide filters, typically no more than about 20 ps/nm of dispersion is preferably added by the filter to the channels in both the drop port and the through port. In the through port, much less dispersion is preferable because wavelength channels on a ring network may traverse many R-OADMs via the through port before reaching their destination and being dropped. To support cascading often, i.e., at least 5-20 times, lower dispersion values are desirable. Furthermore, it is preferable that any insertion loss and/or dispersion that is introduced by the filter to express channels, i.e., those passing to the through port, be balanced, i.e., as equal as possible among all of the channels.

Preferably, during the dynamic reconfiguration of optical components such as R-OADMs, i.e., of their add-drop filters, that operate on a subset of the WDM spectrum, the data flow on other express wavelength channels in the through port is not interrupted or deteriorated (e.g., by insertion loss or dispersion) during the reconfiguration operation. This is referred to as hitless switching or hitless reconfiguration of the optical component.

It is further desirable that an optical channel add-drop filter be able to process any single WDM channel within its OWR. The OWR of the filter is preferably a wide optical band, e.g., the C-band communication window of 1530-1570 nanometers (nm). It is desired a filter with only one active passband over the operating wavelength range, and thus, for resonant filters, only one resonance within the optical band, i.e., a spacing between adjacent resonances, or free spectral range (FSR), larger than the OWR. A filter whose operating channel wavelength may be dynamically adjusted is referred to as tunable. A wide tuning range for the center wavelength of the filter passband—a tuning range that covers the OWR—is required to enable to access any channel in that range. Finally, the filter reconfiguration process from dropping one wavelength channel to dropping another wavelength channel or a complete off state (not dropping any channels), is preferably hitless, i.e., transparent to the other WDM channels as described.

Integrated optical filters with a single passband over a wide operating wavelength range can be made using optical resonators, for example microring resonators, with a large FSR equal to or larger than the OWR, such that only one resonance lies within the range. Large FSR resonators can be made by making the resonator small in size so that, in traveling-wave resonators like rings, the path length is short and spaces longitudinal resonances further apart spectrally. Small ring resonators have tight bend radii and optical radiation confined and propagating in such a ring tends to experience bending radiation loss, giving rise to a low quality factor, Q. Radiation loss can be reduced to an acceptable level by designing waveguides using high refractive index contrast (HIC) between the waveguide core and cladding, such as SiN (n~2 near 1550 nm wavelength) or Si (n~3.5) core, and silica (n~1.45) or air (n~1) cladding. In turn, high-index-contrast resonators are small and require fine lithography, can have significant propagation losses due to surface roughness, and their resonant frequency can be very sensitive to small dimensional errors resulting in fabrication. Furthermore, for very large FSRs desired in some applications, it may not be possible to use a sufficiently high index contrast due to lack of practical materials with a high enough index over the wavelength range of interest. Therefore, methods to extend the usable FSR of a filter are desirable.

In the Vernier scheme, two resonators with different FSRs are cascaded such that a passband is obtained only at those wavelengths where both resonators have a resonance. This enables the use of ring resonators, for example, of larger radii and lower index contrast to achieve a particular large FSR. In add-drop filter applications, where the through-port response (relevant to express channels) is of interest, certain such Vernier designs may have excessive dispersion at suppressed resonances and thus destroy the signal modulation in some of the through port channels. Thus, filter FSR extension schemes with tolerable dispersion are of interest.

Furthermore, mechanisms for wavelength tuning of the passband of a filter, such as thermo-optic (TO), electro-optic (EO) or micro-electro-mechanical systems (MEMS)-based tuning, support a certain limited range of wavelength tunability. Moreover, the filter center wavelength is preferably to be well controlled to a fraction of the passband width. When directly tuning a resonator over a wide OWR using one of the aforementioned mechanisms, it is necessary to span the full OWR, and yet simultaneously provide the fine tuning control necessary to support the needed wavelength stability and accuracy. For example, for a 40 gigahertz (GHz)-wide filter passband on a 32 nm (4 terahertz (THz))-wide OWR containing a WDM channel spectrum, one may need better than 4 GHz control on the filter center frequency or one part in 1000 (tolerable resonance frequency error relative to the OWR). Filter architectures that permit wider tuning, more robust control of the tuning mechanism, lower power consumption, higher speed, or a combination thereof are of interest.

SUMMARY

Channel add-drop filters for a WDM optical communication system provide narrowband passbands (e.g., 10, 20, 40 GHz) to drop one of a number of channels typically spaced by 25, 33, 50, 100, 200 GHz on a WDM channel grid near the 1550 nm freespace wavelength, where the utilized WDM grid portion can typically occupy as much as 40 nm (C-band) or 80 nm (C-band and L-band). The dropped channel(s) are typically coupled to one output optical fiber, or directly guided to a photodetector, while all other channels (called through-port, or express, channels) are coupled to a second output optical fiber that forms part of the optical network. In the following, add-drop filters having both an add and a drop port will be considered, but it is understood that embodiments of the present invention more generally refer to add and/or drop filters that have at least either the add or the drop functionality, i.e., either the drop or the add port.

Add-drop filters may support more than one passband over a usable optical wavelength range, an undesirable feature in applications where a single channel in the operating wavelength range (OWR) is to be processed. For example, traveling-wave-resonator-based filters, such as microring-resonator filters, have periodically spaced passbands, one at each longitudinal resonance of the resonator. A resonant wavelength, which defines a resonance, is a free-space wavelength such that the round-trip optical path length of the resonator is an integer multiple of the corresponding guided wavelength. The spacing between adjacent resonances, determined by the optical path length of the resonator, is the free spectral range (FSR), and is limited by the minimum size of optical resonators that still have low enough radiation loss to support high quality factor (high Q) resonances. Filters based on grating-based reflectors similarly have periodic reflection passbands. An important challenge for telecom channel add-drop applications is to enable such filters, with FSRs smaller than the desired OWR to:

1) have one active passband over the OWR;
2) wavelength tune an active passband over the entire OWR with little required actuation, i.e., low power consumption, physical stress (applied temperature, voltage) of the material, etc.; and
3) dynamically switch the filter between a state in which it has an active passband and a state in which there are no active passbands (no dropped channels) within the OWR, without significantly affecting other (express) channels during the transition from one state to the other; i.e., support hitless switching.

One way to provide a wide FSR in resonant filters is to make small resonators, such as small-radius microring resonators, using high refractive index contrast to keep radiation loss within acceptable bounds and support high Q resonances. Then, to address the entire OWR with a filter having an FSR as large as the OWR, it is typically necessary to tune the single resonance within the OWR over an entire FSR of the device. This approach is challenging because it involves addressing both the extremely wide tuning range required, and the wavelength stability of a tuning mechanism configured to enable such a wide wavelength tuning. Realization of tuning mechanisms for large direct tuning range may be challenging from complexity, power consumption, and material integrity (e.g., in the case of temperature tuning) points of view. The index contrast that may be needed for such large FSR resonators may lead to small resonators with increased dimensional sensitivity and greater sensitivity to stochastic variation in fabrication reducing yield. Therefore, alternative approaches to wide FSR and tuning range are of interest.

A general filter structure is provided herein that enables (i) extending the FSR of a filter by rerouting spectral components to bypass adjacent passbands of the filter, effectively suppressing them, with low group delay, low group delay variation from channel to channel, and low dispersion; (ii) extending the tuning range for a given actuation strength of the tuning mechanism, or else achieving the same tuning range with smaller required actuation strength (e.g., temperature, electro-optic, MEMS or other used actuation); and (iii) hitless switching of such a wide-FSR, widely-tunable filter.

The designs disclosed below rely on splitting an input signal spectrum, using a wavelength-selective splitter device, among a first filter-containing optical path and a second path, such that at one passband wavelength of the filter the input signal is routed fully through the first path and processed by the filter, while at one or more adjacent passband wavelengths of the filter, the input signal is routed fully through the second path, bypassing the filter and effectively suppressing the operation of the adjacent filter passbands and extending the effective FSR of the filter. A combiner element provides for recombining the input signal at substantially all express wavelengths in the OWR back into a single optical path at the output. An important feature of the scheme is that it is interferometric, and the configuration of the splitter and combiner devices and of the first and second optical path permits recombination of signals at all wavelengths in the OWR, even if they are split partially among both optical paths. The latter ability to split signals among both paths is shown to be advantageous in order to provide low group delay and dispersion FSR-extension designs. Furthermore, the scheme is substantially general with respect to the particular choice of splitter and combiner devices and of the embedded optical filter device. The designs herein include:

1) a 2-input, 2-output splitter device A, and a 2-input, 2-output combiner device A', where A' is such that the transfer matrix of A' is the diagonal transpose of the transfer matrix of the splitter A, and the outputs of A and respective inputs of A' are connected by two optical propagation paths, e.g., waveguides, with a differential $\pi$ phase shift in propagation along the two optical paths. The splitter device A and the combiner device A' typically are structurally identical (but with any built-in DC magnetic fields reversed for non-reciprocal media) and oriented such that the device A' is obtained by a 180° rotation of the device A on the plane of the interferometer scheme;

2) an optical filter disposed in at least the first of the two optical paths connecting A and A';

3) the splitter device A is wavelength dependent in the operating wavelength band, i.e. at one wavelength of the operating wavelength range, there is substantially full transmission from the chosen input port to the first optical path, (and substantially null transmission to the second optical path) and at one or more other wavelengths of the operating wavelength range, there is substantially a null transmission from the chosen input to the first optical path, (and corresponding substantial transmission to the second optical path), 4) said wavelength of substantially full transmission and adjacent transmission null wavelengths having a spacing in wavelength (i.e., frequency), within a wavelength range in the OWR, that corresponds substantially to the wavelength (i.e., frequency) spacing of adjacent resonances of the filter over approximately the same wavelength range (i.e., the spacing of the full transmission and adjacent transmission null wavelengths corresponds to one or several FSRs of the filter).

An additional advantage of the present designs is that the wavelength dependent splitter A may be such that at an intermediate wavelength between a substantially full transmission wavelength and an adjacent null transmission wavelength, there is substantial transmission to both the first and second optical paths over a wavelength range wider than one or more typical wavelength channel spacings, permitting wide-band, slowly varying wavelength-filtering responses, which introduce small group delay and dispersion, or may be linear phase (no dispersion), to be used in the splitter device design. The advantage of an interferometric scheme that recombines signals split between two paths over a substantial wavelength range is that it enables the use of such wide, smoothly varying filtering functions of the splitter device A in the extension of the FSR of an add-drop filter without introducing significant group delay, group delay variation across the OWR, or dispersion. To enable such wide filtering functions and proper operation also in the presence of a possible splitting of some input channels among both paths, a preferred FSR extension scheme enables their recombination into one optical path at the output of the device, with the exception of any wavelengths dropped by the optical add-drop filter.

The splitter may contain a wavelength tuning mechanism to shift its spectral response in wavelength over a substantial part of one entire FSR of the splitter device, or over the OWR of the optical device into which the splitter device is incorporated. In one embodiment, a filter device may be embedded within the a first or second optical path of the optical device, of which the splitter device is part, and may preferably have a wavelength tuning mechanism that can shift the filter passband over only one entire FSR of the filter device (generally a substantially smaller band than the OWR). The scheme enables tuning the entire expanded effective FSR (wavelength range) with a reduced actuation (e.g., temperature, voltage, etc.), by tuning a transmission peak of the splitter A to the desired channel wavelength, and tuning only the closest filter resonance to that same wavelength, while the adjacent resonances are suppressed. Thus any channel over the expanded FSR may be processed. In one embodiment, hitless switching of these designs is permitted by an additional filter bypass scheme whereby an FSR-extended filter designed by the scheme described herein is nested within a hitless switch device designed according to a similar two-optical-path bypass approach.

In an aspect, the invention features an optical device including a splitter device configured to split an input spectrum among a plurality of output ports, and a combiner device configured to combine at least a portion of the split input spectrum into a single output port, each of the splitter and combiner devices having respective first and second input ports, respective first and second output ports, and a respective transfer matrix. A first optical path optically couples the first output port of the splitter device and the first input port of the combiner device, and a second optical path optically couples the second output port of the splitter device and the second input port of the combiner device. An optical filter is optically coupled to at least one of the first and the second optical paths. The first and second optical paths are configured to introduce, at least at a wavelength of the input spectrum, a phase shift of $\pi$ radians to the optical radiation propagating through the first optical path with respect to the optical radiation propagating through the second optical path. The transfer matrix of the combiner device is the diagonal transpose of the transfer matrix of the splitter device. The splitter device is configured to split the input spectrum into the first and second optical paths such that (i) at a first wavelength of the input spectrum, a ratio of a portion of an input signal transferred to the first optical path to a portion of the input signal transferred to the second optical path is greater than 10 and (ii) at a second wavelength of the input spectrum, the ratio of the portion of the input signal transferred to the first optical path to the portion of the input signal transferred to the second optical path is less than 0.1, and a wavelength spacing between the first wavelength and the second wavelength is less than 100 nanometers.

One or more of the following features may be included. The filter includes an add-drop filter, and one of the first and the second wavelengths coincides with a wavelength dropping passband of the filter. The first and second optical paths are configured to introduce, at substantially all wavelengths of the input spectrum within an operating wavelength range of the optical device, a phase shift selected from a range of $0.7\pi$ to $1.3\pi$ radians, more preferably from a range of $0.9\pi$ to $1.1\pi$ radians, most preferably $\pi$ radians, to the optical radiation propagating through the first optical path with respect to the optical radiation propagating through the second optical path.

The first optical path includes a first coupler, such as a first optical waveguide, and the second optical path comprises a second coupler, such as a second optical waveguide. The transfer matrix of the combiner device is substantially different from the transfer matrix of the splitter device. At least one of the splitter device and the combiner device includes a resonator-based filter. At least one of the splitter device and the combiner device comprises a feed-forward interferometer filter that may include at least two directional couplers.

Each of the splitter and combiner devices includes a respective tuning element configured to enable wavelength tuning of a spectral response characteristic. A tuning range of each of the splitter and combiner devices spans at least an operating wavelength range of the optical device. The optical filter includes a tuning mechanism. A tuning range of the optical filter spans at least one free spectral range of the filter.

The optical device also includes a further splitter device configured to split an input spectrum among a plurality of output ports, and a further combiner device configured to combine at least a portion of the split input spectrum into a single output port, each of the further splitter and combiner devices having respective first and second input ports, respective first and second output ports, and a respective transfer matrix. A third optical path optically couples the first output port of the further splitter device and the first input port of the further combiner device. A fourth optical path optically couples the second output port of the splitter device and the second input port of the combiner device. The third and fourth optical paths are configured to introduce, at least at a wavelength of the input spectrum, a phase shift of π radians to the optical radiation propagating through the third optical path with respect to the optical radiation propagating through the fourth optical path, said transfer matrix of the further combiner device is the diagonal transpose of the transfer matrix of the further splitter device, the first input port of the further splitter device is optically coupled to the first optical path, the first output port of the further combiner device is optically coupled to the first optical path and said optical filter is optically coupled to at least one of the third and the fourth optical paths.

The second optical path includes an optical waveguide having a length selected to provide comparable group delay to balance a delay of the first optical path comprising the second optical device.

A combination includes a first, a second, and a third optical device of the configuration described above, with the first optical device being disposed in a symmetric nested arrangement with the second and the third optical devices, wherein the first optical path of the first optical device includes the second optical device, the second optical path of the first optical device includes the third optical device, the filter of the first optical device includes one of the second and third optical devices, and the filter of at least one of the second and third optical devices consists of, or includes, a straight waveguide.

A combination includes a first optical device as described above, and a second optical device. The second optical device includes a second splitter device configured to split an input spectrum among a plurality of output ports, and a second combiner device configured to combine at least a portion of the split input spectrum into a single output port, each of the second splitter and combiner devices having respective first and second input ports, respective first and second output ports, and a respective transfer matrix. A third optical path of the second optical device optically couples the first output port of the second splitter device and the first input port of the second combiner device; and fourth optical path optically coupling the second output port of the second splitter device and the second input port of the second combiner device. The third and fourth optical paths are configured to introduce, at least at a wavelength of the input spectrum, a phase shift of π radians to the optical radiation propagating through the third optical path with respect to the optical radiation propagating through the fourth optical path, where the transfer matrix of the second combiner device is the diagonal transpose of the transfer matrix of the second splitter device, and the first optical device is disposed in a non-symmetric nested arrangement with the second optical device such that the third optical path of the second optical device includes the first optical device.

In the latter combination, the second splitter device may include an optical switch having first and second states, configured so that in the first state of the optical switch, at least at a wavelength of the spectrum, a ratio of a portion of an input signal transferred from one input port of the second splitter device to the third optical path to a portion of the input signal transferred to the fourth optical path is greater than 10, and in the second state, a ratio of the portion of the input signal transferred to the third optical path to the portion of the input signal transferred to the fourth optical path is less than 0.1.

The wavelength spacing between the first and the second wavelengths is substantially the same as the wavelength spacing of two adjacent passbands of the optical filter optically coupled to the first or the second optical paths in an operating wavelength range of the device.

The splitter device is further configured to split the input spectrum into the first and second optical paths such that at a third wavelength of the input spectrum, a ratio of a portion of an input signal transferred to the first optical path to a portion of the input signal transferred to the third optical path is less than 0.1, a wavelength spacing between the first wavelength and the second wavelength is substantially the same as the wavelength spacing between the first wavelength and the third wavelength, and the second and third wavelengths are on opposite sides of the first wavelength. The transfer matrix of the combiner device is substantially different from the transfer matrix of the splitter device.

The splitter device is configured to split the input spectrum into the first and second optical paths such that at an intermediate wavelength between the first and second wavelength of the input spectrum, a ratio of a portion of an input signal transferred to the first optical path to a portion of the input signal transferred to the second optical path is less than 10 and greater than 0.1. The intermediate wavelength is at least one channel spacing away from at least one of the first wavelength and the second wavelength of the splitter device. The first wavelength is coincident with one passband of the optical filter, and the second wavelength is coincident with an adjacent passband of the optical filter.

In another aspect, the invention features a tunable optical device including a first and a second optical path. An optical filter is disposed in at least the first optical path. A tunable wavelength-dependent optical splitter device for splitting input optical radiation into the first and second optical path, such that at one filter resonance, the splitter device has substantially unity transmission to the first optical path, at one or more adjacent filter resonances has substantially null transmission to the first optical path, and the splitter device is configured to split at least one wavelength channel substantially between both optical paths, the at least one wavelength channel selected from a range between the substantially-unity-transmission wavelength and the substantially-null-transmission wavelengths. The tunable optical device also includes a combiner device for combining into a single output optical path the outputs from the two optical paths. The first and second optical paths introduce a phase shift of π radians between optical radiation propagating through the first and the second optical paths.

The following feature may be included. The splitter and combiner devices include two substantially identical devices, one of the identical devices being connected at an approximately 180 degrees rotation with respect to the other device.

BRIEF DESCRIPTION OF FIGURES

FIGS. 24a-24b are schematic diagrams of an exemplary design for the multiplication of an FSR by a factor of four;

DETAILED DESCRIPTION

Resonant integrated-optical filters, such as microring-resonator-based filters, enable high-order responses with flat passbands to be obtained by coupling multiple resonators. Flat passbands are preferred in telecommunications for channel add-drop filter applications. Resonators have an FSR for resonant modes typically determined by their size, e.g., their round-trip length in the case of traveling-wave resonators such as microring resonators. The FSR determines the maximum OWR that a tunable filter based on such resonators alone can span, without operating on more than one channel simultaneously. Using several resonators of different FSRs enables extension of the effective filter FSR by Vernier schemes, but these can suffer from through-port dispersion.

Various embodiments of the invention provide several designs for extension of the FSR of a filter by placing it within a structure that diverts around the filter the input optical spectrum at one or more of the resonances adjacent to the desired active resonance (passband), and recombines all of the output in one waveguide, such that the FSR of the filter is effectively enlarged by a factor of 2, 3, 4, etc. according to different designs enabled by the scheme. In an embodiment, the invention also provides for continuous tunability of the filter passband across the entire enlarged effective FSR, with a smaller induced refractive index change (i.e., smaller temperature range for TO tuning, voltage for EO tuning, or range of motion for MEMS-based tuning), and therefore also enabling less sensitive control of the wavelength tuning. Finally, hitless-switchable filter designs are provided.

One or more embodiments of the invention rely on the combination of:

(1) an optical filter;

(2) the design of a tunable wavelength-dependent splitter device that splits the input spectrum entering an input port into two optical paths, with substantially unity transmission from the input port to one of the optical paths at one filter resonance and substantially null transmission at one or more adjacent filter resonances;

(3) a "two-way spatial diversity scheme" that enables the recombination of all signal at all wavelengths split into two paths by the splitter device back into a single waveguide optical mode in a fabrication-tolerant, broadband manner independent of the particular type of splitter device, and with only a few constraints on the choice of the splitter device design; the scheme involves the use of typically two identical splitter and combiner devices, one of which is rotated 180-degrees and operated in reverse with respect to the other device, and a π phase shift between the two optical paths connecting them; and (4) tuning mechanisms enabling wavelength tuning of the optical filter, and of the splitter and combiner devices.

In the following description, some representative FSR extension schemes are presented, and then embodiments of the invention and their application are described.

Figure 1:
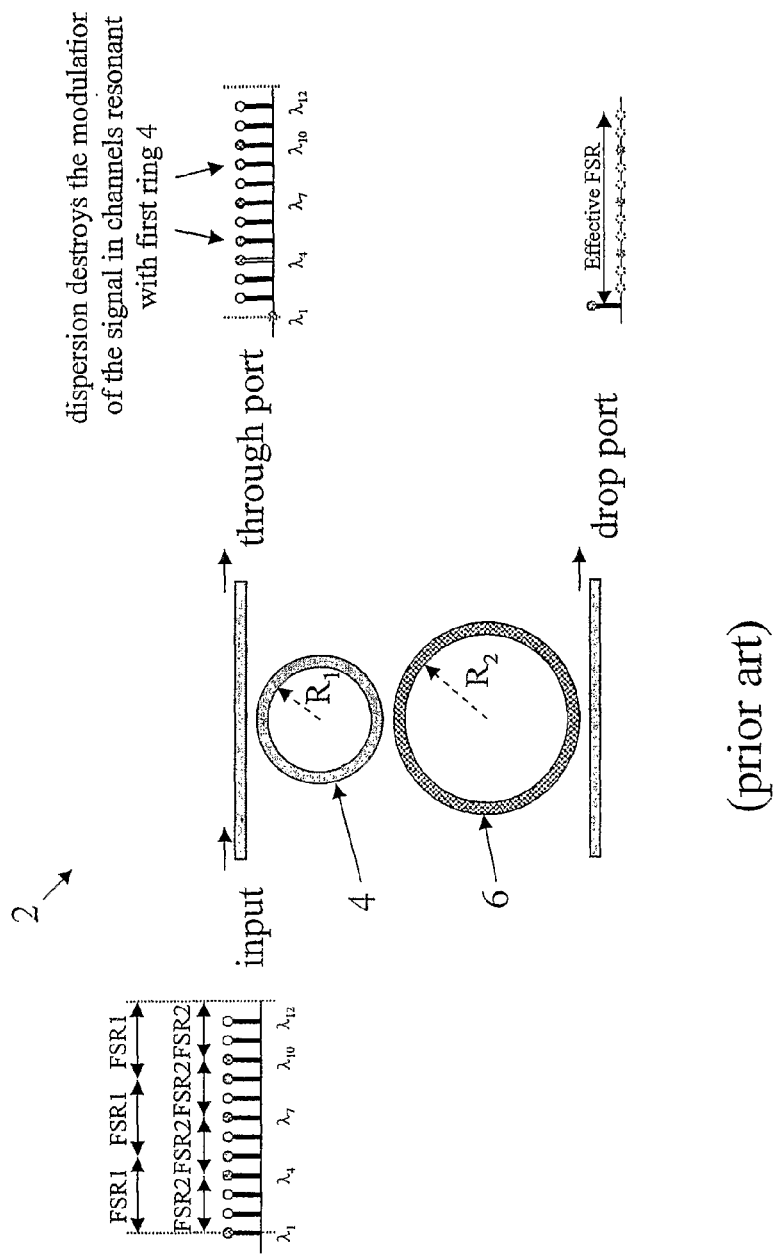
FIGS. 1-3 are schematic diagrams of Vernier schemes.

Referring to FIG. 1, in a typical Vernier scheme, a second-order ring-resonator filter 2 is built from two coupled rings 4, 6 that have different radii. The FSR of a ring is inversely proportional to its radius as $$FSR = c/(2pRn_g)$$

where R is a suitably defined ring radius, $n_g$ is the effective group index of the waveguide mode given the radius definition, c is the free space speed of light and the FSR is given in regular frequency units (Hz if c is in meters/second (m/s) and R is in m). If the FSRs of the two rings 4, 6 are not equal, e.g., the first ring 4 has a first free spectral range FSR1 and the second ring 6 has a second free spectral range FSR2, such that MgFSR1=NgFSR2, and M,N are integers without common factors, then the effective total FSR is FSReff=MgFSR1. There is a drop-channel passband only when the resonances of both rings 4, 6 are coincident in wavelength, which may occur in the frequency spectrum with a frequency period of FSReff.

This approach has two drawbacks in the context of add-drop filter applications. First, single rings have broad Lorentzian resonances, and where the resonances of the two rings 4, 6 are not lined up, the suppressed resonances may not be suppressed strongly enough for telecom applications, especially when large M,N (large FSR extension) are used. For telecom applications, unwanted resonance suppression of >30 dB is preferred.

A more serious problem is dispersion in the through port, as illustrated in the example in FIG. 1. Channels that are resonant with the first ring 4 but not resonant with the second ring 6 may not be dropped and may be fully transmitted to the through port. However, these channels may still resonate in the first ring 4, and may thus experience severe dispersion, approximately equivalent to an all-pass filter with only the first ring 4 present and the second ring 6 removed. The dispersion may be large enough to completely destroy the modulated optical data stream in the channel if the bandwidth of the signal is of the order of the bandwidth of the filter 2, and thus may render this geometry not usable for channel add-drop filters for WDM applications.

Figure 2:
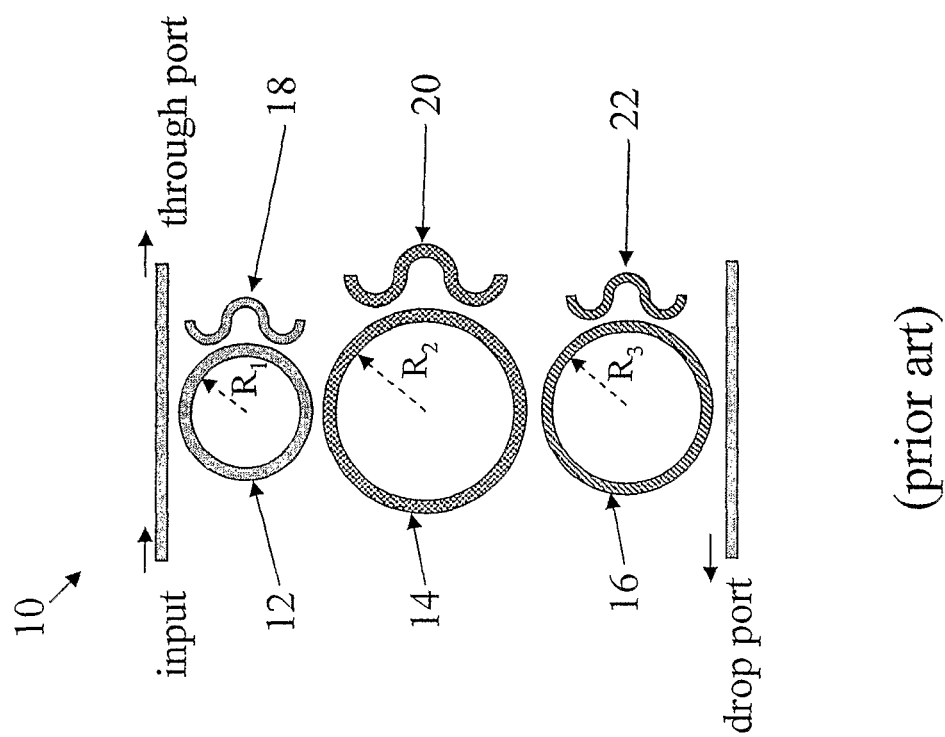

Referring to FIG. 2, in a second example, Mach-Zehnder interferometers (MZIs) 18, 20, 22 are attached to each ring resonator 12, 14, 16 to disable some of the ring resonances. In this case, the first ring 12 (nearest the input bus waveguide) is disabled at some of its resonant wavelengths by the MZI 18 configured to disable the resonance by either introducing phase cancellation, or by introducing loss, thereby extending the FSR of the resonator 12. Disabling of the second and third rings 14, 16 enables a further extension of the FSR and selection of only one passband in the drop port. However, the second and third rings 14, 16, when disabled may still leave the first ring 12 resonant and thus this geometry may suffer from a similar dispersion problem as the example in FIG. 1.

Figure 3:
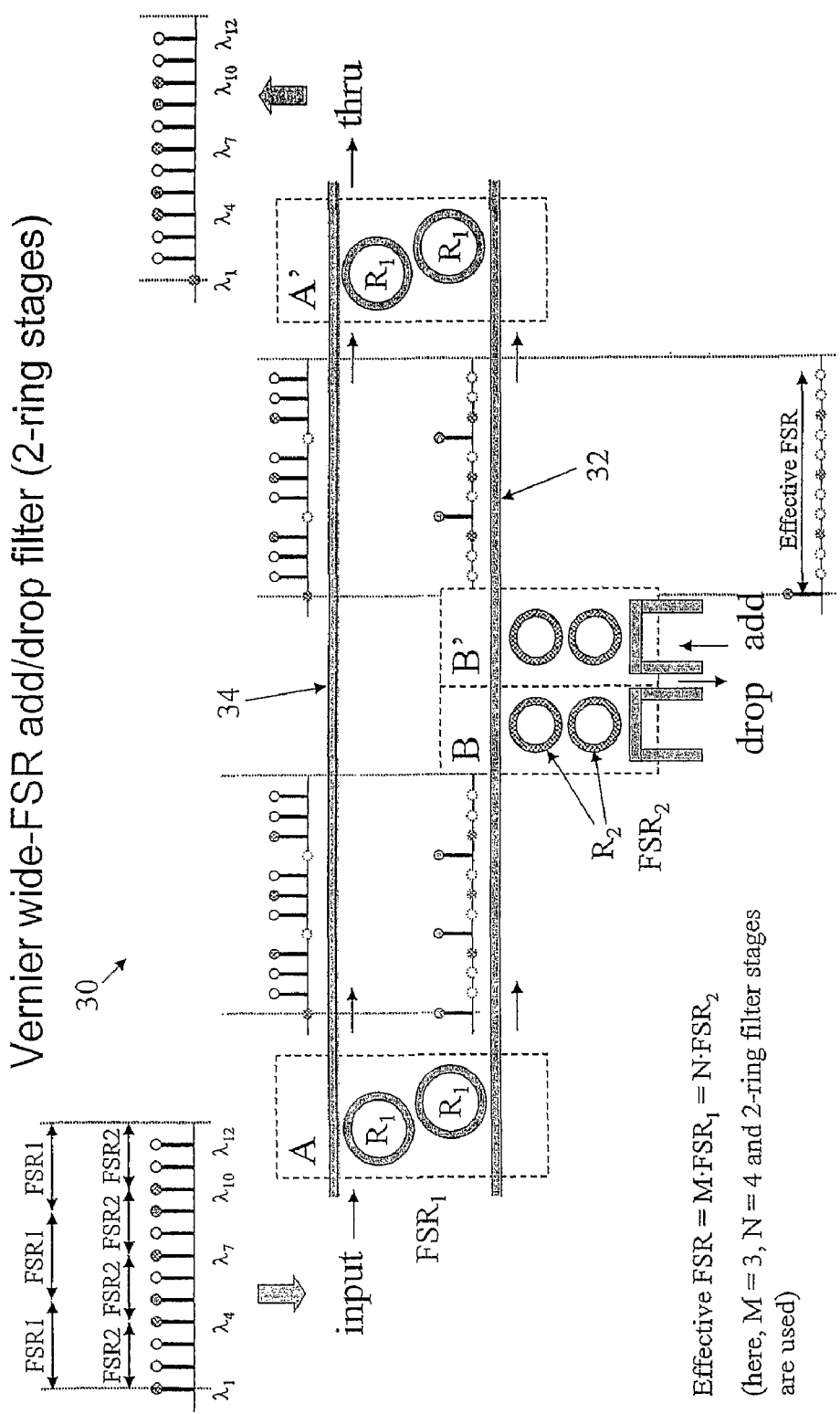

Referring to FIG. 3, a third Vernier-type geometry has been investigated. See M. Margalit, "Tunable optical filtering device and method", U.S. Pat. No. 6,839,482. Here, higher-order filters A are used to drop one of every several channels, determined by the FSR of the first stage A, FSR1. Subsequently, filter stages B, B' with a different FSR (FSR2) select only one channel from those dropped by stage A, and the remaining channels are dropped a second time back into the bus waveguide 34 by stage A', identical to A, to rejoin the remaining channels that passed through A on the top bus waveguide 34. Here, filter stages A and A' are identical, flat-top filters, and B and B' are identical flat-top filters. This architecture has several advantages, including that the total drop-port response is shaped by the cascade of two filters (A and B) and thus has sharper rolloff, i.e., a more box-like spectral response, than a single stage. Also, the FSR is extended in a way analogous to the example in FIG. 1, and to tune the entire effective free spectral range, one may need only to provide a means to independently tune each of the stages A and B across their respective entire smaller FSRs, if several adjacent resonances can be designed to have substantially similar passbands, which is typically possible. Therefore, a much greater tuning range is provided by the complete device for, e.g., thermo-optic tuning, than by an individual filter stage, for the same applied temperature. It also means that the channel center frequency may be controlled with better stability and accuracy since the fraction of the total tuning range to the frequency offset to within which the resonant frequencies may need to be controlled is a larger fraction due to resonator FSRs that are smaller than the total effective FSR of the total device.

Figure 4:
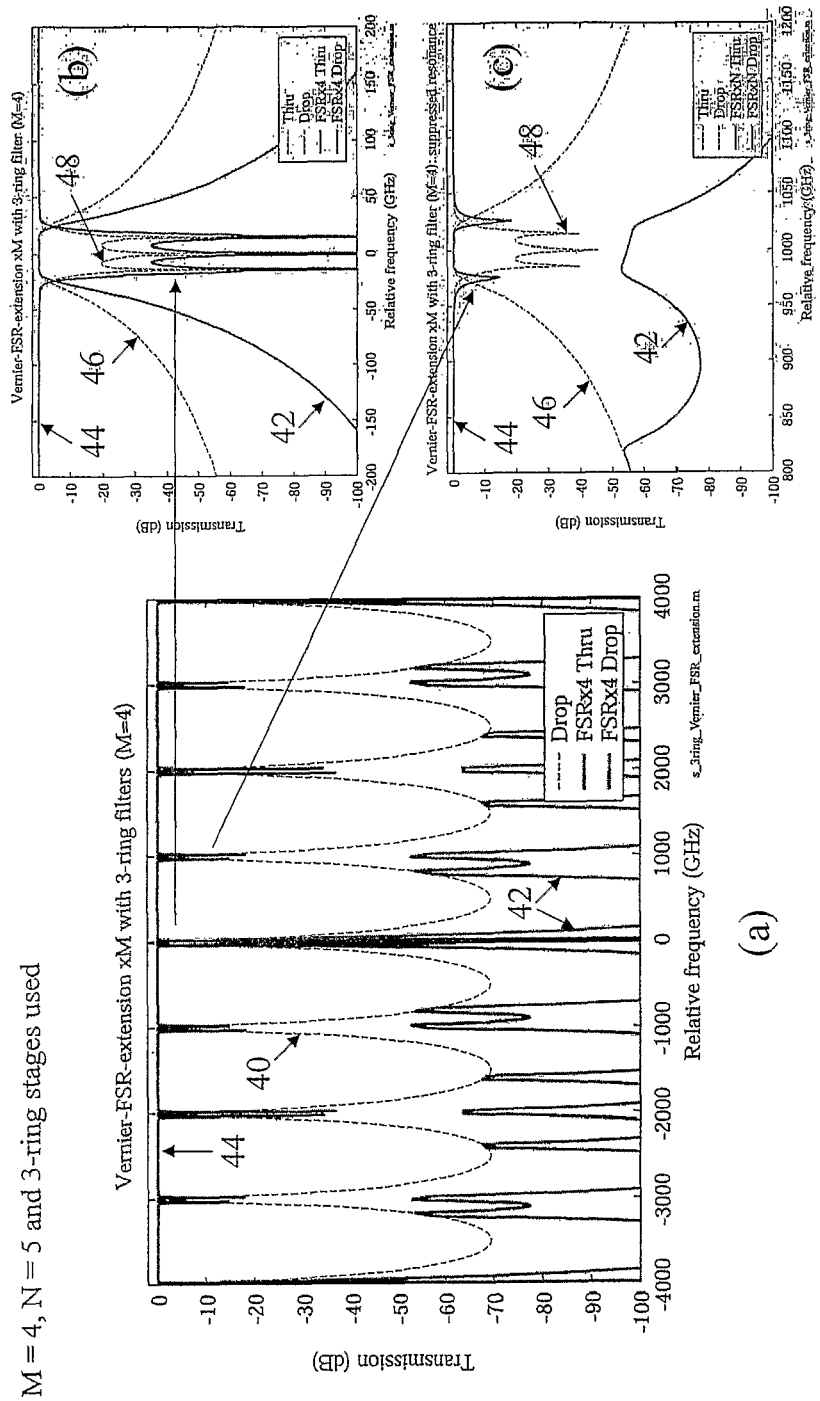
FIGS. 4-5 are graphs illustrating simulated responses of Vernier schemes.

However, the Applicant has found that a problem arises with the structure of FIG. 3. Referring to FIG. 4, a simulated example of a filter 30 such as that depicted in FIG. 3 is illustrated, but with each stage A, A', B, B' constituting a 3-ring resonant filter. Stages A, A' have FSR1=1 THz, and stages B, B' have FSR2=800 GHz, giving a total effective FSR, $FSR_{\mathit{eff}}$=4 THz (e.g., permitting 40 WDM channels×100 GHz channel spacing to fit in the OWR, equal to one $FSR_{\mathit{eff}}$). All four filters (A, A', B, B') are chosen to have a Chebyshev passband characteristic with a 40 GHz 0.25 dB-bandwidth, 0.05 dB passband ripple (corresponding to 19.5 dB in-band extinction) and 33 dB rolloff 80 GHz from channel center, so as to permit 100 GHz channel spacing. The resulting filter design is symmetric and employs ring-to-bus-waveguide power couplings of 21.2% and ring-to-ring power couplings of 1.11% for filters A and A'. For the same filter shape and bandwidth, respective couplings of 25.8% and 1.74% are required for filters B and B' due to their smaller FSR. FIG. 4a shows the drop ports 40 of stage A alone and the drop and through ports 42, 44 of the complete device 30. Over the 4 THz effective FSR, one drop resonance is selected, while all unwanted resonances are suppressed by >50 dB. The through port 44 shows that all channels other than the dropped channel are recombined in the through port waveguide, although sharp dips in transmission near the band edges of some channels are visible. FIG. 4b shows an enlarged view of the selected channel-dropping resonance, with drop and through port responses 46, 48 of stage A alone (dash) and the responses 42, 44 of the entire device 30 (solid). Typical requirements for telecom OADMs are met by the device 30 with its >35 dB in-band extinction in the through port, and its >60 dB out-of-band rejection of adjacent channels 100 GHz away in the drop port. FIG. 4c shows an enlarged view of the least suppressed drop-port resonance centered at +1 THz relative to the selected drop resonance. Shown are the drop and through port responses 46, 48 of stage A alone (dash) and the responses 42, 44 of the entire device (solid). The unwanted resonance is suppressed by >50 dB in the drop port and the channel is reinserted in the through port by stage A' after passing by stages B and B'.

The Applicant has found that this architecture has the drawback that, although channels are split into two paths 32, 34 and are ultimately recombined, the through port channels that are dropped twice (by stages A and then A'), thereby passing by the filters B and B', experience the group delay and dispersion of the drop-port passbands of stages A and A', because they traverse A and A' on-resonance. Because these are narrowband resonant filters, the on-resonance group delay, $t_g$, is substantial, and is comparable to half of the inverse of the filter bandwidth, times the filter order N, $t_g \sim N/2Df_{BW}$. FIG. 5a shows the group delay responses 50, 52 for the drop and through ports over the frequency range covering the selected drop channel (at 0 GHz relative frequency), and the first suppressed resonances at +800 GHz and +1000 GHz. FIG. 5b shows the dispersion responses 56, 58 for both ports over the same frequency range. Since filter stages A and B both drop the desired drop-port wavelength channel, they preferably have low enough group-delay and dispersion by design to satisfy the typical telecom drop-port insertion loss and dispersion requirements. Thus, the through-port channels that traverse the bottom waveguide path 32 in FIG. 3 tends to see approximately the same dispersion as the drop-port channel. However, a channel may traverse an OADM many times as a through-port channel, but is dropped usually only once or a few times. Thus, the tolerance for insertion loss and dispersion is typically much smaller for through-port channels than for drop-port channels. Furthermore, a group delay experienced by the through-port channels taking the bottom path 32 (dropped twice by A and A') may cause them to have a different insertion loss than the channels that pass by stages A and A' along the top waveguide path 34 experiencing virtually no loss or dispersion. Imbalance in loss seen (and dispersion) by different through-port channels is undesirable from a system point of view.

According to the Applicant, a further notable drawback of this architecture is the imperfect recombination of signal at the band edges of the through-port channels that traverse the bottom optical path 32. It can be seen in FIG. 4c that deep troughs in transmission are seen at the band edges of reinserted channels where the channel passes partially through the top 34 and partially through the bottom waveguide 32 and where the phase dispersion of the filters A and A' causes destructive interference. Because these troughs tend to become wider and deeper as the channel passes through multiple OADMs in a ring network, the channel bandwidth can eventually narrow enough to degrade the signal. The latter is particularly true for lower-order filters, such as second-order (2-ring) filters, which are easier to fabricate and use in such a scheme. The through-port response of this type of scheme for A, A', B, B' being 2-ring filters is shown in FIG. 12a, after passing through one, two and three consecutive devices, for a structure described below. It shows considerable transmission nulls developing near the band edges of an express channel that is dropped by A, passes by B, B' and is dropped by A' to the through port. It would be desirable to have a through-port response that is unity over the entire through-port spectrum, except where the desired drop channel is dropped.

Embodiments of the present invention provide FSR extension schemes for filters that ensure that a substantially small fraction of the through-port signal is lost, except for the signal extracted at the chosen drop wavelength; and, further, designs that have very low or no substantial group delay or dispersion in any of the through-port channels. These FSR extension schemes are based on a general spatial diversity scheme for splitting an input spectrum arriving in a single waveguide between two optical paths in a wavelength-dependent manner, and subsequently recombining at least a part of—and preferably all—of the light in both optical paths back into one waveguide. This general scheme, referred to herein as a spatial diversity scheme, works for a large class of possible splitter/combiner devices, as described below. The scheme is then employed to extend the FSR of a filter and increase its tuning range by placing the filter in one of the two or more optical paths between which the input spectrum is split by the splitter device. The spectrum is split in such a way that substantially all of the signal at the desired drop channel wavelength is in the optical paths containing the filter, while substantially all of the signal at one or more of the adjacent filter resonances is in one or more of the other waveguides, thereby bypassing the filter and extending the effective FSR. An optical path, as used herein, refers to a propagation path in a particular optical mode of propagation. Preferably, the optical path employs a guided-wave optical mode of propagation. While a plurality of optical paths may constitute propagation paths for multiple distinct optical modes in one optical waveguide, more preferably each optical path constitutes a propagation path for an individual optical mode in a separate optical waveguide.

Figure 6:
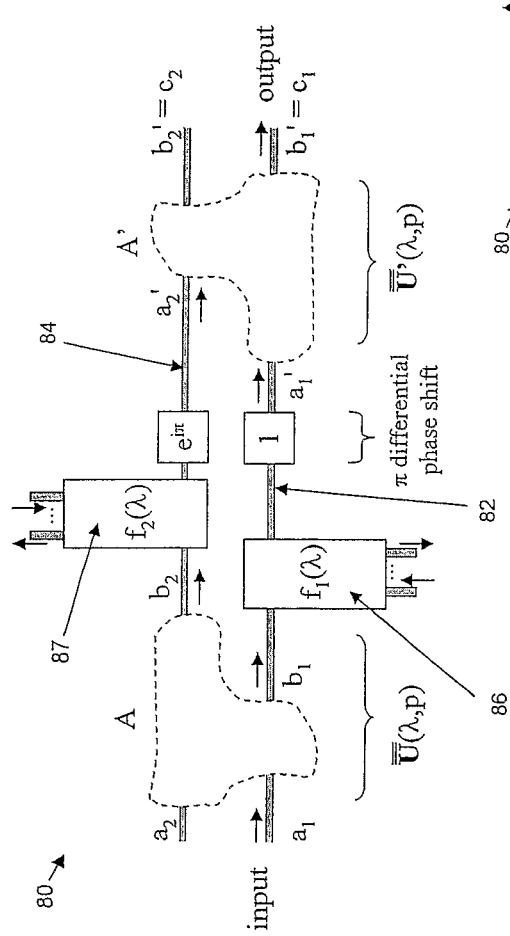
FIG. 6 is a schematic diagram of a general spatial diversity scheme using electromagnetically reciprocal optical signal splitter/recombiner devices.

Referring to FIG. 6, a new optical device is constructed in accordance with the illustrated general spatial diversity scheme 80. This scheme includes a wavelength-dependent spectrum splitter device (A in FIG. 6) with two input ports a1, a2 and two output ports b1, b2, with substantially no reflection back to the input ports and substantially all power transmitted to the output ports. The two outputs of the spectrum splitter device are first given a relative phase shift of $\pi$, and then connected to another identical device A' used as a combiner. The spectrum combiner device A' is identical to the splitter device A, except for position and orientation, and the ports (a1, a2, b1, b2) of the splitter device A correspond to ports (b2', b1', a2', a1') of the combiner device A', respectively. In addition, if the splitter and combiner devices A, A' are non-reciprocal, then the combiner device A' preferably has an opposite built-in magnetic field from the splitter A. Finally, splitter device A is connected to combiner device A' in such a way that the combiner device A' operates in reverse with respect to the splitter device A, and such that the corresponding ports of the splitter and combiner devices A, A' are connected such that the first and second outputs (b1, b2) of the splitter device A are connected to the first and second inputs (a1', a2') of the combiner device A', respectively. A first and a second optical path 82, 84, e.g., two waveguides, connecting the splitter and combiner devices A, A' may have substantially equal optical path lengths with the exception of an introduced phase difference of $\pi$ radians.

If the splitter and combiner devices A, A' are assumed to have substantially low loss and low reflection to input ports (a1, a2), i.e., (a1', a2'), respectively, then this arrangement, shown in FIG. 6, ensures that all power entering port a1 of splitter device A exits port b1' of combiner device A' (and that all power entering port a2 of A, exits port b2' of A'). This property is independent of the particular type of wavelength splitter and combiner devices A, A', and of their spectral response or particular configuration state, if they are dynamically reconfigurable (so long as A and A' are substantially identically actuated, i.e., configured). As a result, the splitting/combining scheme is broadband in the sense that the signal entering one of the input ports a1, a2 is recombined at one of the output ports b1', b2', respectively, regardless of the wavelength-dependent behavior of the splitter/combiner devices in the OWR. This property is first shown mathematically and then FSR extension schemes employing it are described.

Figure 7:
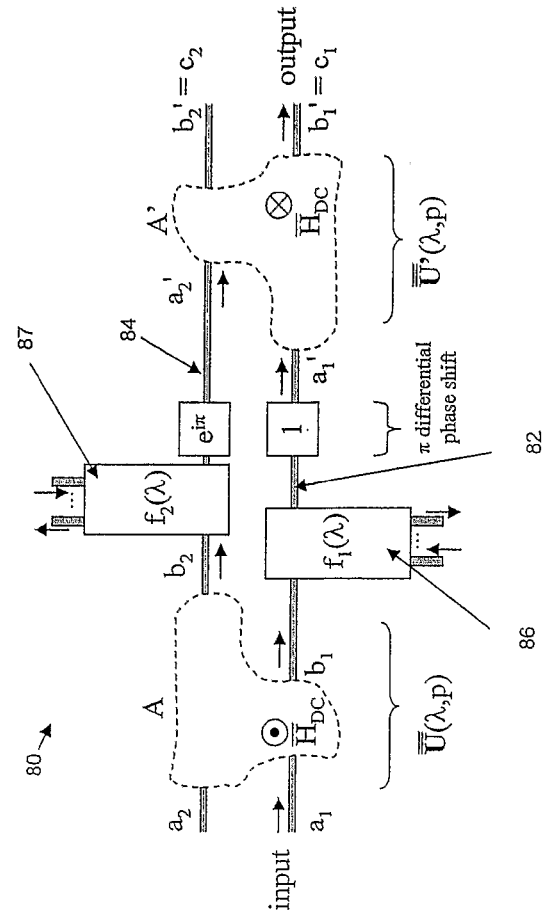
FIG. 7 is a schematic diagram of a general spatial diversity scheme using non-reciprocal optical signal splitter/recombiner devices.

Referring to FIGS. 6 and 7, the general design scheme 80 of the described structure provides an arbitrary 4-port optical splitter device A with two input ports, i.e., first and second input ports $(a_1, a_2)$ and two output ports, i.e., first and second output ports $(b_1, b_2)$, that is substantially lossless and reflectionless. In other words, substantially all power incident in the input ports is transferred only to the two output ports, with little reflection to either input port. The combiner device A', also substantially lossless and reflectionless, has two input ports, i.e., first and second input ports $a_1'$, $a_2'$, and two output ports, i.e., first and second output ports $b_1'$, $b_2'$. A first optical path 82, e.g., a waveguide, also referred to herein as an arm, connects output port $b_1$ of splitter device A to input port $a_1'$ of the combiner device A' and a second optical path 84, e.g., a waveguide, also referred to herein as an arm, connects output port $b_2$ of splitter device A to input port $a_2'$ of combiner device A'. As used herein, the ports numbered with the subscript 1 are associated with one of the optical paths (e.g., the bottom optical path 82), and those numbered with the subscript 2 are associated with the other optical path (e.g., the top optical path 84).

Without loss of generality, the combiner device A' may be represented as a structurally identical copy of the splitter device A but operating in reverse with respect to the splitter device A (for the convention where a signal propagates from left to right, this means doing a mirror symmetric replica of the splitter device A with respect to a vertical axis between A and A') and, in addition, being upside-down with respect to the splitter device A (for the schematic diagram of FIGS. 6 and 7 where the structure is in a straight, planar configuration, this means doing a further mirror symmetric replica of the splitter device obtained from the vertical replica above with respect to a horizontal axis in FIGS. 6 and 7). The latter condition is equivalent, given the convention above, to swapping the port-subscript assignment for the four ports of a device obtained with the first vertical reflection of splitter device A (i.e., the combiner device A' is a mirror symmetric replica of the splitter device A with respect to a vertical axis between A and A' and the two optical paths, such as waveguides, connecting A and A' 'cross-over'so as to connect the ports according to the above) in order to arrive at combiner device A'. The two requirements for the combiner device A' (i.e., construction by reflection of splitter device A about a vertical axis, followed by reflection about a horizontal axis) may equivalently be represented, with reference to the schematic diagrams of FIGS. 6 and 7 where the two optical paths (waveguides) are parallel, with a 180-degree rotation of the combiner device A' with respect to the splitter device A.

In an embodiment in which the splitter device A is invariant for mirror reflection about a vertical symmetry axis, the two operations above reduce to just mirror reflection about a horizontal axis.

The splitter and combiner devices A, A' may include any pair of devices that meets the above requirements, including waveguide directional couplers and switches, MZIs, multimode interference couplers (MMIs), ring-resonator filters or other optical elements. A switch is a splitter device configured to assume alternatively a first and a second state, such that in the first state an optical radiation input only in the first input port is directed substantially solely to the first output port, and in the second state an optical radiation input only in the first input port is directed substantially solely to the second output port. The splitter and combiner devices A, A'may be wavelength-dependent over the wavelength band of interest, i.e., the OWR of the device. The splitter and combiner devices A, A' may be controllable in their splitting and combining operation, i.e., contain switches, tunable elements, etc.

In the case of non-reciprocal splitter and combiner devices A, A' (i.e., optical devices comprising non-reciprocal media that support Faraday rotation and non-reciprocal phase shifts), combiner device A' deviates from being structurally identical to splitter device A only in the aspect that any built-in or applied DC magnetic fields are reversed (i.e., opposite orientation of aligned magnetic dipoles) in the combiner device A' with respect to the splitter device A, as symbolically shown in FIG. 7. For non-reciprocal devices A, A', when doing the operation of reversing i.e., vertical symmetry mirror reflection, it will be assumed that any DC magnetic field is reversed as well. A pair of splitter and combiner devices structurally identical but one operating in reverse with respect to the other according to the above, shall be referred to as a "time-reversal pair." In the embodiments illustrated in FIGS. 6 and 7, this is accomplished by their mirror symmetric arrangement with respect to a vertical axis. FIG. 7 illustrates a general design for non-reciprocal devices A, A'. FIG. 7 is similar to FIG. 6 except that the combiner device A' has the opposite sign of built-in DC magnetic fields (illustrated as $H_{DC}$ in FIG. 7) with respect to DC magnetic fields of A.

The pair of optical paths 82, 84, e.g., waveguides, preferably provides a π radians phase shift difference between the two paths 82, 84 or waveguides, over the propagation length from splitter device A to combiner device A', over the wavelength spectrum of interest, i.e., the OWR of the device.

All designs with the above characteristics transmit all signals entering port $a_1$ into output port $b_1'$, or alternatively, all signals entering $a_2$ into port $b_2'$. This does not depend on the particular type of splitter and combiner devices A and A', nor on their wavelength dependence over the OWR, if any. Complete signal recombination is achieved at the output for all wavelengths within the OWR if: the splitter and combiner devices A, A' are lossless and are a "time-reversal pair", they are connected by two optical paths, e.g., waveguides, in the manner described and illustrated herein, and the π differential phase shift in the waveguides connecting the devices A, A' is broadband over the OWR.

The spatial diversity scheme described herein becomes useful, for example, for creating designs for hitless switching or FSR extension of integrated channel add-drop filters or hitless bypass of another type of optical device, when a first or a second functional optical device 86, 87 is inserted into first optical path 82 or second optical path 84, respectively. Optionally, several functional optical devices 86, 87 may be inserted into both first and second optical paths 82, 84 of the spatial diversity scheme between device A and A'. Each of the functional optical devices 86, 87 may be any optical element (e.g., section of straight waveguide, directional coupler, channel add-drop filter, amplifier, variable optical attenuator, etc.). When inserted, they preferably do not substantially modify the π differential phase shift between the optical paths 82, 84, over the OWR, the wavelength range that is desired to recombine in the output waveguide as provided by the described scheme. Alternatively, any phase distortion over the spectrum of interest that is introduced by the first or second functional optical device 86 or 87 in one of the first or second optical paths 82, 84, respectively, may be compensated by proper design of another second or first functional optical device 87, 86 for the purpose of compensation of phase distortion, e.g., an all-pass dispersion compensating filter, in either one of the first and second optical paths 82, 84.

The spatial diversity scheme described herein may provide the following advantages: (a) recombination of all input light at the output of the diversity scheme is not dependent on the particular type of input splitter device A and output recombiner device A' used. The described configuration provides complete recombination of signal that is split among two optical paths that is wavelength-independent (over an OWR) and device-parameter-independent. Thus, the property of the scheme to fully recombine all input radiation entering one device input port, after being split among two paths in an arbitrary manner, into one device output port is also not sensitive to wavelength dependence or fabrication error in parameters of the elements A and A', so long as they remain structurally substantially identical; (b) in case A and A' are variable, controllable optical devices (such as switches or tunable filters) the scheme here requires only symmetric (in unison) actuation of A and A', such that they remain structurally identical at all times, to achieve substantially complete recombination of optical radiation entering one device input at one device output at all times while varying the ratio of splitting of the optical radiation, at different wavelengths in the OWR, between the one optical path 82 and the other optical path 84, via control of the reconfigurable splitter and combiner devices. This provides an advantage over schemes that require a different and dependent adjustment of the output recombination element A' in response to the particular setting of the input splitter element A to ensure complete recombination into one output port. The latter active control schemes may be difficult to implement because of the possible complexity of the feedback and control. The scheme described herein is considerably simpler in that one may need only to ensure that A and A' are substantially identically actuated at any one time, making the control problem much simpler and more tractable.

The derivation of the concept design that follows is general, and encompasses a large class of splitter and combiner devices A, A', because it relies only on the losslessness property of the splitter and combiner devices A, A' in the sense defined, and time-reversibility, which is a known property of the Maxwell's equations that govern behavior of integrated optical devices (true even for non-reciprocal devices, if reversing DC magnetic fields is permitted). This is the reason why the presented scheme holds for both reciprocal and non-reciprocal splitter and combiner devices A and A', as shown below.

Optical splitter device A and combiner device A' are preferably substantially identical and substantially lossless 4-ports (except for having opposite DC magnetic fields if non-reciprocal media are used). A port is defined to correspond to a single optical mode of propagation that is accessible from the respective splitter device A or combiner device A', where usually each port will correspond to a guided optical mode, and each port may be associated with a different waveguide; the ports may be chosen in pairs such that substantially all power sent into any one port (belonging to one pair) is fully transmitted to two of the four ports (the other pair) with no reflection to the input port or to the second port in the pair including the input port. Low loss in transmission of A and A' is important only insofar as the phase relationship between the output ports is not significantly altered in comparison to that restricted by the lossless condition, as discussed further later in the text. In practice, errors up to ~30% in the phase produce tolerable deviation from complete recombination, resulting in incurred loss of <1 dB in the recombined output port, for any choice of splitting ratio in the splitting device A. Depending on the particular choice of device A, A', losses of the order of 50% (3 dB) may be tolerable, but for practical applications losses <10% are more preferable, and substantially lower losses <1% are even more preferable. In terms of reflection, for proper operation reflection levels less than −10 dB may be acceptable, although greater reflection suppression of >20 dB is more preferable. Preferably, each port is accessed by a single-mode waveguide, such that two input waveguides and two output waveguides are present. More generally, any structure may be used that provides the guided modes to serve as the two input or output ports, such as, for example, a two-moded waveguide for each of the input and output port sets.

The transmission response of a 4-port optical device A (and analogously A') with two input ports, two output ports (2×2) and with no reflection to input ports can be represented by a 2×2 matrix, $$\bar{b} = \bar{U} \cdot \bar{a} \quad (1)$$

$$= \begin{bmatrix} u_{11} & u_{12} \\ u_{21} & u_{22} \end{bmatrix} \bar{a}$$

where $u_{mn} \equiv |u_{mn}|e^{i\phi_{mn}}$, and where $\bar{a}=[a_1,a_2]^T$ are the input waveguide mode amplitudes and $\bar{b}=[b_1,b_2]^T$ are the output mode amplitudes (as shown in FIG. 6 and FIG. 7), normalized so that their square magnitudes represent the power. If in addition there is no loss, such that all power from inputs $\bar{a}$ is transferred to outputs $\bar{b}$, the matrix $\bar{U}$ is unitary ($\bar{U}^\dagger \bar{U}=\bar{I}$), and thus in the most general case takes the form, $$\bar{U} = e^{i\theta_o} \begin{bmatrix} \sqrt{1-\kappa}\, e^{i\theta_1} & i\sqrt{\kappa}\, e^{i\theta_2} \\ i\sqrt{\kappa}\, e^{i\theta_2} & \sqrt{1-\kappa}\, e^{i\theta_1} \end{bmatrix} \quad (2)$$

where there are four free parameters represented by real numbers $\kappa$, $\theta_0 \equiv (\phi_{11}+\phi_{22})/2$, $\theta_1 \equiv (\phi_{11}-\phi_{22})/2$ and $\theta_2 \equiv (\phi_{12}-\phi_{21})/2$. For any choice of these parameters the total output power equals the total input power, $\bar{b}^\dagger \bar{b} = \bar{a}^\dagger \bar{a}$ (i.e., $|b_1|^2+|b_2|^2 = |a_1|^2+|a_2|^2$).

The number of parameters in $\bar{U}$, as shown in equation (2), that may be freely chosen was restricted to four ($\kappa$, $\theta_0$, $\theta_1$, and $\theta_2$) by using the requirement of unitarity that $\phi_{11}+\phi_{22}-\phi_{12}-\phi_{21}=\pm\pi$. The $\pi$ phase in the previous relationship is important, and is related to the customary 90° phase lag of waves coupling each way across standard directional couplers. In fact, any general 2×2-port device with a particular set of the four parameters $\kappa$, $\theta_0$, $\theta_1$, and $\theta_2$ can be modeled at any one optical frequency as a particular ideal directional coupler.

In the following, the transfer matrix of the first optical splitter device A will be represented by the matrix $\bar{U}$. According to the requirements set out above for the splitter and combiner devices A, A', the analogous transfer matrix $\bar{U}'$ of device A' (defined by equation (1) with all variables primed) is found to be directly related to the matrix $\bar{U}$ of device A as, $$\bar{U}' \equiv \begin{bmatrix} u_{11}' & u_{12}' \\ u_{21}' & u_{22}' \end{bmatrix} \quad (3)$$

$$= \begin{bmatrix} u_{22} & u_{12} \\ u_{21} & u_{11} \end{bmatrix}$$

$$= e^{i\theta_o} \begin{bmatrix} \sqrt{1-\kappa}\, e^{i\theta_1} & i\sqrt{\kappa}\, e^{i\theta_2} \\ i\sqrt{\kappa}\, e^{i\theta_2} & \sqrt{1-\kappa}\, e^{i\theta_1} \end{bmatrix}$$

The transfer matrix $\bar{U}'$ of A' in equation (3) is the same as $\bar{U}$, but with the diagonal elements swapped – $\bar{U}'$ shall be called the "diagonal transpose" of $\bar{U}$. The term "diagonal transpose" of a 2×2 matrix $\bar{U}$, for purposes of this document, refers to a matrix whose diagonal elements, $u_{11}$ and $u_{22}$, are swapped. The equivalence of the specified configuration requirements for devices A and A' in embodiments of the inventive scheme with the stated relationship between their matrices $\bar{U}$ and $\bar{U}'$ is rigorously justified later on in the text.

The total transfer matrix of the device providing the spatial diversity scheme of FIGS. 6 and 7 involves the first element A ($\bar{U}$), the differential $\pi$ phase shift matrix associated with the two optical paths 82, 84, and the matrix $\bar{U}'$ of the second element A':

$$\bar{T} = \bar{U}' \begin{bmatrix} 1 & 0 \\ 0 & e^{i\pi} \end{bmatrix} \bar{U}. \quad (4)$$

The transfer matrix $\bar{T}$ is defined to relate outputs $\bar{c}=[c_1,c_2]^T$ and inputs $\bar{a}=[a_1,a_2]^T$, as $\bar{c}=\bar{T}\cdot\bar{a}$ (as shown in FIGS. 6 and 7). Further, using the general forms of $\bar{U}$ and $\bar{U}'$ in equations (2) and (3), without any assumptions about the free parameters, (4) becomes $$\bar{T} = e^{i2\theta_o} \begin{bmatrix} 1 & 0 \\ 0 & -1 \end{bmatrix}. \quad (5)$$

Since the magnitude of matrix elements $T_{11}$ and $T_{22}$ is unity and $T_{12}=T_{21}=0$, where minimal assumptions (unitarity) about the matrix $\bar{U}$ describing element A have been made, this shows that the scheme described is a general 2-way spatial diversity scheme that intrinsically recombines all input to one final output, independent of the particular type of 2×2 optical elements A and A' used, and independent of wavelength. A signal entering port $a_1$ is recombined in $c_1$ (i.e., $b_1'$), while that entering $a_2$ is recombined in $c_2$ (i.e., $b_2'$), according to equation (5). The property of complete signal recombination at the output is as broadband as the $\pi$ phase shift realization employed. The details of signal splitting between the two optical paths 82, 84 in FIG. 6, (wavelength dependence, fixed or controllable) depend on the particular 2×2 optical splitter and combiner devices A, A' used.

The parameters of matrix $\bar{U}$ describing the 2×2 optical splitter device A may be wavelength-dependent over the wavelength range of interest, i.e., the OWR, and/or controllable (e.g., a switch or tunable filter), i.e., $\bar{U}=\bar{U}(\lambda, p)$, where p parameterizes possible configurations for a dynamic element such as a switch (range of states) or tunable filter (center wavelength). Namely, $|T_{11}|^2=|T_{22}|^2=1$ for all $\lambda$ and p.

The complete recombination of wavelengths from an optical input spectrum entering one input port a1 or a2 of the device 80, into one output port b1 or b2, that is ensured by this scheme is preferably not be affected by arbitrary phase factors applied to each output port of the element A', since such phase factors do not affect the unity magnitude of the elements $T_{11}$ and $T_{22}$ of the total transfer matrix of the scheme as shown in equation (5). Although in cases where splitter and combiner devices A, A' are an exact "time-reversal pair" connected as in FIGS. 6 and 7 (upside-down), the transfer matrix describing device A' will be the "diagonal transpose" of the matrix describing device A, in the most general case, the general matrix $\overline{V'}$ for A' may further differ by arbitrary phases $\psi_1$ and $\psi_2$ in the first and second optical paths 82, 84, respectively, as follows:

$$\overline{V'} = \begin{bmatrix} e^{i\psi_1} & 0 \\ 0 & e^{i\psi_2} \end{bmatrix} \overline{U'} \quad (6)$$

$$= e^{i\theta_o} \begin{bmatrix} \sqrt{1-\kappa}\, e^{i\theta_1} e^{i\psi_1} & i\sqrt{\kappa}\, e^{i\theta_2} e^{i\psi_1} \\ i\sqrt{\kappa}\, e^{i\theta_2} e^{i\psi_2} & \sqrt{1-\kappa}\, e^{i\theta_1} e^{i\psi_2} \end{bmatrix}$$

where $\psi_1$, $\psi_2$ are arbitrary real numbers and may depend on (be a function of) wavelength. Since matrix $\overline{V'}$ is the same as $\overline{U'}$ except for arbitrarily different phase applied at output ports, one can call $\overline{V'}$ to be "output-phase-equivalent" to matrix $\overline{U'}$. Thus, the scheme of an embodiment of the present invention more generally includes a splitter device A described by a matrix $\overline{U}$ with arbitrary choice of its 4 free parameters $\kappa$, $\theta_0$, $\theta_1$, $\theta_2$ as specified in equation (2), a $\pi$ differential phase shift between the first and second optical paths 82, 84, and a combiner device A' with a matrix $\overline{V'}$, shown in equation (6), that is the "diagonal transpose" of chosen matrix $\overline{U}$ of the splitter device A, but with additional arbitrary phases $\psi_1$ and $\psi_2$ applied to the top and bottom rows of the matrix, respectively. This general scheme gives $|T_{11}|=|T_{22}|=1$, $T_{12}=T_{21}=0$, for all wavelengths and all choices of parameters $\kappa$, $\theta_0$, $\theta_1$, $\theta_2$ for splitter device A, and any additional arbitrary phases $\psi_1$, $\psi_2$ that may be chosen for the combiner device A'. In the remainder of the document, the preferable configuration using matrices $\overline{U}$ and $\overline{U'}$ will be used, with the understanding that in the more general case, the more general matrix $\overline{V'}$ replaces $\overline{U'}$, i.e., a more general combiner device A' is permitted without compromising the intended functionality.

In view of the described configuration of an embodiment of the inventive spatial diversity scheme in terms of transfer matrices, the corresponding desired physical configuration of the scheme may be stated in several equivalent ways. In the transfer matrix description above, the spatial diversity scheme of an embodiment of the present invention provides a first 4-port optical element A, with 2 input ports and 2 output ports, such that substantially all power sent into the input ports exits the output ports; in other words an element A described by a matrix of the form $\overline{U}$ in equation (2) with any choice of the 4 free parameters $\kappa$, $\theta_0$, $\theta_1$, $\theta_2$; where these parameters can vary with wavelength within the OWR and, if the optical device A is reconfigurable, with time. It is further required to provide a second 4-port optical element A', with 2 input ports and 2 output ports, and described by a matrix $\overline{V'}$, where the matrix $\overline{V'}$ is equal to $\overline{U'}$, the "diagonal transpose" of matrix $\overline{U}$ that describes the first element A, or is alternatively any matrix that is "output-phase-equivalent" to $\overline{U'}$. Further, it is required to connect output $b_1$ of device A to input $a_1'$ of device A', and output $b_2$ of A to input $a_2'$ of A' whereby the two previously described connecting paths preferably introduce a $\pi$ differential optical propagation phase between them. Inputs and outputs are numbered herein such that the subscripts 1 and 2 indicate respectively the top and bottom component of the input and output vector (see equation (1)), and correspond to the bottom 82 and top 84 waveguides, respectively.

A second equivalent physical description may be made. In the case where reciprocal devices A and A' are used, A and A' are preferably structurally identical (setting the additional arbitrary phases $\psi_1=\psi_2=0$). Then, the scheme simplifies to: a first 4-port substantially lossless 2×2 optical element A (one described by a matrix of form $\overline{U}$) with ports P, Q, R, S, where P, Q are inputs and R, S are outputs; a second element A' that is identical to A with the corresponding ports P', Q', R', S', but where now R', S' are used as input ports and P', Q' are used as output ports (corresponding to vertical-axis mirror reflection of A' with respect to A in FIGS. 6, 7); elements A and A' being connected by waveguides connecting port R to port S', and port S to port R' (corresponding to horizontal-axis mirror reflection of A' with respect to A in FIGS. 6 and 7); finally, the optical connection paths R-S' and S-R' imposing a $\pi$ relative phase difference in propagation. The two mirror reflections (vertical and horizontal) implied in the context of the arrangement of A' and A in FIGS. 6 and 7 are equivalent to a 180-degree rotation of A' with respect to A.

The required "diagonal transpose" relationship of matrix $\overline{U'}$ of element A' to matrix $\overline{U}$ of element A, stated in equation (3), can be derived as follows, without any loss of generality for the claimed invention.

An element A that splits radiation entering a single input port into two arbitrary parts, if viewed with time running backwards, may intuitively be seen as having radiation propagating in the opposite direction and retracing its path to recombine the two separated parts back into the single input. This "time-reversed" operation is permitted by Maxwell's equations that govern the electromagnetic device operation, if the magnetic fields are reversed. The time-reversed solution of the device A (with a transfer matrix subscripted by tr), is analogous to "running the movie" of the propagating electric and magnetic fields backwards. In that solution, the outputs become the inputs ($\overline{b}^* \to \overline{a}_{tr}$), the inputs become the outputs ($\overline{a}^* \to \overline{b}_{tr}$) and the time-reversed transfer matrix is $\overline{U}_{tr} = [\overline{U}^*]^{-1}$, and the asterisk indicates complex conjugation. In addition, in the time-reversed solution, just as the mode amplitudes $\overline{a}$, $\overline{b}$ are conjugated (so that a relative phase delay between ports in forward operation becomes reversed in time-reversed operation, as required), so the material properties (respective dielectric permittivity and magnetic permeability phasor tensors) are conjugated as $\overline{\overline{\epsilon}} \to \overline{\overline{\epsilon}}^*$ and $\overline{\overline{\mu}} \to \overline{\overline{\mu}}^*$. It is known that for lossless media $\overline{\overline{\epsilon}} = \overline{\overline{\epsilon}}^\dagger$, $\overline{\overline{\mu}} = \overline{\overline{\mu}}^\dagger$, where the dagger superscript indicates the complex conjugated, transposed matrix, and for reciprocal media $\overline{\overline{\epsilon}} = \overline{\overline{\epsilon}}^T$, $\overline{\overline{\mu}} = \overline{\overline{\mu}}^T$, where T superscript indicates the transposed matrix. Thus, for optical components composed of lossless, reciprocal media over the OWR, $\overline{\overline{\epsilon}}$ and $\overline{\overline{\mu}}$ are real tensor functions of space over the OWR, giving the material spatial distribution representing the device, and the time-forward and time-reversed solution are supported by one and the same structure. For non-reciprocal lossless media, the time-reversed solution is supported by a structure with reversed orientation of the built-in (and any applied) DC magnetic fields in the material.

The above suggests that cascading a splitter device A and its time-reverse structure (in the context of FIGS. 6 and 7, where propagation is from left to right—mirror image about the vertical axis, and conjugated $\overline{\overline{\in}}$, $\overline{\mu}$) may permit one to recombine the split signal back into one waveguide by the symmetry. The problem remains, however, that the relative phase delay between the signals split at the outputs of the splitter A is preferably reversed prior to entering the second element, as described. While the solution to this may be attempted by design of the interconnecting waveguides to introduce the correct phase difference, any such designs depend on the particular structure A and are particularly complicated for devices with wavelength dependence over the spectrum of interest and for dynamic devices where they need to further dynamically adjust to the state of structure A. However, it may be noted by comparing the left and right columns of the general form of matrix $\overline{U}$ in equation (2) that, disregarding the common phase $\theta_0$, applying an input signal to the second input port results in the same splitting ratio, but in a port phase difference of $$\frac{\pi}{2} + (\theta_1 + \theta_2)$$

in the two output ports, in comparison to $$\frac{\pi}{2} - (\theta_1 + \theta_2)$$

when the first input is excited. Therefore, the time-reversed version of the first device A with the second input port excited, when cascaded after the first device A with its first input port excited, cancels the variable phases $\theta_1, \theta_2$ to yield a total phase difference of $\pi$. This remaining difference of $\pi$ is independent of the particular device A and is compensated in embodiments of the inventive scheme by proper design of the waveguide pair connecting the two devices A and A' to compensate the $\pi$ phase shift difference between the ports over the OWR, the wavelength band of interest. From equation (2), one also notes that the splitting ratio is the same when the first or second input port is excited, but that the fraction of light in each output port is opposite in the two respective cases. Therefore, in order for the time-reversed structure A' to recombine the signals split by structure A, the ports subscripts 1 and 2 for ports of the second structure A' are preferably further reversed with respect to the first structure A. Referring to FIGS. 6 and 7, this is the reason for the additional mirror reflection, with respect to a horizontal axis, of A' in relation to A, in embodiments of the inventive scheme.

Thus, the spatial diversity scheme presented herein is built from one 2×2 optical element A, followed by a differential $\pi$ phase shift in the output optical paths, and a time-reversed combiner version A' of the splitter device A such that, in addition, the output ports $b_{1,2}$ of the first element A are connected to their respective equivalent ports in the combiner device A' in swapped order, that is to the time-reversed inputs $a'_{1,2}$, respectively in that order (as shown in FIGS. 6 and 7). The total transfer matrix of the device providing the spatial diversity scheme involves the first element A ($\overline{U}$), the differential $\pi$ phase shift matrix, and the matrix of the second, time-reversed element ($\overline{U}_{tr}$), plus two matrices around $\overline{U}_{tr}$ to account for the swapping of signal-path-indicating port subscripts 1 and 2 in device A' (i.e., the mirror-reflection about a horizontal axis of A' with respect to A in FIGS. 6 and 7):

$$\overline{T} = \begin{bmatrix} 0 & 1 \\ 1 & 0 \end{bmatrix} \overline{U}_{tr} \begin{bmatrix} 0 & 1 \\ 1 & 0 \end{bmatrix} \begin{bmatrix} 1 & 0 \\ 0 & e^{i\pi} \end{bmatrix} \overline{U}. \tag{7}$$

This is the same transfer matrix $\overline{T}$ as that in equation (4), and thus the first three matrices represent the total transfer matrix $\overline{U'}$ of element A'. Matrix $\overline{U}_{tr}$ (subscripted 'tr' to indicate the time-reversed character of A' with respect to element A) represents the mirror reflection about the vertical axis of element A' with respect to element A, while the pre- and post-multiplication [0,1;1,0] matrices represent the additional mirror reflection about the horizontal axis of A' with respect to A. Using unitarity of $\overline{U}$, the time-reverse transfer matrix $\overline{U}_{tr}$ is found to be the transpose of $\overline{U}$, $\overline{U}_{tr} \equiv [\overline{U}^*]^{-1} = \overline{U}^T$, and by comparing equations (4) and (7), the transfer matrix $\overline{U'}$ for A' is $$\begin{aligned} \overline{U'} &= \begin{bmatrix} 0 & 1 \\ 1 & 0 \end{bmatrix} \overline{U}_{tr} \begin{bmatrix} 0 & 1 \\ 1 & 0 \end{bmatrix} \\ &= \begin{bmatrix} 0 & 1 \\ 1 & 0 \end{bmatrix} \overline{U}^T \begin{bmatrix} 0 & 1 \\ 1 & 0 \end{bmatrix} \\ &= \begin{bmatrix} u_{22} & u_{12} \\ u_{21} & u_{11} \end{bmatrix}. \end{aligned} \tag{8}$$

Thus, the transfer matrix $\overline{U'}$ for A' is shown to be the diagonal transpose of the matrix $\overline{U}$ for element A, as previously stated.

It is noted that in the case where the splitter device A, together with the reference planes used to define its ports, is invariant for vertical symmetry mirror reflection, its associated transfer matrix has the two off-diagonal elements equal, so that the transposed matrix is the same as the starting matrix. In this case, following equation (8), according to an embodiment of the invention, the transfer matrix of the combiner device A' is simply obtained by pre- and post-multiplication of $\overline{U}$ by [0,1; 1,0] matrices (defined as the 'full transpose', wherein the two elements of the diagonal are swapped and also the two elements of the off-diagonal are swapped), which is equivalent to doing a mirror reflection with respect to a horizontal axis (A' is up-side-down with respect to A).

Applications of the embodiments of the inventive spatial diversity scheme 80, as described, include schemes for the hitless reconfiguration of optical components and free spectral range extension of optical filters. For hitless reconfiguration of channel add-drop filters, the spatial diversity scheme can be used to switch the entire broadband input signal within an OWR between one optical path that contains the filter, and the other optical path that does not, to permit wavelength reconfiguration of the filter without disturbing other wavelength channels during the reconfiguration. Embodiments of the present invention provide hitless switching because the output $c_1$ contains the signal exciting input $a_1$ before, during, and after the splitter and combiner devices A, A' are actuated in unison to switch light propagation fully from one path, e.g., path 82 in FIGS. 6 and 7, to the second path 84. Then, the optical filter 86 is free to be reconfigured in any way desired before the signal in the bypass path 84 is redirected back through it, without disturbing the optical spectrum during reconfiguration. For example, the filter may be tuned from one to another wavelength, without affecting any intermediate wavelength channels during the tuning process.

Figure 8:
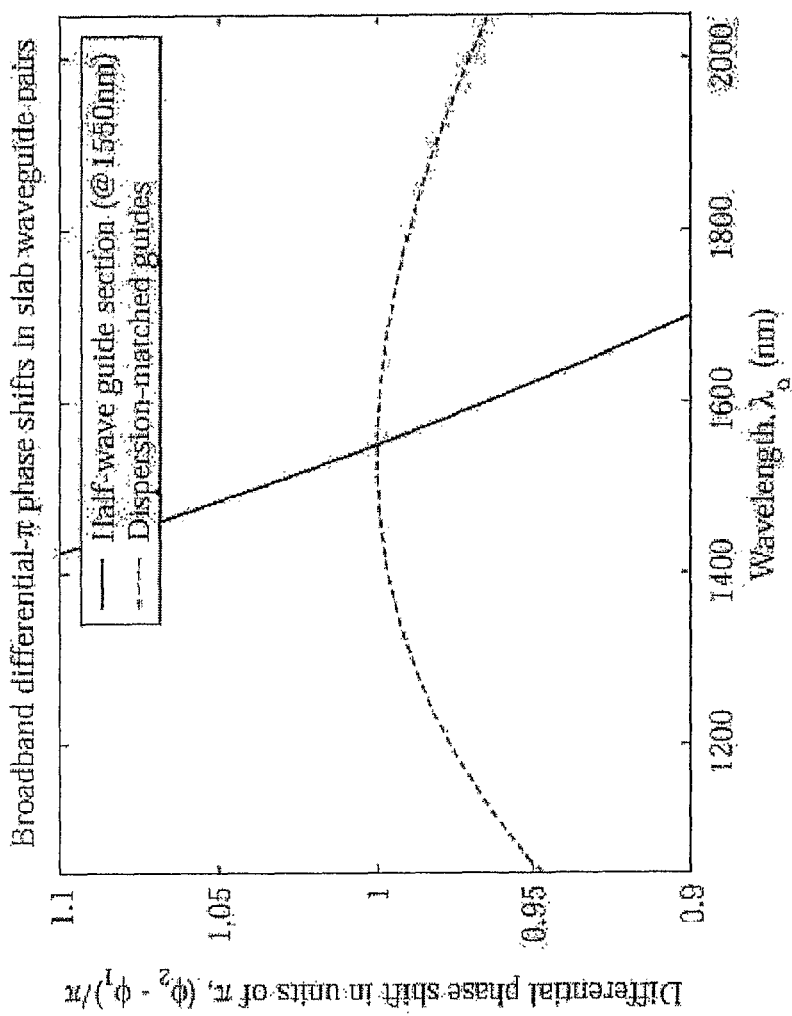
FIG. 8 is a graph illustrating broadband differential-π phase shifts in slab waveguide pairs.

The π phase shift required in the scheme is addressed in the following. The simplest realization is a half-guided-wavelength (at center-band) extra-length of optical path, e.g., waveguide section, e.g., in second optical path 84 relative to the first optical path 82. The guided wavelength of the propagating mode is related to its propagation constant β as $\lambda_{guide}=2\pi/\beta$. A half guided-wavelength is equivalent to a π phase shift. Waveguide dispersion causes the phase shift to vary with wavelength, but the short length guarantees a reasonably large bandwidth. For example, identical cross-section slab waveguide arms with core index 2.2, cladding index 1.445 and thicknesses of 0.5 μm (TE) give less than 5% deviation in the π shift over 140 nm bandwidth, as shown in FIG. 8, which corresponds to a negligible loss in recombining the total power and negligible "hit" loss (if used for hitless switching), as shown in FIG. 9.

Figure 9:
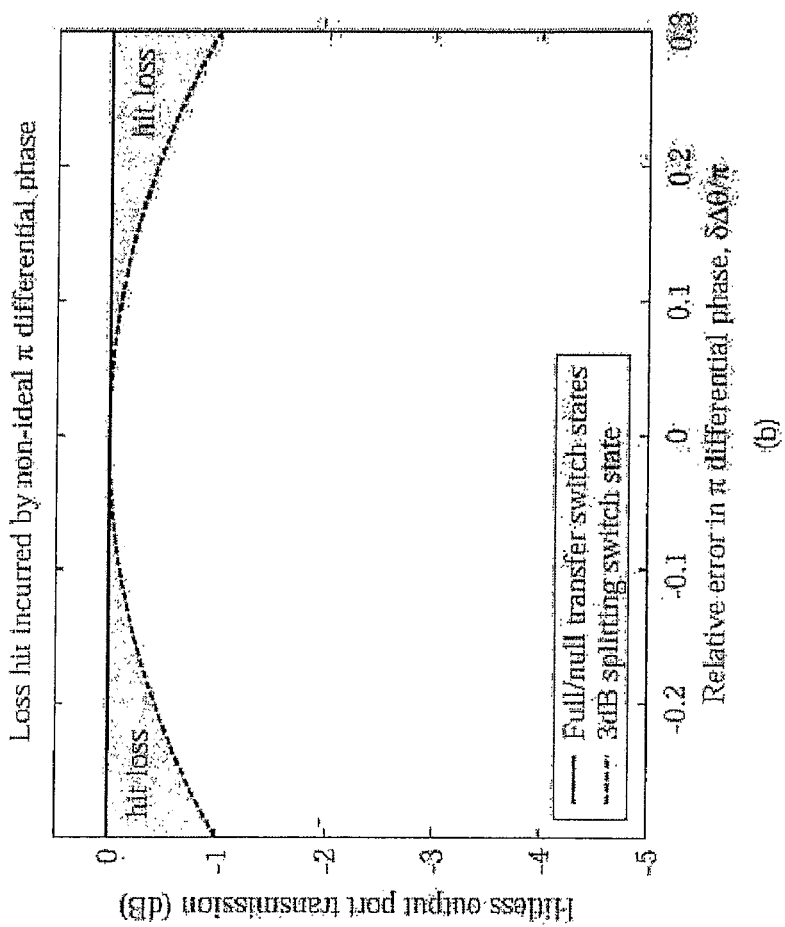
FIG. 9 is a graph illustrating loss incurred by non-ideal π differential phase.

Referring to FIG. 9, the effect of error in the differential phase shift of π radians is investigated. The range of possible insertion losses due to incomplete recombination of output signals by the combiner device is indicated for a range of fractional error in the differential π phase shift of the scheme. It is shown that less than 1 dB loss in recombination at the splitter is obtained for up to 30% deviation from the ideal π differential phase shift, substantially less than 0.2 dB for less than 10% deviation, and virtually no excess loss for under 5% deviation. This gives the requirement for realization of the differential π phase shift. Preferably a phase shift between 0.7π and 1.3π is to be realized, more preferably between 0.9π and 1.1π, and even more preferably between 0.95π and 1.05π, e.g., π. The largest loss in recombination is seen when the splitting ratio of the splitter device is near 1:1. In contrast, virtually no loss is present in cases where the splitter device substantially transfers all power to one or the other optical path, because the interferometric character of the device is not important in that case.

Referring again to FIG. 8, for wider bandwidths or lower hit loss, the dispersion of the waveguides in the two interferometer arms may be engineered by using non-identical cross-sections. If the two waveguides 1 and 2, i.e., first and second optical paths 82 and 84 in FIGS. 6 and 7, have lengths $L_1$ and $L_2$, then in the ideal case, $\beta_1(\omega)L_1-\beta_2(\omega)L_2=\pi+2\pi m$. In a band of interest near $\omega_0$, a first-order Taylor-series expansion of β(ω) in frequency detuning δω yields two requirements:

$$\beta_1(\omega_0)L_1 - \beta_2(\omega_0)L_2 = \pm\pi + 2\pi m \quad (12)$$

$$\left.\frac{\partial\beta_1}{\partial\omega}\right|_{\omega_0}L_1 - \left.\frac{\partial\beta_2}{\partial\omega}\right|_{\omega_0}L_2 = 0 \quad (13)$$

Such waveguide designs are realizable. For example, a pair of slabs as above, this time of identical length $L_1=L_2=6.5$ μm, but widths of 0.5 μm and 0.9 μm, yields a differential πphase shift within 5% over more than 900 nm, as shown in FIG. 8. However, with guides of non-identical design, loss in the two arms (e.g., sidewall roughness loss) can be different and cause imbalance in the switch. Care is required in design to ensure balanced arm losses. For short-length waveguides this may not pose a problem. A second issue is that the device 180 inserted into the switch, such as a channel add/drop filter, may alter the phase balance. If the device adds phase and dispersion over the wavelength range of interest, it may be compensated by design in the second arm (by altering the design of that waveguide or inserting a designed phase-compensating device) to restore the π shift.

The operation of the diversity scheme that ensures that all signal split into two optical paths by a splitter device is recombined back into a single optical path by a combiner device has been described above. In the following, several optical device designs that extend the FSR of a resonant filter according to embodiments of the present invention are described.

In general, a filter is placed within one optical path of the diversity scheme (e.g., device "$f_1$" in FIGS. 6 and 7), and devices A and A' in FIGS. 6 and 7 are designed and configured to have unity transmission to the waveguide containing the filter at a wavelength coincident with a resonant wavelength passband of the filter, and to have null transmission to that waveguide at one or more of the adjacent resonant wavelength passbands of the filter (one or more FSRs away), such that the signal at the adjacent wavelengths bypasses the filter via the second optical path of the diversity scheme and the effective FSR of the filter is extended. Several embodiments are also described.

Figure 10:
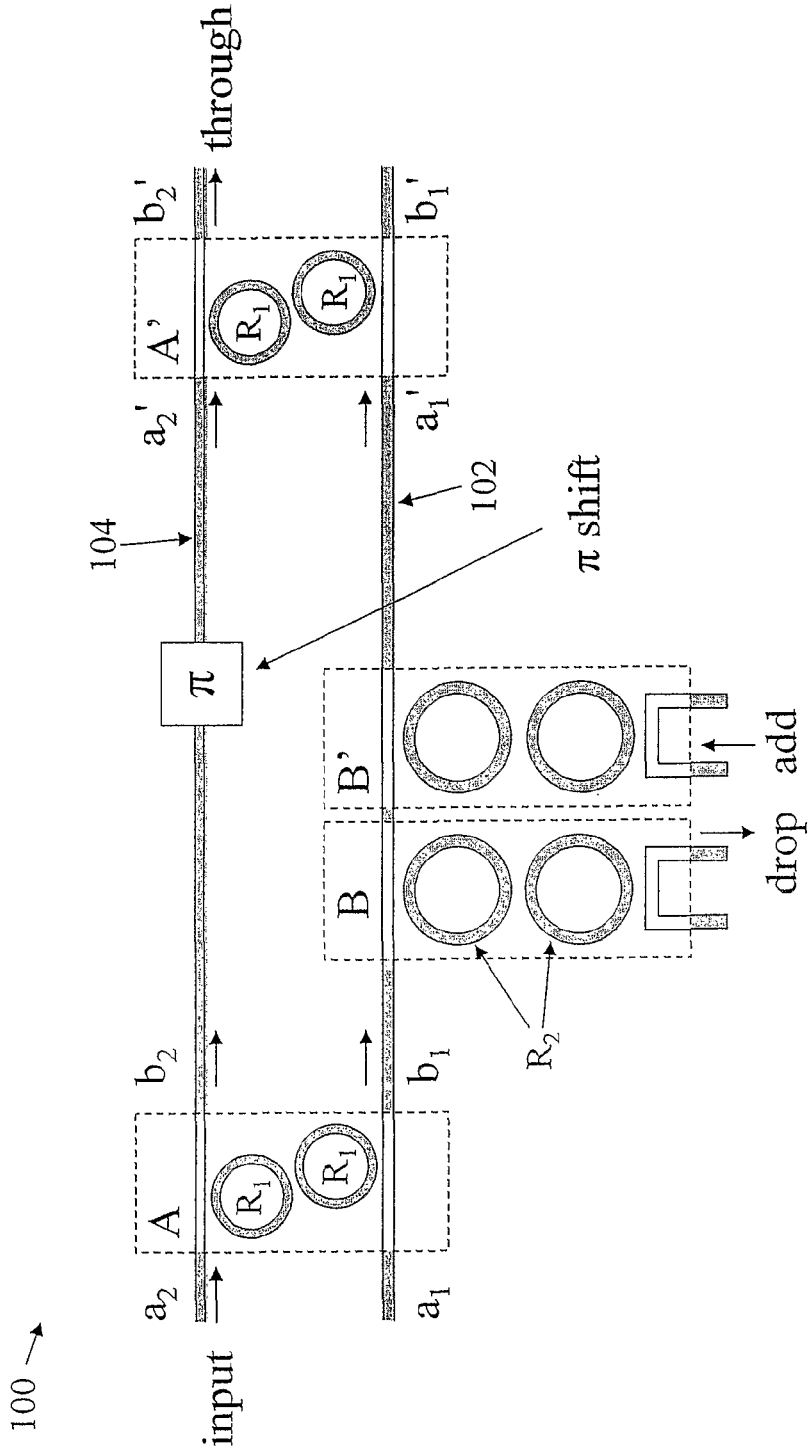
FIG. 10 is a schematic diagram of an exemplary π-shifted Vernier scheme according to the present invention.

Referring to FIG. 10, a Vernier filter design 100 uses identical ring resonator filters with one FSR (FSR1) as the splitter and combiner devices A and A', and a different ring resonator filter with another FSR (FSR2) as the filter whose FSR is being extended. A π phase shift between the two optical paths 102, 104 is ensured, according to the scheme illustrated in FIGS. 6 and 7. The embedded filter whose FSR is being extended consists, in this case, of two 2-ring filter stages, B for channel-drop and B' for channel-add, respectively. The advantage of this configuration of the complete device 100 is that this is a device of the type shown in FIGS. 6 and 7, and therefore all input light incident in port a2 in FIG. 10 is split among the two optical paths 102, 104 and recombined in port b2', in the absence of a filter B, B'. With the filter B, B' present, the recombined output signal is missing only where the filters B, B' extract the drop channel. Here, it is necessary that filters B, B' do not introduce significant phase dispersion into the bottom optical path 102 at wavelength channels other than the drop wavelength, or that such phase dispersion be compensated, in order to ensure a π phase difference between the waveguide paths at all wavelengths and thus maintain complete recombination of the signal at all wavelengths, except those at which appreciable signal is dropped by filter B-B', into a single port (b2' in this case).

Figure 11:
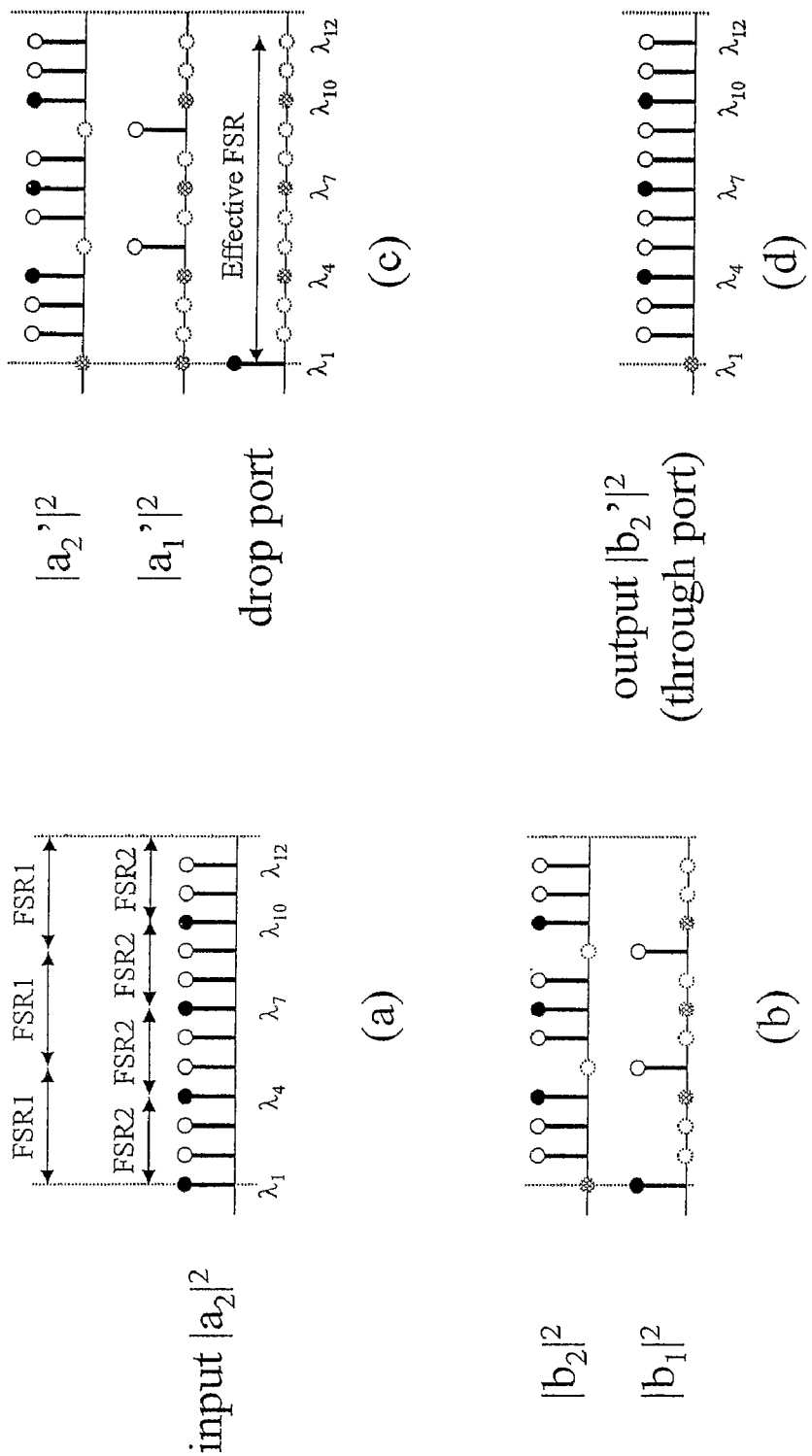
FIGS. 11a-11d are graphs illustrating the operation of the Vernier scheme of FIG. 10.

The operation of the filter 100 is schematically illustrated for the case of a 12-channel WDM spectrum in FIGS. 11a-11d. Filters A, A' have FSR1 that spans M=4 channel spacing intervals, while filter B has FSR2 that spans N=3 channel spacings (indicated in FIG. 11 by filled black circles). Part of the optical spectrum is illustrated in FIG. 11a with MN=12 labeled wavelength channels, covering one desired total effective FSR of the device, i.e., its intended OWR of MN=12 channels. A broadband signal enters input $a_2$ (FIG. 11a); wavelengths $\lambda_1, \lambda_5, \lambda_9 \ldots$ (separated by FSR1) are all dropped by splitter device A, here a filter, to port $b_1$ while the rest continue along port $b_2$ (FIG. 11b). Then, since only one of the channels in $b_1$ ($\lambda_1$ in this case) is aligned with a resonance of the drop filter B-B', one channel ($\lambda_1$) is dropped by filter B-B', while the remainder ($\lambda_5, \lambda_9, \ldots$) continue on to $a_1'$ (FIG. 11c), with preferably little amplitude change or phase dispersion due to the filter B-B'. Finally all of the wavelengths not dropped by B-B' ($\lambda_5, \lambda_9$, and all wavelengths in the top optical path) recombine into the output $b_2'$ (FIG. 11d). The filters A and A' are such that they either fully drop a channel into the bottom optical path or leave it fully in the top optical path, with no channels being substantially split between the two waveguides.

Figure 12:
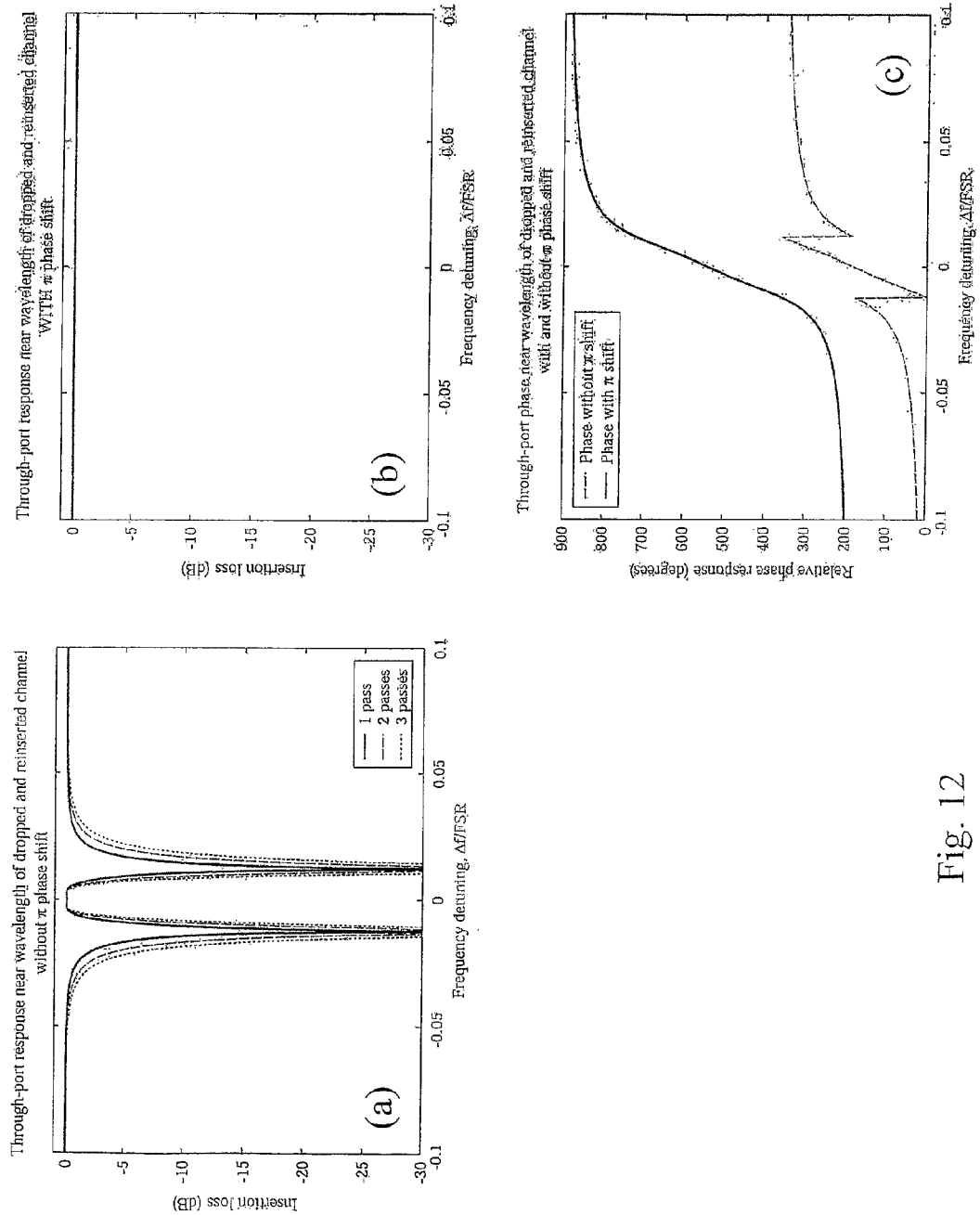
FIGS. 12a-12c are graphs illustrating through-port response near wavelength of dropped and reinserted channel with and without a π-phase shift.

FIG. 12a shows the total device through-port response, $|b_2'/a_2|^2$, for a particular example filter 100, over a part of the OWR that includes a channel that is dropped and reinserted, such as channel $\lambda_5$ or $\lambda_9$ in the illustrative example of FIG. 11. The responses in FIG. 12 were computed for 2-ring filter blocks A and A' as illustrated in FIG. 10 with identical 10% ring-bus power couplings and 0.3% ring-ring power coupling. The frequency may be normalized to the FSR, as in the plots in FIG. 12, and the character of the spectral response is the same independent of the particular choice of ring-resonator radius, i.e., FSR, of the filter B-B'. If a channel is dropped and reinserted several times as it passes through a cascade of several OADMs, and in each OADM through a device that operates as illustrated in FIG. 11, but without a $\pi$ phase relationship between the two optical waveguide paths, such as the configuration in FIG. 3, significant loss can accumulate near the channel edges of channels such as $\lambda_5$ and $\lambda_9$ and can affect performance. The effect of two and three passes is shown in FIG. 12a. In the proposed device in FIG. 10, on the other hand, the addition of the broadband $\pi$ phase shift relationship between the two optical paths 102, 104 ensures that all channels not dropped by filter B completely recombine at the output b2' without these channel-edge artifacts, as shown by the perfectly flat spectrum in the vicinity of the same dropped and reinserted channel in FIG. 12b.

The signals passing the top optical path 104 along a2-b2-a2'-b2' experience typically little dispersion. Near the dropped and reinserted channels, on the other hand, the phase response in the through port b2' of both cases ($\pi$ shift and no $\pi$ shift) is shown in FIG. 12c. The slope of the phase determines the group delay and is the same in the two cases. Because the group delay is relatively flat over the passband of the filter (linear phase), the signals passing the bottom optical path 102 along a2-b1-a1'-b2' can also see acceptably low dispersion if the filters are designed to be flat-top such as the ones in this example, because the signal traverses through the passband of two flat-top filters (A and A'). Flat-top filters can be designed to have acceptably low dispersion in the drop port as evidenced by their use to drop wavelength channels. On the other hand, this scheme does introduce a sizeable group delay when passing through splitter and combiner devices A, A', that act as filters. Thus, if the splitter and combiner devices A, A' have resonator losses, this scheme does introduce some insertion loss into those express channels traversing the a2-b1-a1'-b2' path, because a larger group delay indicates a longer propagation time in the presence of propagation loss, tending to accumulate greater insertion loss.

Referring again to FIG. 10, a detailed example of a design of an embodiment of the inventive scheme is provided. Again, a 4 THz WDM optical spectrum is taken, assuming 40 WDM channel slots spaced by 100 GHz. A 4 THz FSR is difficult to achieve in ring resonators, due to the small radii required (FSR=c/($2\pi R\, n_g$)) on the order of only a few microns (~3-6 µm), where dimensional tolerances and/or bending losses tend to be significant. Using the proposed scheme, splitter and combiner devices A, A' consist of third-order ring resonator filters and employ rings with 1 THz FSR (M=4), while devices B, B', constituting the add-drop filter, have the same passband design but employ rings with 800 GHz FSR (N=4). Such ring FSRs have been demonstrated to be achievable in practice. The 3-ring filter designs for devices A, A' and B, B' are identical to those of the comparative example of FIG. 4, and employ the same respective ring-bus and ring-ring power coupling coefficients cited earlier for that example, relating to FIGS. 4, 5. FIG. 13a shows the drop port response 105 of the individual splitter stage A with its 1 THz FSR spaced passbands (gray line), as well as the drop and through ports 106, 107 of the total device (solid lines). Extension of the FSR to M*FSR1=N*FSR2=4 THz is achieved with >50 dB rejection of spurious resonances. The through port transmission 107 is uniformly unity at all wavelengths except at the drop-channel wavelength, as ensured by the above spatial diversity scheme involving substantially identical splitter and combiner devices and a $\pi$ phase shift in the optical paths connecting them. Specifically, there are no troughs in the transmission characteristic near the band edges of a bypassing channel, dropped by A and reinserted by A', as seen by comparing FIG. 13c to FIG. 4c. In addition to providing zoom-in representations of the total device 100 drop and through port responses 106, 107 at the channel-drop and the adjacent suppressed resonance, FIGS. 13b and 13c show the drop and through port responses 108, 109 of a single 3-ring filter such as that employed in splitter A and combiner A'. Therefore, the present configuration 100 provides an improved design for Vernier extension of the FSR of a filter because it has substantially unity transmission, in the ideal case, at all wavelengths in the OWR except for the dropped channel. This makes it more scalable as the signal may pass many OADMs without amplitude degradation, even near the channel band edges. It is noted that in general the combiner device A' is oriented with respect to splitter device A as shown in FIGS. 6 and 7. In the embodiment where, as illustrated in FIG. 10, signals propagate from left to right and the device A is invariant with respect to a horizontal and a vertical symmetry axis, the combiner device A' is a then simply a laterally translated copy of the splitter device A. The group delay and dispersion responses within channel bands of the present filter in FIG. 10 are substantially the same as those computed in FIG. 5 for the example of FIG. 3. Express channels that are dropped by both A and A' to traverse the bottom optical path 102 in FIG. 10 see twice the dispersion and group delay seen in a passband of a single filter stage A. This group delay and dispersion of a ring-based filter can be designed to be tolerable, but they may limit the number of OADMs, containing such FSR-extended filters as in FIG. 10, that can be cascaded. Furthermore, an uneven distribution of dispersion and group delay may result among the express channels. It is desirable to investigate schemes that are low in or free of excess group delay and dispersion.

It is noted that the present scheme enables wavelength tuning of the FSR-extended add-drop filter's spectral response by requiring only much smaller wavelength tuning of each of the splitter and combiner devices, and of the add-drop filter. That is, each device A, A', B and B' may be tunable over one complete FSR the respective device A, A', B, and B. For example, if resistive heaters, enabling thermo-optic tuning, are placed on top of a suitably thick overcladding covering the ring filters in devices A, A', B, B', the temperature change is used to change the refractive index and thus the propagation constant and resonant frequency of the ring resonators. The heaters may be actuated to cover a 1 THz tuning range for devices A, A' and a 800 GHz tuning range for devices B, B', enabling one to configure a single drop resonant passband of the total filter over the entire 4 THz, by suitably aligning a chosen resonant passband of each of devices A, A' and B, B'. Furthermore, requiring a smaller tuning range for each element means that the temperature control is less sensitive, enabling the device to be held to a particular passband wavelength position, determined by the ring resonant frequency, with better accuracy. For example, it is a simpler requirement to control a ring to within +/−5 GHz in 800 GHz than to within +/−5 GHz out of the full 4 THz effective FSR. The latter would be required if one desired, for example, to use a single 3-ring-resonator filter like B, but with 4-THz FSR microring resonators, and tune the passband across the entire 4 THz spectrum.

Group delay and dispersion in the FSR extension scheme of FIG. 10 are significant in those express channels that are resonant with passbands of splitter A and combiner A', and are thus dropped by splitter A and reinserted by A', passing in the bottom optical path 102. The dispersion seen by these express channels is regulated by the shape of the passband for resonant filters of this kind, as required by causality and the Kramers-Kronig relationship between amplitude response and phase response. Thus, the narrow bandwidth of the drop filters A, A' requires a group delay proportional to the inverse of the bandwidth. Wider filters can reduce the group delay, and filters with less sharp rolloff (less box-like passbands) would impose smaller dispersion. Furthermore, in the scheme 100, the bandwidths of A, A' are chosen in such a way that the filter drops every Mth channel to the bottom optical path 102, and leaves the other channels fully in the top optical path 104. Thus each channel is either fully passed by A and A' to the respective through ports relative to the input port, or fully dropped by both, and none of the channels is substantially divided between the top and bottom optical paths 102, 104, e.g., top and bottom optical waveguides.

The proposed spatial diversity scheme in FIGS. 6 and 7 was applied in the device design in FIG. 10 to ensure that even at the band edges, when the signal is divided between the two waveguides, it recombines fully in the through port, at all wavelengths. This approach, enabled by the spatial diversity scheme presented herein, enables the consideration of schemes where splitting and recombining devices are permitted to split the channels in arbitrary proportion between the top and bottom optical paths. Then, to reduce group delay and dispersion introduced by the splitter/combiner devices, it is desirable to: (1) use wideband splitter and combiner devices A, A', with smoothly varying passbands; and (2) to avoid use of feedback resonance that produces a non-linear phase spectrum leading to dispersion. This is in contrast to band-splitting schemes where each channel is typically fully routed either via one optical path or via a second optical path. In particular, in the present spatial diversity scheme it would be of advantage to use substantially linear phase filters for splitter and combiner devices, to reduce dispersion and have uniform group delay, but it is shown that even the use of non linear-phase filters for A, A' can result in a complete diversity scheme that has substantially linear phase to the final output, and thus low dispersion and flat group delay, if the filters in A and A' are feed-forward-type filters. Feed-forward-interferometer-type filters typically have rounder, less selective passbands with slower rolloff than resonant filters of comparable complexity. However, the present diversity scheme enables consideration of such filters as splitter and combiner devices A and A' because it enables channels that are partially split among the top and bottom optical paths to be fully recombined. Thus the slow rolloff characteristic of such devices may be tolerated so long as they can provide full transmission to one optical path at one filter resonance, and a transmission null at the adjacent filter resonance.

In the present designs, dispersion due to the structure of the filtering elements in the splitter and combiner devices and in the add-drop filter is considered because dispersion induced by such elements is typically a dominant source of dispersion. In integrated optical waveguide devices, waveguide dispersion is another source of dispersion. The designs presented reduce the structural dispersion of the filter. The waveguide dispersion is ignored because it does not substantially change the response of the designs, except that the waveguide dispersion may be added to the total dispersion seen by the filters. This will mean that some of the zero-dispersion designs that follow will have small waveguide dispersion.

Figure 14:
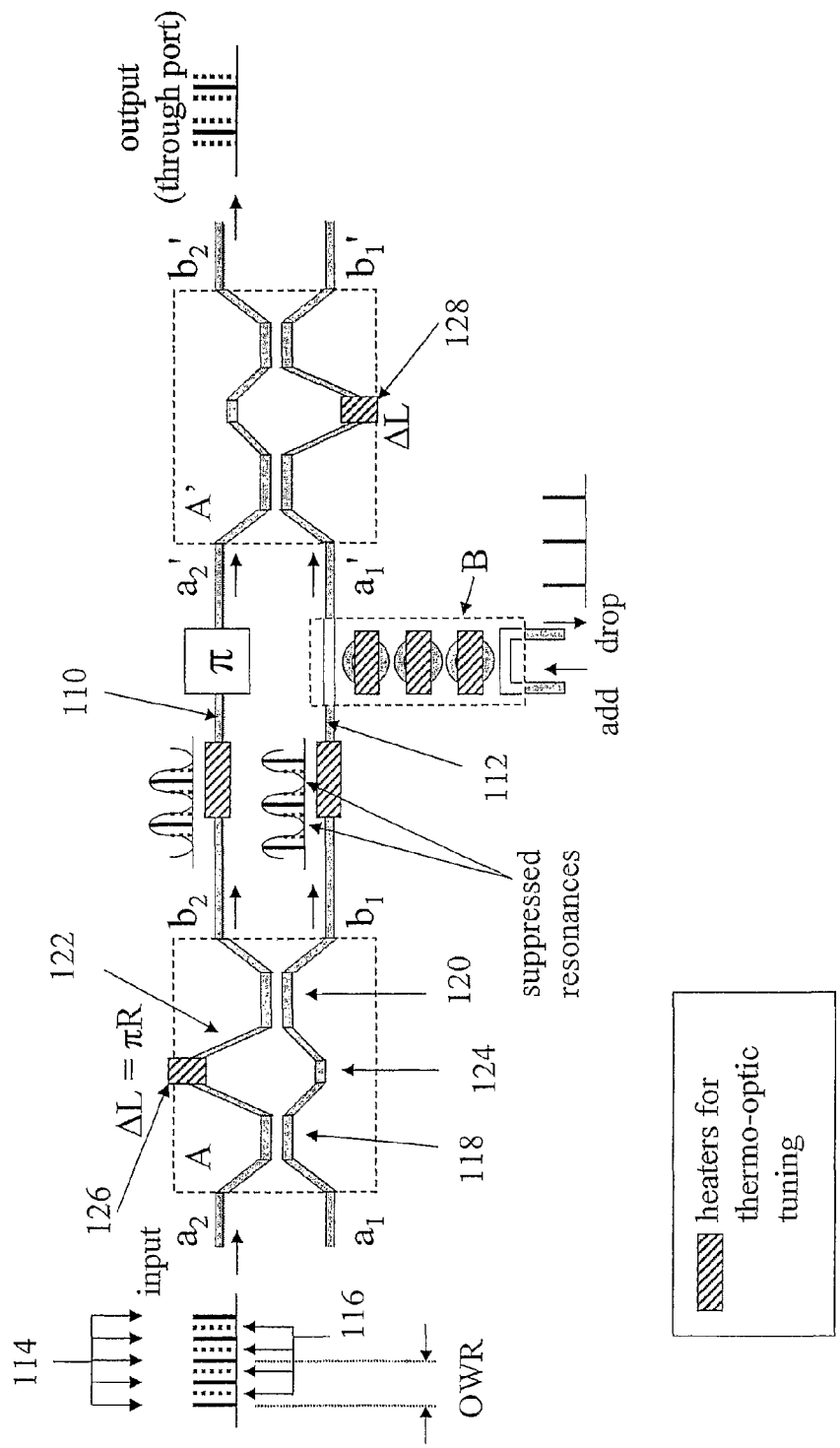
FIG. 14 is a schematic diagram of an exemplary MZI FSR extension.
Figure 15:
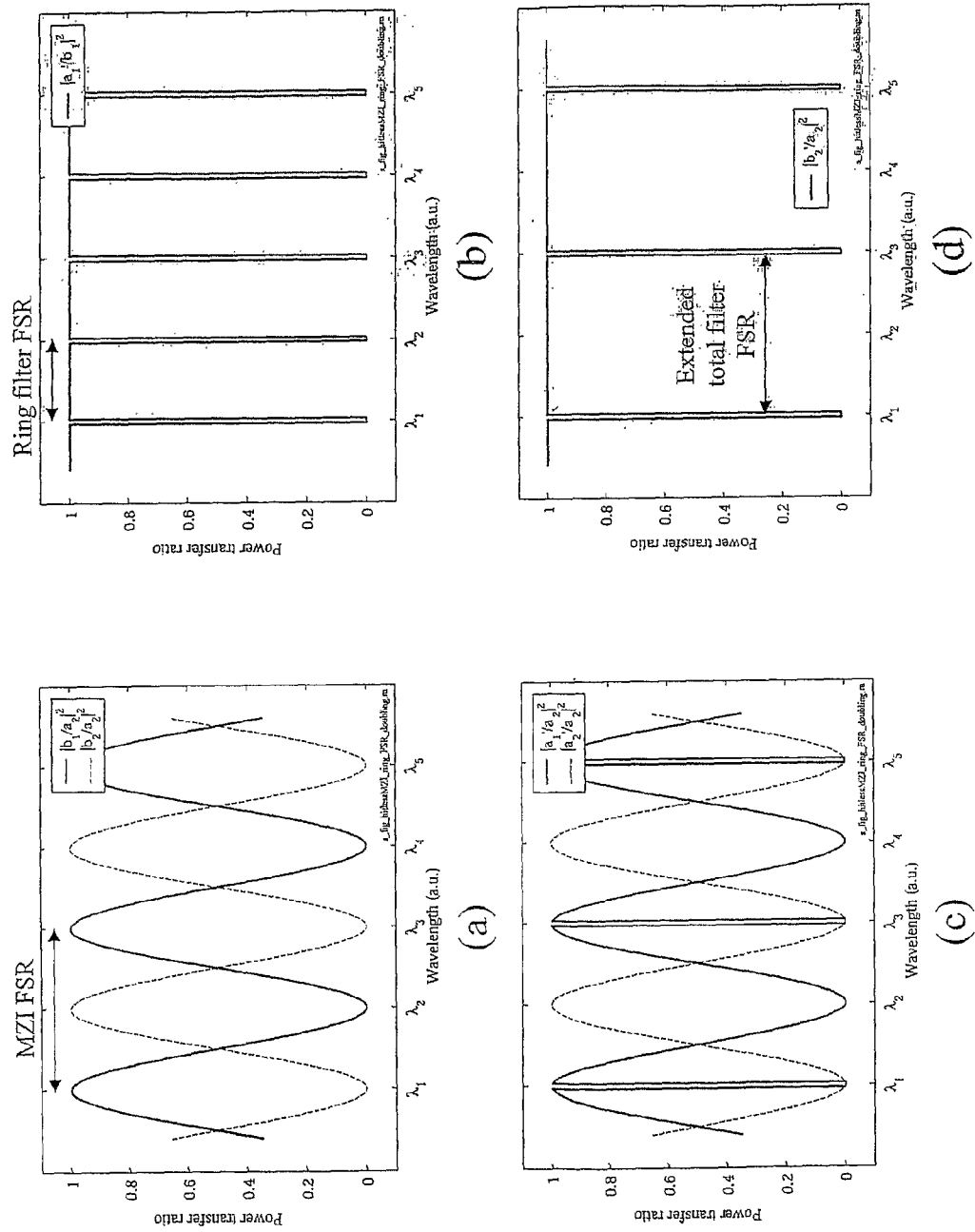
FIGS. 15a-15d, FIGS. 16a-16b, and FIGS. 17a-17b are graphs illustrating the operation of the device of FIG. 14.

Next, splitter and combiner devices A, A' are constructed using feed-forward-type (FF) interferometers, where only 2-input, 2-output waveguide directional couplers and interconnecting waveguide lengths are used to engineer a spectral response. The simplest such interferometer is an MZI, shown as part of splitter A in FIG. 14, with two 3 dB directional couplers 118, 120 connected by two waveguide arms 122, 124 of different lengths. Referring to FIG. 14, MZI interferometers may be used as splitter A and combiner A'. If the difference in lengths, $\Delta L$, of the two waveguide arms 122, 124 in the MZI filter A is such that the period (i.e., FSR) of the MZI sinusoidal spectral response is twice the FSR of the 3-ring resonant filter B, the MZI splitter A can be used to suppress every second resonance of the filter B and effectively double its FSR, by permitting spectral content coincident with every other resonance to bypass the filter in the top arm 110 of the device. If the waveguides used in the MZI splitter device and in the rings of the ring resonator are of the same cross-section design, or even of different cross-section designs but having the same group effective index, then the required arm length difference for the MZI filter A to achieve doubling of the add-drop filter B FSR is $\Delta L \sim \pi R$, or half the ring circumference. More generally, if the FSR of the embedded add-drop filter is FSRfilt (in units of frequency, e.g., Hz), and $n_g$ is the effective group index for propagation in the waveguide used to form the extra arm length $\Delta L$ in the MZI, then the required arm length may be approximately given by $DL \sim c/(n_g \times FSRmzi) = c/(n_g \times 2 \times FSRfilt)$, where FSRmzi is the FSR of the MZI filter device A. In general, the FSR of the MZI filter in the splitter A for this type of device may be twice the spacing of the add-drop filter passbands. If the input signal is inserted at port a2 in FIG. 14, FIG. 15a shows schematically the sinusoidal spectrum splitting by MZI-based splitter A among the top 110 and bottom 112 arms of the diversity scheme, at ports b2 and b1, respectively. In FIG. 14, the input spectrum is schematically represented by solid lines representing signal channels 114 coincident with the resonant passbands of the ring-based add-drop filter B, and by dotted lines representing channels 116 between them. The channels 114 coincident with the add-drop filter B passbands are spaced in wavelength by one FSR of the filter B, and there may more generally be a large number of wavelength channels in the input spectrum, for example 5 to 40, in the wavelength range between these channels 114. For example, in the case of 3-ring filters B used in the previous examples, with an FSR of 800 GHz, there may be 8 WDM channels, spaced by typical WDM channel spacing of 100 GHz, between two adjacent passbands of the add-drop filter B. FIG. 15b shows schematically the through-port response of add-drop filter B, i.e., the response for transmission from port b1 to a1', with resonances of filter B spectrally aligned with the peaks and valleys of the MZI splitter A response. FIG. 15c shows schematically the response in the waveguide arms 110 and 112 at points a2' and a1', respectively, relative to an input signal at input port a2. Finally, the total device response from input a2 to the through port b2' is schematically shown in FIG. 15d, showing FSR doubling.

Figure 5:
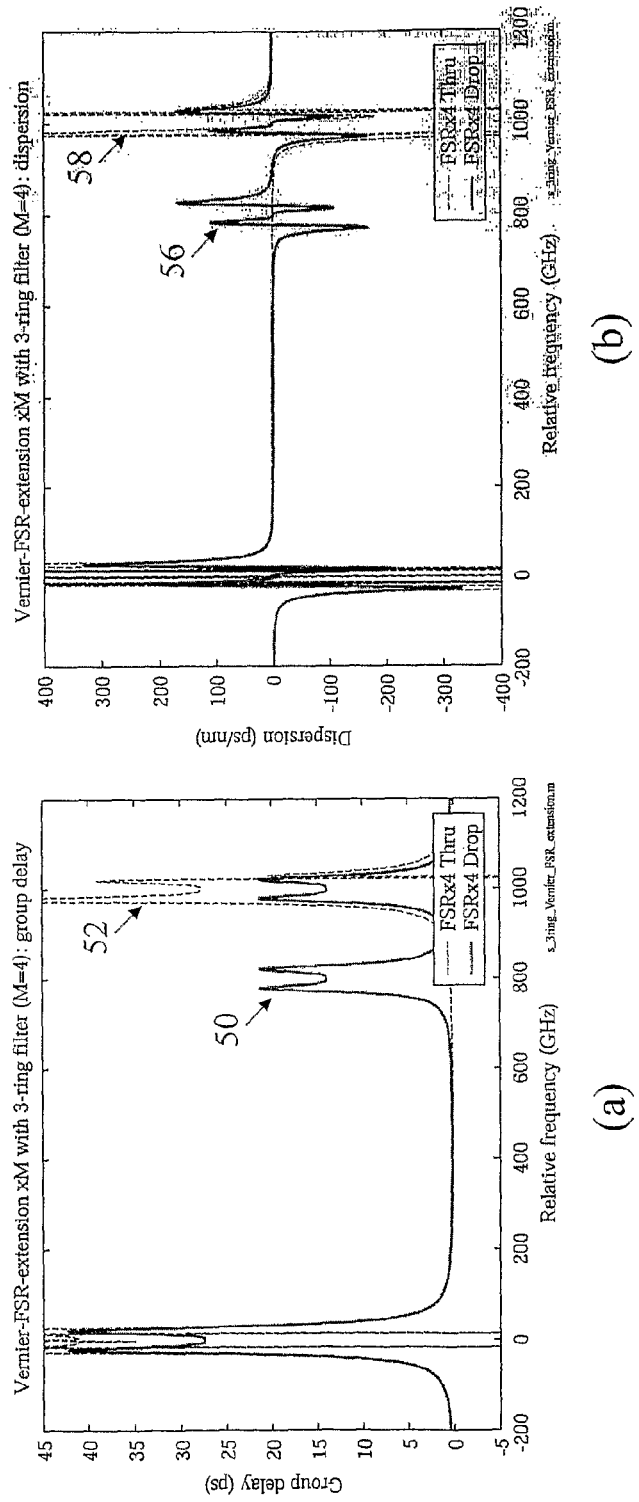
Figure 13:
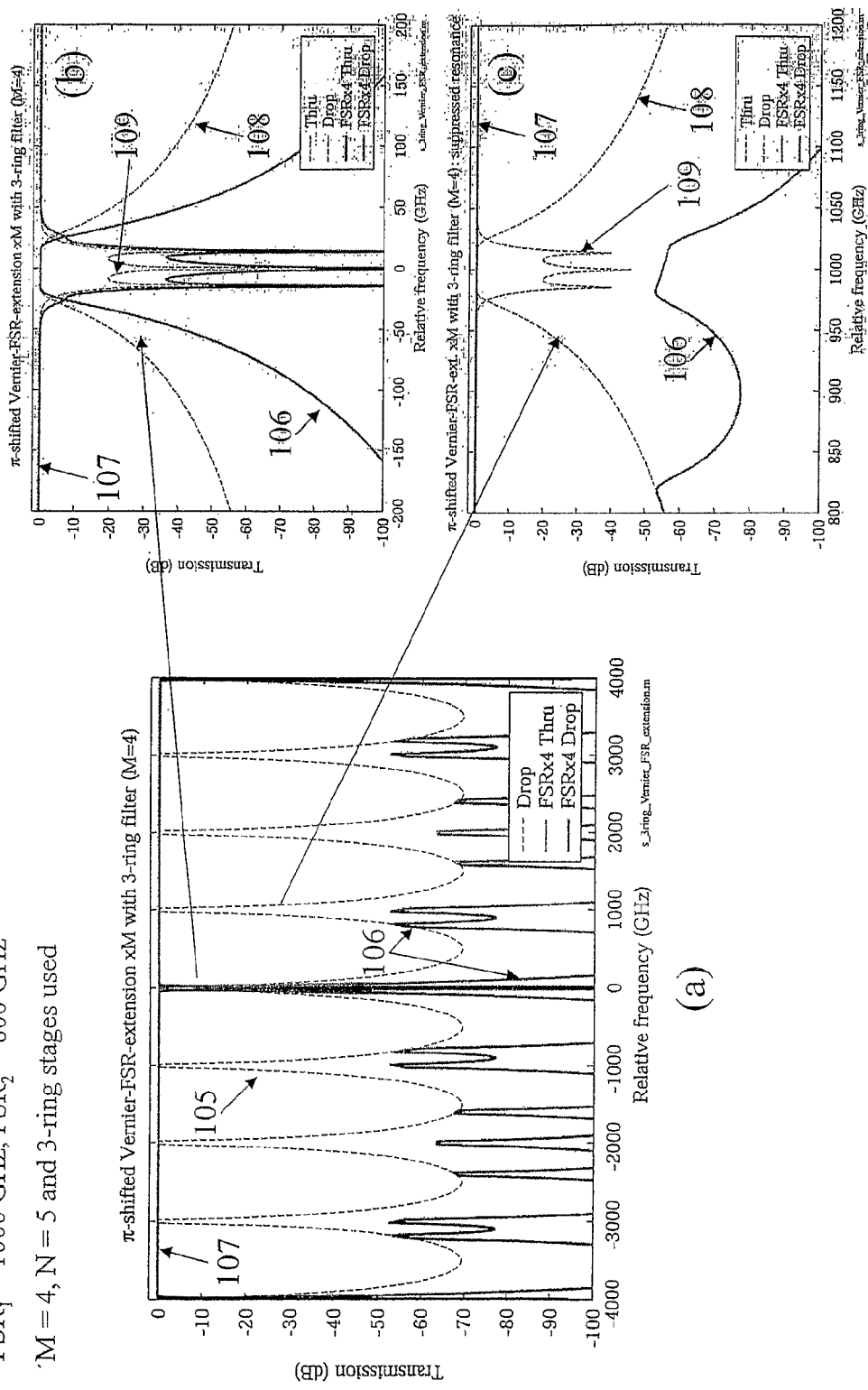
FIGS. 13(a)-13(c) are graphs illustrating the operation of a π-shifted Vernier scheme.
Figure 16:
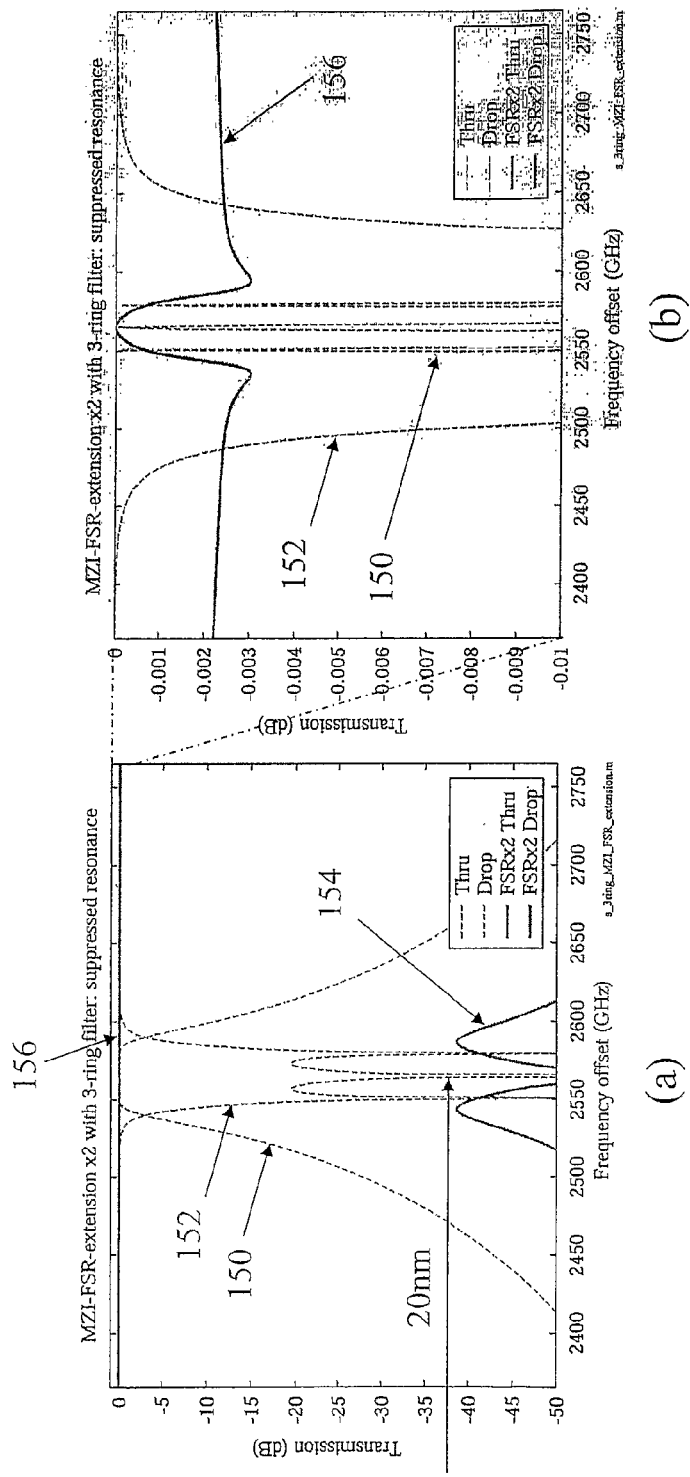
Figure 17:
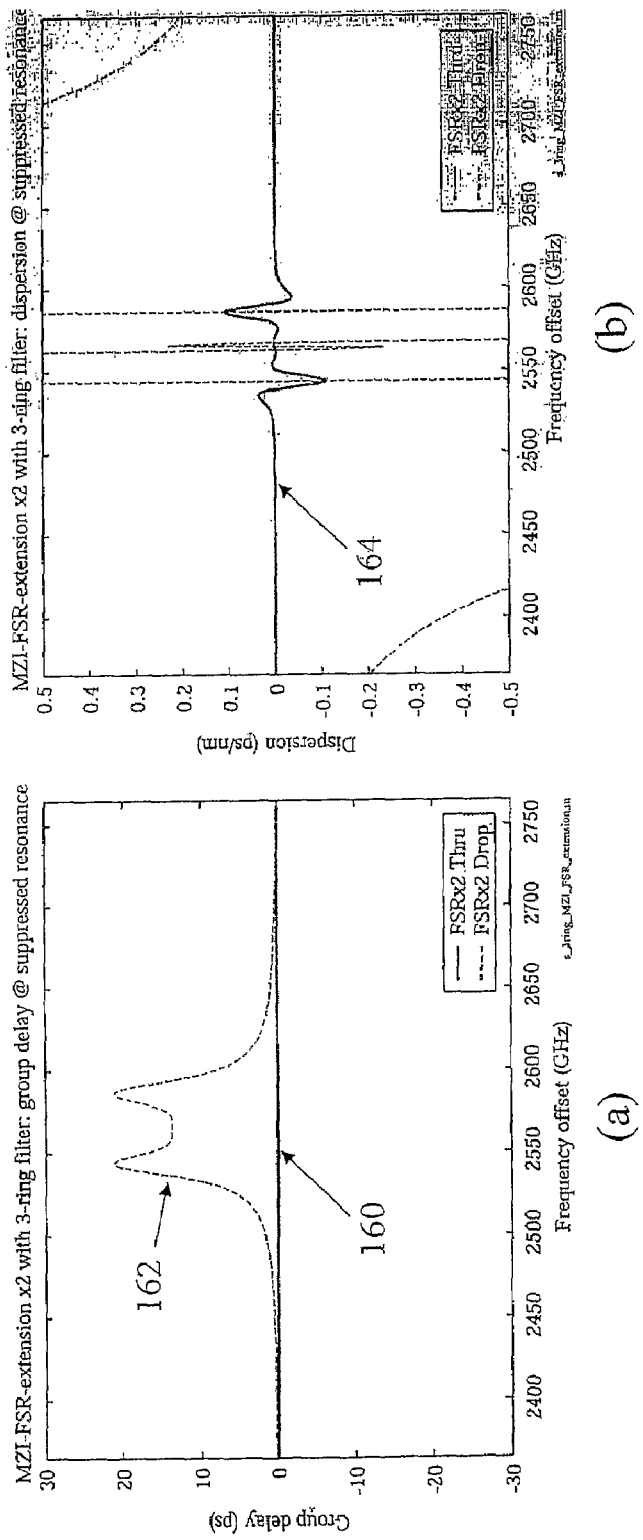

In an embodiment, the device in FIG. 14 is constructed using a single 3-ring add-drop filters B and no filter B' present with a filter shape identical to that of the filter used for the examples of FIGS. 4, 5, and 13. The 3-ring filter B in this example has an FSR of 20 nm (2565 GHz), so the MZI interferometer waveguide arm 122, 124 length difference, ΔL, is chosen to give spectral period, or FSR, for the splitter A of 40 nm. Given a desired FSR for the MZI, FSRmzi (in frequency units, e.g., Hz), and the effective group index of the waveguide used for the extra arm length, the required arm length difference is approximately given by DL~c/($n_g$×FS-Rmzi). The filter B employs ring-bus power coupling coefficients of 8.9% and ring-ring power coupling coefficients of 0.17%. FIG. 16a shows the drop 150 and through port response 152 of the 3-ring filter B alone (dashed line), and the drop 154 and through 156 response of the suppressed resonance of the device in FIG. 14, 20 nm away from the selected drop-channel resonance (solid line). The drop resonance passband 154 is suppressed by >35 dB, and the through-port response 156 is close to unity across the spectrum near the suppressed resonance. The through-port dispersion of the 3-ring filter B is preferably low enough, or compensated in design, to avoid substantially modifying the π phase difference between the arms 110 and 112 that ensures complete recombination in a single output waveguide (here, at port b2'). FIG. 16b shows a zoom-in view of the spectra 150, 152, 156 of FIG. 16a showing that this non-ideal ring-filter phase contributes less than 0.003 dB loss in recombination at the through port b2' (or >99.9% transmission). The desired channel drop resonance (not shown) has substantially the same response as the sole 3-ring filter response 150, 152 shown in FIG. 16a (dashed line). More important is the group delay and dispersion in the through-port b2' at the suppressed resonance. FIG. 17a shows the group delay of the drop 160 and through port 162 at the suppressed resonance. The drop port 160 shows the group delay of ~15 ps required in the drop-port of the 40 GHz-wide filter by the Kramers-Kronig relationship and the filter shape. The through port response 162 at the suppressed resonance has virtually no group delay (computed at less than 2 fs) compared the usual drop-port picosecond-scale group delays in filters of the present bandwidth, and thus the device tends to see virtually no excess loss at the suppressed resonance. Furthermore, in FIG. 17b, the dispersion 164 in the through-port b2' of the total device at the suppressed resonance is shown to be <0.1 ps/nm at channel edges and far less within the 40 GHz channel band, well below tolerable dispersion levels of 10's of ps/nm for through ports of filters for telecom add-drop applications. Therefore the device in FIG. 14 provides FSR extension and tuning range extension advantages as does the device in FIG. 10, but it also substantially eliminates by virtue of its design configuration, the group delay and dispersion that is normally present in the device of FIG. 10.

To tune the selected drop-channel resonance across the entire 40 nm effective FSR, the add-drop filter B passband may be wavelength tuned by up to 20 nm, to move the closest filter resonance, the resonances being spaced by FSR=20 nm, to the desired wavelength. The MZI-based splitter, on the other hand, is preferably tunable over the entire 40 nm, because its spectral response is periodic with 40 nm. The MZI splitter A is tuned so as to track one resonance of the add-drop filter B and suppress another adjacent resonance over the first 20 nm, and is tuned further to do the reverse, tracking a second resonance and suppressing the previous, over the second 20 nm range. However, MZI arms 122, 124 can be made as long as desired, permitting accumulation of sufficient phase to tune 40 nm with a comparably small change in effective refractive index in the waveguide, thus achieving the tuning range with a lower applied temperature. Thermo-optic refractive index change is one approach to vary the optical path length 122 of the MZI splitter A, and thereby enable wavelength tuning of splitter A. Resistive heaters 126, 128 are schematically indicated by cross-hatched rectangles in FIG. 14, enabling the wavelength tuning of splitter A and combiner A'. Other approaches, including electro-optic and MEMS-actuated tuning mechanisms, may be employed without loss of generality. Therefore, because the MZI splitter A and combiner A' permit long interaction lengths for tuning, and the ring-based add-drop filter is preferably tuned only 20 nm, the entire tuning range is covered using lower temperature than a single filter with a 40 nm FSR that is constructed using substantially the same waveguide material and design. Additional thermo-optic elements represented by cross-hatched rectangles, are schematically included in the two optical paths to permit trimming the optical path length difference, and in the ring-based add-drop filter, to permit wavelength tuning of the filter.

The scheme based on feed-forward interferometers is not limited to the simple MZI for splitter and combiner devices A, A'. More complex FF interferometers may be employed, such as cascaded MZIs (consisting of multiple cascaded directional couplers and waveguide arms of different lengths). The increased interferometer order may be employed to two advantages: to either suppress a greater number of adjacent resonances of the ring filter, thereby extending the FSR by a factor of three, four, etc.; or to make the suppression of a particular resonance of higher order (e.g., maximally flat), such that the resonance is more strongly suppressed and the resonance suppression is more robust to wavelength misalignments; or a combination of both.

Figure 18:
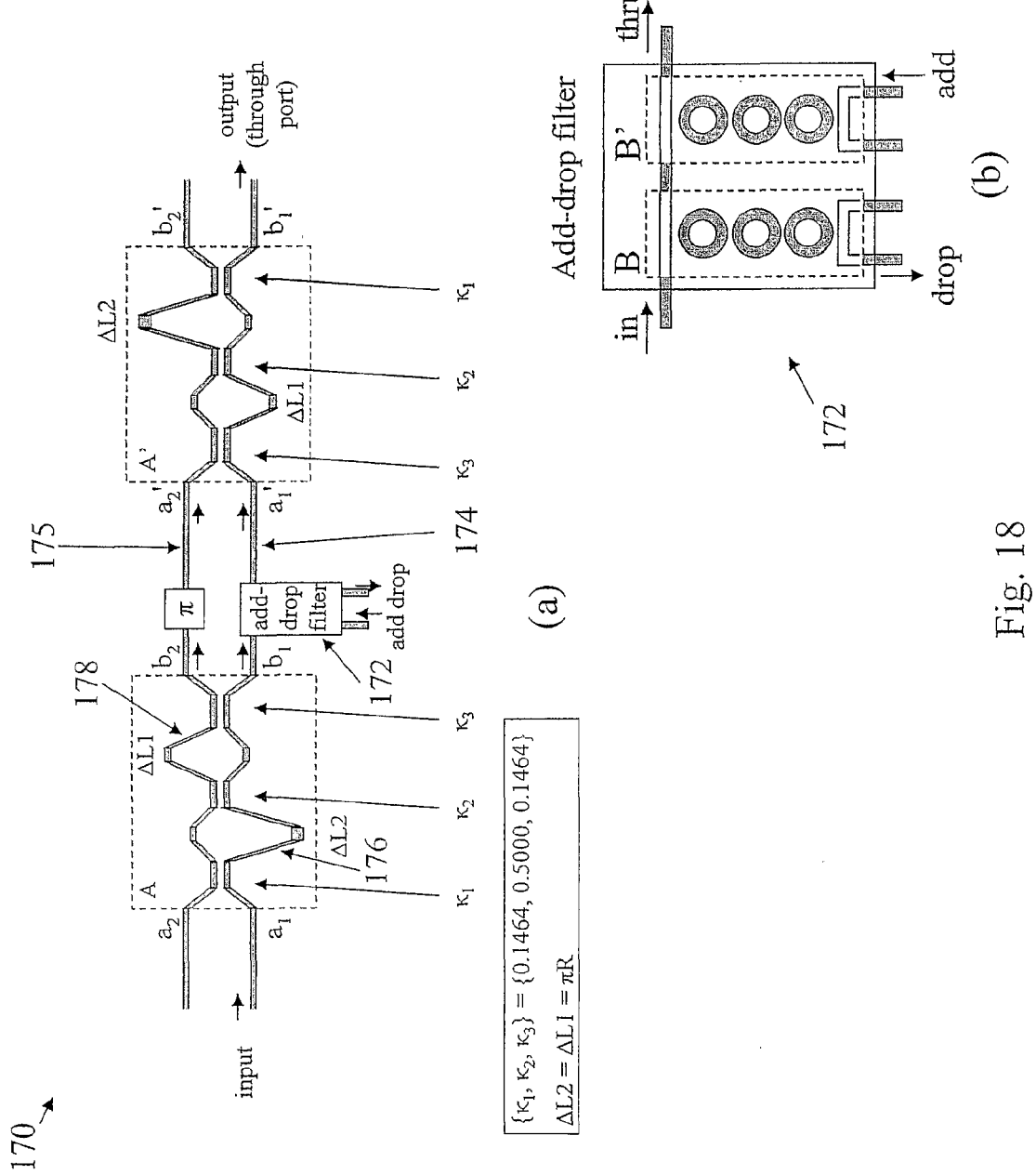
FIG. 18 a schematic diagram of an exemplary higher-order filter FSR-doubling scheme.
Figure 19:
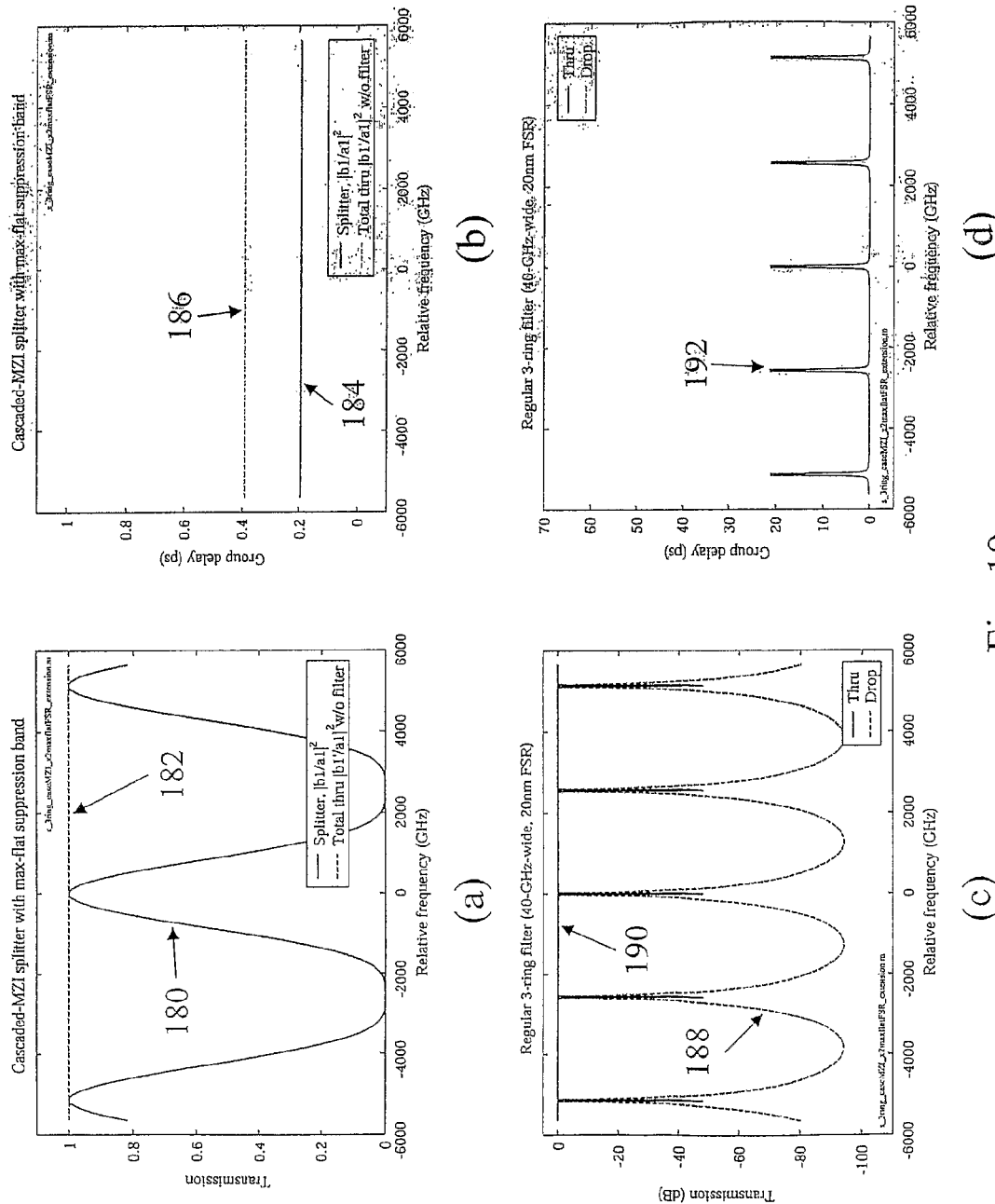
FIGS. 19a-19d, 20a-20f are graphs illustrating the operation of the device of FIG. 18.

Embodiments of both types of design are given. FIG. 18a shows the design of a higher-order cascaded-MZI-based FSR-doubling scheme. It employs FF-type splitter and combiner devices A, A' using cascaded-MZI interferometers with 3 directional couplers, indicated by their cross-state coupling ratios $\kappa_1$, $\kappa_2$, $\kappa_3$ (FIG. 18a). The cross-state power coupling ratios of $$\{\kappa_1, \kappa_2, \kappa_3\} = \left\{\frac{1}{2}\left(1 - \frac{1}{\sqrt{2}}\right), \frac{1}{2}, \frac{1}{2}\left(1 - \frac{1}{\sqrt{2}}\right)\right\} \sim \{0.1464, 0.5000, 0.1464\}$$

give a second-order maximally-flat rejection band in the transfer functions 180 for b1/a1, and b2/a2, of splitter device A, shown in FIG. 19a (also shown is the total device through-port response 182 at the b1'output of A', due to input at a1). The group delay spectra 184, 186 of the splitter device A, and of the total device 170 in FIG. 18a, with the ring add-drop filter 172 removed from the bottom optical path 174, are both perfectly flat, as shown in FIG. 19b, indicating identically zero dispersion due to devices A and A' at all wavelengths in the OWR of the total device 170. The MZI differential arm lengths in the splitter device A (ΔL1 and ΔL2) are each chosen to give a spectral response 180 period of twice the FSR of the ring add-drop filter 172, to suppress every second resonance of the ring filter 172 embedded in the device. If rings of radius R are used in the filters B, B' constituting the add-drop filter 172, and waveguides of similar group effective index are used, then for FSR doubling, differential lengths ΔL1=ΔL2=πR. The maximally flat rejection band of the cascaded MZI device A improves the rejection level for the suppressed resonance, and the frequency alignment tolerance for high suppression. The filter 172 employed in the example is shown in FIG. 18b, consisting of two stages of 3-ring filters, with a passband shape and bandwidth that is designed to be substantially similar to the ring filters used in the examples for FIGS. 4, 5, 13, 16, and 17. With a 20 nm FSR used for this filter 172, the ring-bus and ring-ring power coupling coefficients of the ring design are the same as those in the example of FIGS. 16, 17. The drop 188 and through port 190 responses of a single 3-ring filter stage B are shown in FIG. 19c, and the group delay spectra 192 in both ports are the same in this design and are shown in FIG. 19d, giving ~15 ps group delay on resonance, determined by the filter bandwidth and order.

Figure 20:
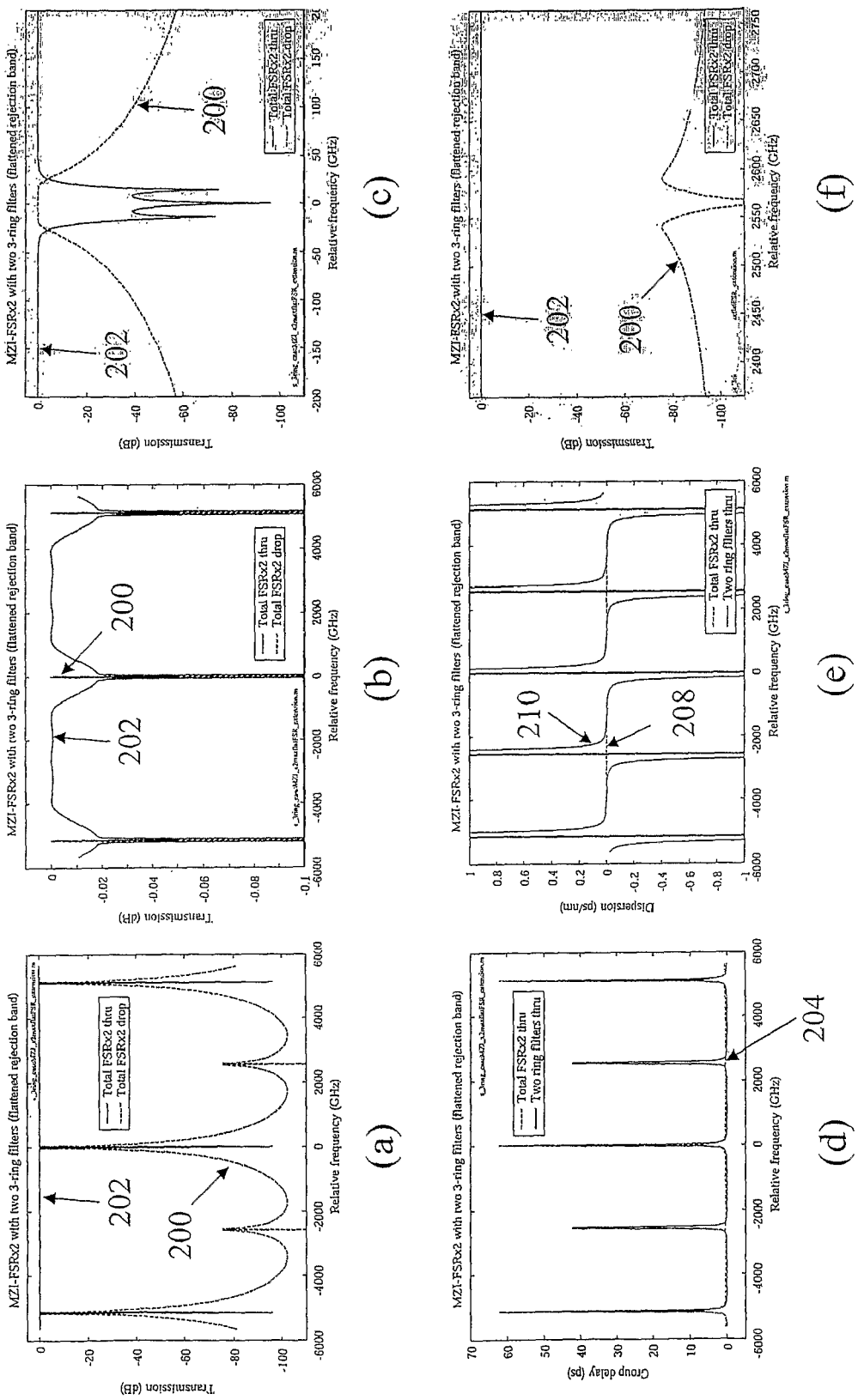

The drop 200 and through port 202 responses of the complete example design 170 of FIG. 18, including the ring filter 172, are shown in FIG. 20a, showing effective FSR doubling with >70 dB suppression of every second ring-filter resonance. The through-port response 202 has virtually unity transmission at all wavelengths except at the extracted drop channel wavelengths. FIG. 20b shows that the through-port insertion loss 202 at express channel wavelengths is less than 0.02 dB, which is tolerable. This loss is caused by out-of-band phase dispersion of the through-port response of the ring filter 172 that impairs complete signal recombination in the spatial diversity device 170. While the above loss is tolerable, a lower insertion loss still in the through-port channels can be obtained by designing a resonant filter 172 with lower out-of-band phase dispersion in the through-port response.

Drop and through port responses 200, 202 near the selected drop-channel resonance are shown in FIG. 20c, and at the adjacent suppressed resonance in FIG. 20d. As projected, the group delay (FIG. 20d) introduced by the interferometer is very low (<0.5 ps compared to 20 ps for dropping in the resonant filter) and flat (~2 ps variation across express channel wavelengths, all due to the resonant filter itself) even at the suppressed resonance, causing virtually no loss, variation across the through port channels in the presence of waveguide propagation losses. Note that group delay due to common-mode propagation in both optical paths is ignored as it constitutes only straight propagation, and only excess group delay caused by the MZI arm length differences is taken into account. The more important criterion is group delay flatness. The flat group delay spectrum 204 means through port channels see very low dispersion 208 at suppressed resonances (less than 0.001 ps/nm), while across the entire express channel wavelength range only the dispersion 210 caused by the resonant filter 172 itself, near the dropped resonances, and not by the diversity scheme 170, is transferred to the through port channels (compare dispersion 208 of resonant filter alone and that 210 of the total device in FIG. 20e).

Therefore, this device 170 enables FSR doubling of a resonant add-drop filter 172 response with improved resonance suppression (>70 dB) and greater frequency misalignment tolerance, due to the flat rejection band, in comparison to the example of FIGS. 14-17, and with no significant through-port channel excess insertion loss, group delay imbalance between express channels or dispersion. Referring to FIG. 18, resistive heaters or another tuning mechanism may be applied to the MZI arms 176, 178 in splitter and combiner devices A, A' to permit wavelength tuning, across the OWR constituting the 40 nm effective FSR, of the splitter spectral response; and to the intermediate waveguide arms 174, 175 to permit trimming of the differential optical path length of the arms. Tuning of the device 170 drop-channel passband across 40 nm requires tuning the splitter and combiner devices A, A', i.e., the MZIs, over 40 nm, but tuning the resonant filter 172 over only 20 nm if both resonances in the 40 nm OWR can be made to have substantially similar passbands, and the MZI-based splitter A and combiner A' are used to select which passband is used for channel-dropping and which is bypassed.

Figure 21:
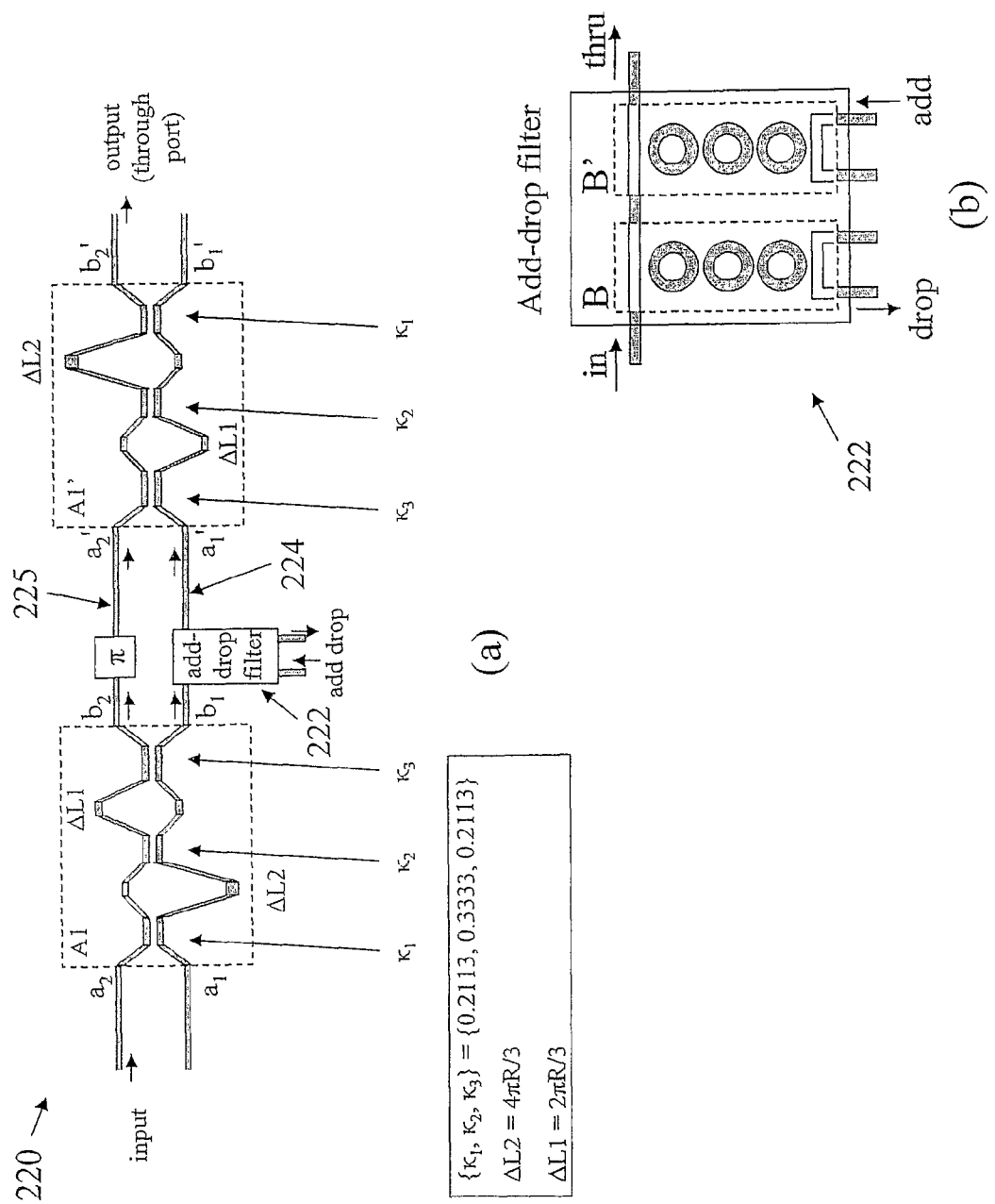
FIGS. 21a-21b are schematic diagrams of an exemplary FSR tripling design.

Another use for higher-order cascaded-MZI interferometers is to create multiple nulls between MZI transmission peaks and suppress more than one resonance. Referring to FIG. 21, an embodiment of an FSR tripling device 220 is described. Similar splitter A and combiner A' devices to those in FIG. 18 are employed, but here the MZI power couplings are chosen as $$\{\kappa_1, \kappa_2, \kappa_3\} = \left\{ \frac{1}{2}\left(1 - \frac{1}{\sqrt{3}}\right), \frac{1}{3}, \frac{1}{2}\left(1 - \frac{1}{\sqrt{3}}\right) \right\} \approx \{0.2113, 0.3333, 0.2113\}.$$

This design results in two transmission nulls substantially evenly spaced in frequency between transmission peaks, thus enabling suppression of two out of every three resonances of the ring filter 222, and effectively tripling the FSR of the embedded resonant filter 222. In this device, the input port a2 and through port b2' are on the top optical path, e.g., waveguide 225 (FIG. 21a). In this case the differential lengths ΔL1 and ΔL2 are chosen to give the MZI splitter device A respective spectral periodicities of 3 and 1.5 times the FSR of the resonant filter 222. If waveguides with the same group effective index as those used for the ring resonators in resonant filters B, B' are used, this leads to ΔL1=2πR/3 and ΔL2=4πR/3. The filter 222 containing stages B, B' is the same as the filter 172 in the previous example of FIG. 18 and is illustrated in FIG. 21b.

Figure 22:
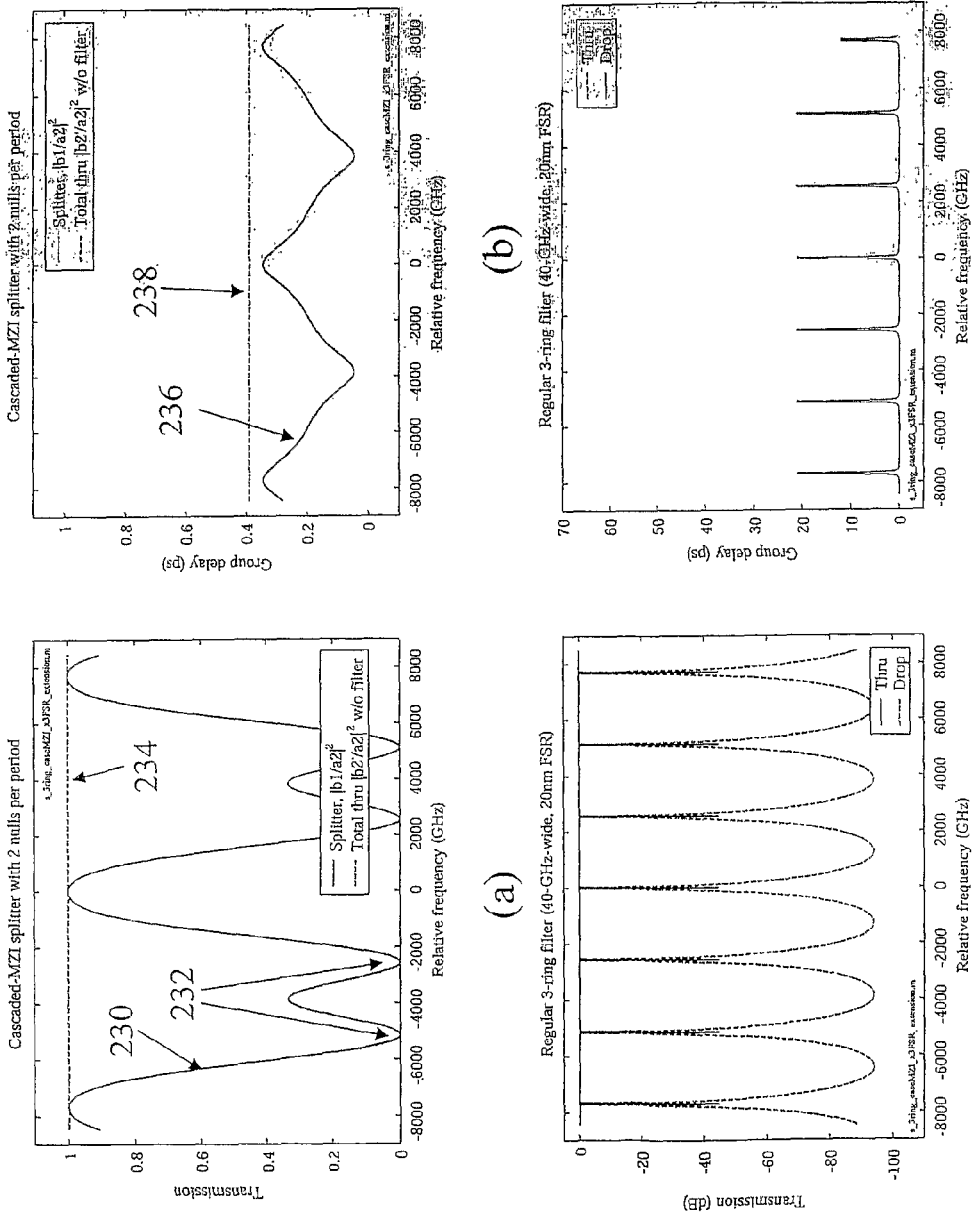
FIGS. 22a-22d and 23a-23f are graphs illustrating the operation of the device of FIGS. 21a-21b.

The splitter device A in FIG. 21 splits the spectrum as shown in FIG. 22a, with a cross-state transfer function 230 containing two nulls 232 between unity transmission peaks. The total through-port transmission 234 after the recombining element is also shown (in this plot the ideal case is shown with the resonant filter 222 removed from the bottom optical path 224 to disregard the contribution of its phase dispersion). FIG. 22b shows that although the splitter device A introduces some dispersion in the splitting operation, evident from a wavelength-dependent group delay spectrum 236, the recombining operation using an identical device A' oriented according to an embodiment of the invention ensures not only unity transmission 234 at all wavelengths in the OWR, but in this case also a perfectly flat group delay 238, and no dispersion, in the final through port. It can be shown that this is likely to be the case for any cascaded-MZI device due to the symmetry conditions imposed by the present spatial diversity scheme. If any resonators are included in A, A', the group delay at the output is no longer guaranteed to be flat.

As in the previous example, the amplitude and group delay drop and through port responses of the resonant filter in FIG. 21b alone are shown in FIG. 22c and FIG. 22d, respectively.

Figure 23:
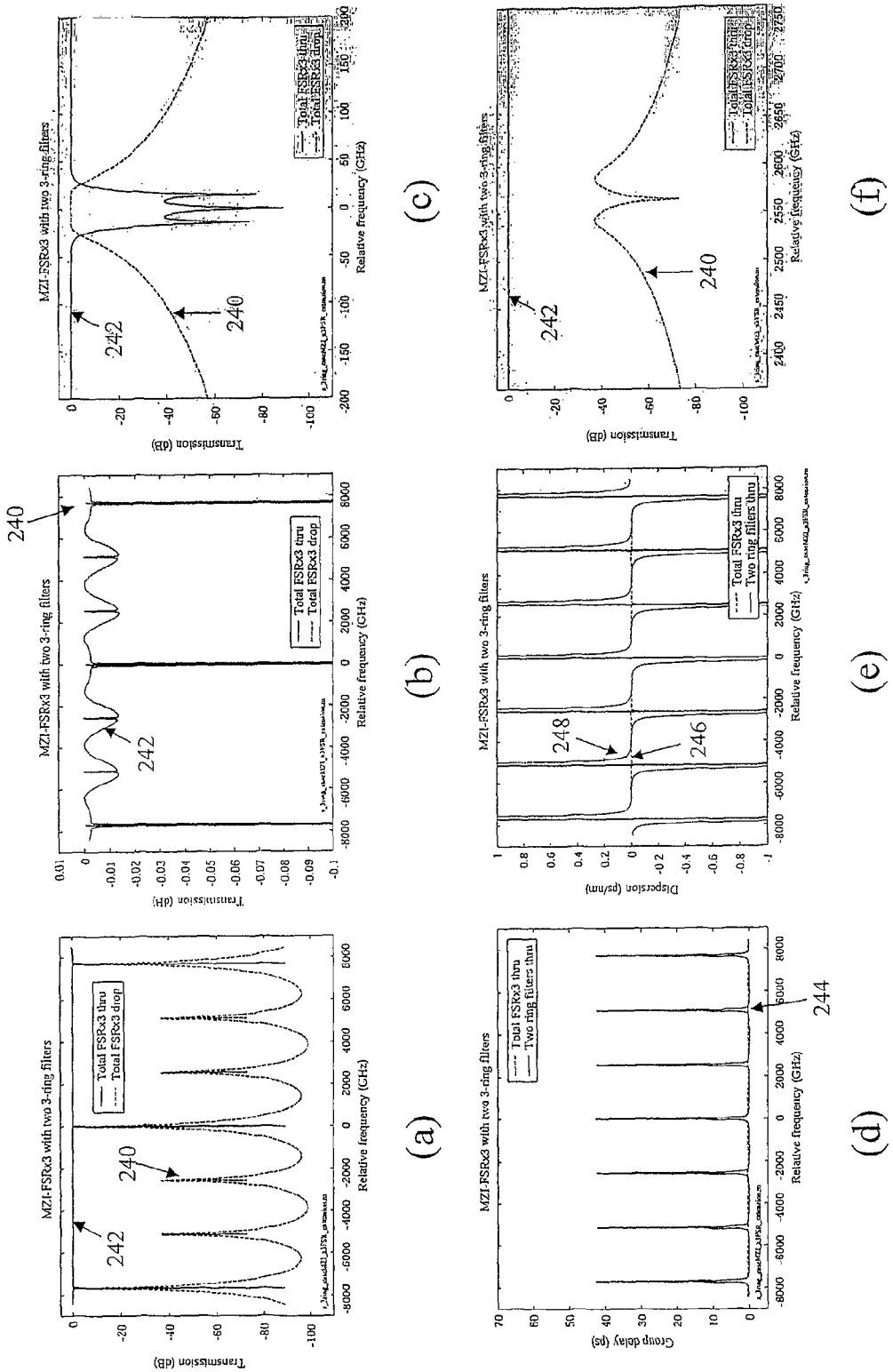

The drop 240 and through port 242 responses of the overall device 220 are shown in FIG. 23a, demonstrating the FSR tripling behavior with >35 dB suppression of both unwanted resonances. The zoom-in view of the through-port insertion loss 242 shows less than 0.015 dB loss across the spectrum away from the channel-drop resonance. The channel-drop resonance is shown in FIG. 23c and the first suppressed resonance is shown in FIG. 23f. The group delay spectrum 244 of the device 220, shown in FIG. 23d, has no excess value and is flat over the suppressed resonances. The dispersion in FIG. 23e is less than 0.005 ps/nm over the suppressed resonances and most of the spectrum, and where it is larger it is dominated by the dispersion of the resonant filter 222 itself, as is seen by comparing the sole add-drop filter 222 dispersion 246 and total device 220 dispersion 248 in the figure.

This device 220 shows effective tripling of the FSR of a resonant filter 222 with little insertion loss and loss imbalance in through-port channels, flat group delay and low excess dispersion.

Even higher order cascaded-MZI and other feed-forward (FF) interferometers may be similarly designed to further extend the FSR (×4, ×5, etc.), and/or to flatten (broaden) the rejection band around one or more of the resonance-suppressing nulls. An important feature of the cascaded-MZI designs is that although a splitter device A may introduce dispersion, the overall spatial diversity scheme with A and A', in addition to providing complete amplitude recombination, also recovers a flat group delay and thus virtually no dispersion, except that introduced by the add-drop filter itself, is present in the final through port. Phase dispersion introduced by the resonant filter 222 in its through-port transmission function distorts the $\pi$ phase difference of the first and second optical paths 224, 225 connecting devices A and A', but was shown tolerable in the above examples. Further, lower-dispersion filter 222 designs (e.g., lower-order) would further approach the ideal performance if desired.

FSR extension designs may also be found by nesting multiple devices such as those suggested by FIGS. 6 and 7, i.e., exemplified by FIGS. 10, 14, 18, and 21. Such nested designs 250, 270, which show one way of extending the resonant filter 252 FSR by a factor of 4, are shown in FIG. 24. Two variants are described, referred to as a non-symmetric (FIG. 24a) and a symmetric (FIG. 24b) nested arrangement. In each case, nesting refers to employing an optical device 80 constructed as illustrated in FIG. 6, where the functional optical devices 86, 87 may in turn each be another device 80 according to FIG. 6. In a non-symmetric nested arrangement (FIG. 24a), a first device 80 (or 250 in FIG. 24a) in FIG. 6 has in its first optical path 82 (or 258) a first functional optical device 86, which constitutes a second device 80 (or 260) according to FIG. 6, and the first device has no functional optical device 87 in the top optical path 84 (or 262). The second device 260 may have an add-drop filter 252 as the functional optical device 86, 87 in at least one of its first and second optical paths 82, 84 (or 253, 254). In a symmetric nested arrangement (FIG. 24b), a first device 80 (or 270 in FIG. 24b) in FIG. 6 has in its first optical path 82 (or 266) a first functional optical device 86 (or 260), which constitutes a second device 80 (or 260) according to FIG. 6, and the first device also contains in its second optical path 84 (or 268) a second functional optical device 87 (or 264), which constitutes a third device 80 (or 264) according to FIG. 6. The second and third devices 260, 264 may be identical, making the arrangement symmetric, but only one, or neither, of the second and third devices 260,264 will typically contain an add-drop filter 252 in one of its respective first or second optical paths 152, 153, 156, 157. In turn, the nesting operation may be cascaded such that instead in all four optical paths 152, 153, 156, 157 is contained a functional optical device 86, 87, each a device 80 according to FIG. 6, but typically only one of the four devices containing a functional optical device 86, 87 in one of its optical paths 82, 84. The scheme is briefly described in the following.

When cascaded-MZI splitter and combiner devices A, A' are used, the total through port response of one FSR-extension device 260 (having a single splitter A1 and combiner A1') has a linear phase spectrum (without the filter 252 present), and thus the other optical path of the device 250 in the nested scheme can be a straight waveguide 262 of the correct length to balance the group delay, as shown in the device design 250 in FIG. 24A. Alternatively, symmetry can be used (except that one of the two optical circuits 260, 264 in the bottom and top optical paths does not contain a resonant filter 252) as shown in FIG. 24b in cases where it is necessary to balance losses. Also, such a balanced geometry 270 can be employed if the through port response of one embedded device 260 has a dispersive (non-linear) phase spectrum, as is the case for devices where the splitter and combiner devices A, A' of the embedded device 260 contain resonators, such as the device 100 in FIG. 10.

Thermal, electro-optic, MEMS or other means of changing the effective index of modes propagation in waveguides forming the optical circuit may be used to: (a) trim the $\pi$ phase shift between the first and second optical paths 82, 84 between splitter and combiner devices A, A'; (b) tune the passband wavelength of the embedded resonant filter 86; and (c) wavelength tune the filtering response characteristic of splitter A and combiner A' by tuning the relevant path lengths ($\Delta L1$ and $\Delta L2$ for devices 170, 220 in FIGS. 18 and 21). The FSR extension scheme described herein permits wavelength tuning of the channel-drop passband to be achieved with smaller effective index changes, permitting, e.g., in case of thermo-optic tuning, lower temperature actuation and finer control of the tuned frequency.

Figure 25:
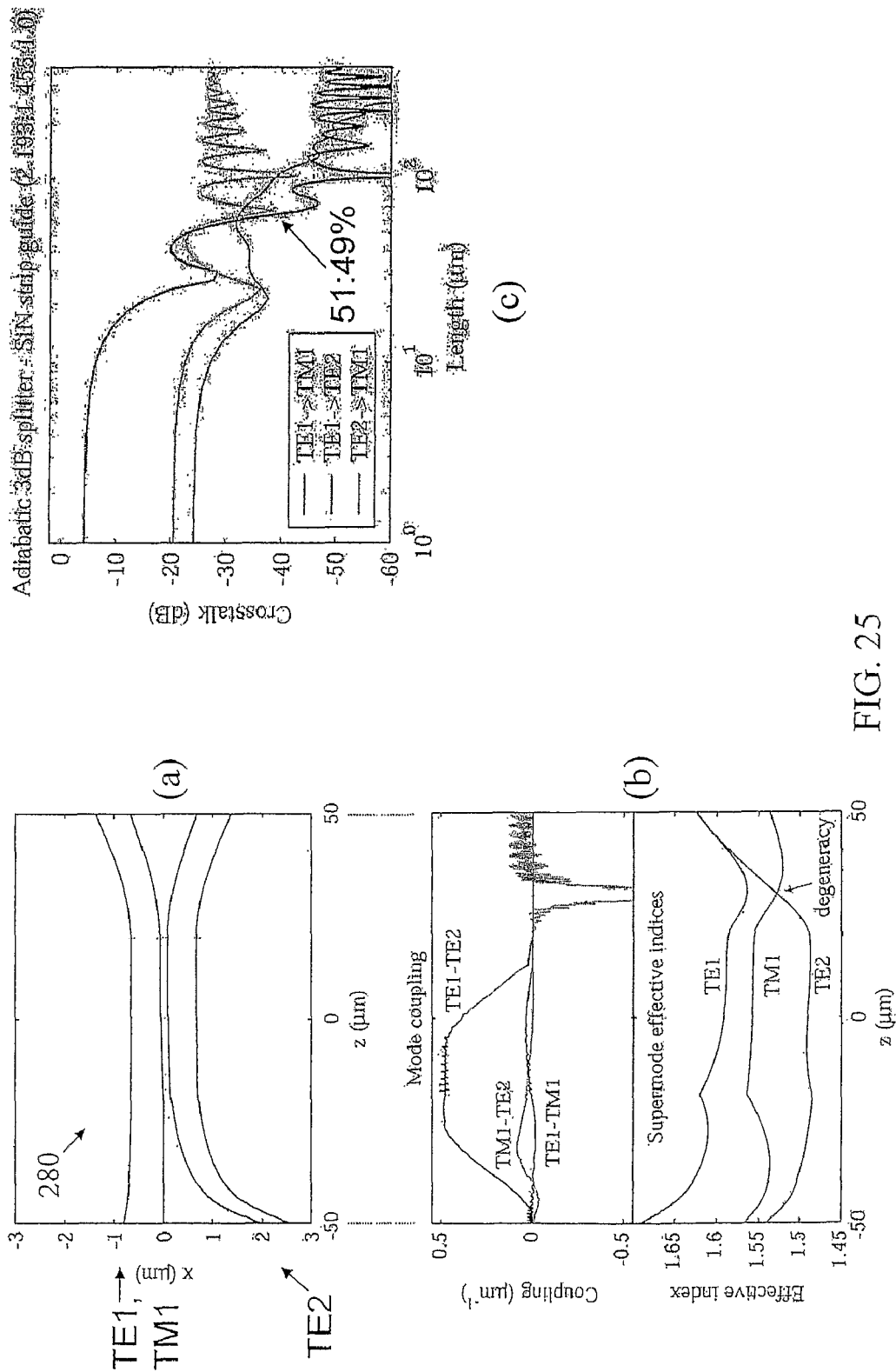
FIGS. 25a-25c are graphs illustrating the operation of an adiabatic broadband 3 dB-splitting directional coupler in high-index-contrast silicon-nitride-core waveguides.

One important feature for tunable filter operation is that the spectral responses of splitter and combiner devices A, A' are preferably wavelength tunable, and thus the coupling ratios in their directional couplers are preferably wavelength independent, or at least always have substantially the same value at the particular suppression wavelengths selected by the tuning set-point, independent of the tuning set-point configured. For 3 dB directional couplers, many wavelength flattened designs exist, including adiabatic couplers, non-symmetric waveguide couplers and tapered couplers. FIG. 25 shows a design layout 280 for an adiabatic broadband 3 dB-splitting coupler in high-index-contrast silicon-nitride-core waveguides. The waveguide core layer is 420 nm thick with a refractive index of 2.2, it has a 100 nm overetch and is left airclad on top and is undercladded by silica of index 1.445. The design has better than 51:49% splitting for lengths greater than ~65 µm, corresponding to less than −40 dB crosstalk between the supermodes. The wavelength dependence of the splitting ratio is expected to be very weak, particularly for longer designs as a consequence of the adiabatic design. For non- 3 dB directional couplers, some of the approaches listed above can still be applied on non-symmetric and tapered couplers. Many approaches exist, as reported in the field literature, for broadband directional coupler design, and while the example was provided herein to illustrate substantially broadband coupler designs enabling widely tunable splitter and combiner MZI designs, embodiments of the invention do not depend on the particular directional coupler design, and specifically do not depend on the design shown as an illustrative example in FIG. 25.

Clearly, the filters in all of these examples could use any add-drop filter geometry, filter order and response shape design that provides an input port and a through port with acceptably low out-of-band dispersion. One could equally employ other designs of microring-resonator-based filters or filters using other types of resonators, such as photonic crystal cavities, integrated bragg resonators, or other types of optical filters, such as ones employing an integrated bragg grating stopband.

All of the present designs can be switched in a hitless manner, by inserting them inside a switch designed according to the scheme in FIGS. 6 and 7, where A and A' are substantially broadband over the OWR, but switchable, elements that can transfer input power between their two output ports in a substantially broadband, continuous manner. Since the FSR-extending designs, particularly those using feed-forward-type interferometer devices for splitter and combiner A, A', do not add significant dispersion to that imposed by the embedded resonant add-drop filter itself, they would not contribute significant phase dispersion that could degrade the hitless switching operation.

Figure 26:
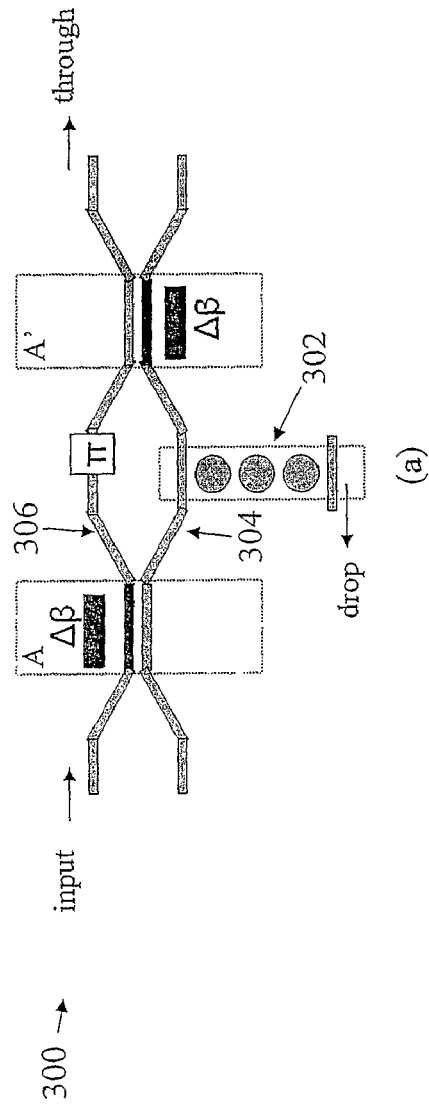
FIG. 26 are schematic diagrams and graphs illustrating hitless-switched filter responses.
Figure 26:
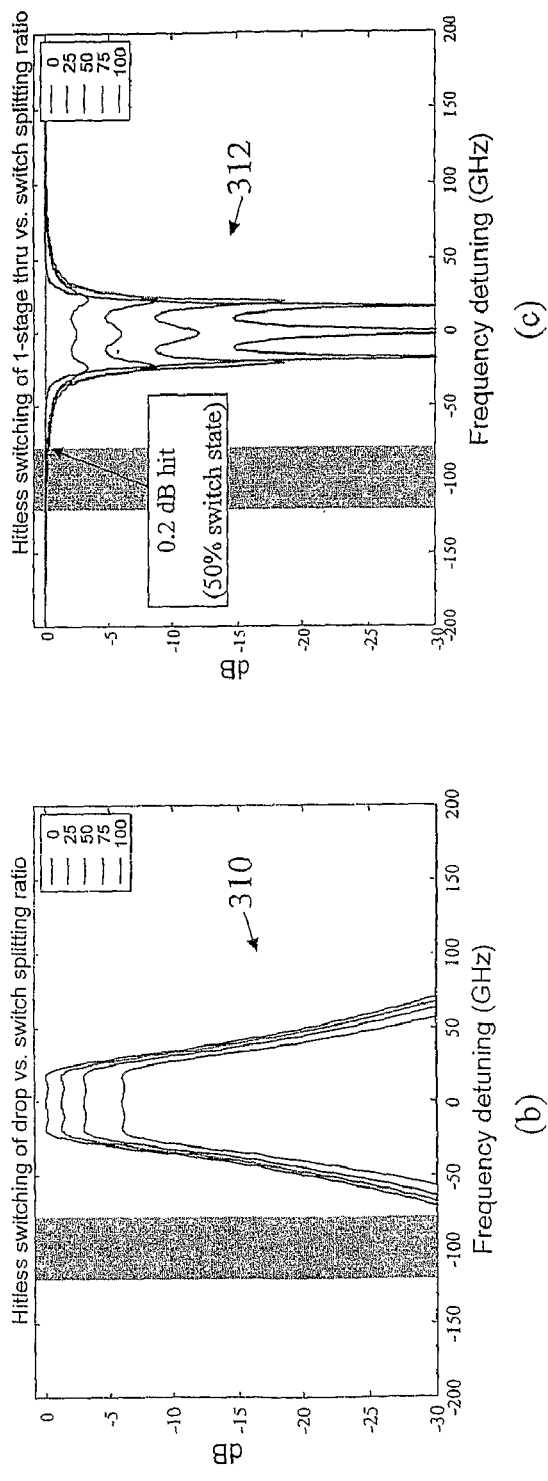

Referring to FIG. 26a, a standard hitless switch design 300 applied to a resonant filter 302 alone, has varying drop and through port responses at various switching states of the switches A, A'. See H. A. Haus, M. Popovic, M. R. Watts, C. W. Wong and L. C. Kimerling, "Hitless switch for high-density integrated optics," U.S. patent application Ser. No. 11/041,350, filed Jan. 25, 2005; C. W. Wong and L. C. Kimerling, U.S. application Ser. No. 10/833,453, filed Apr. 28, 2004. A, A' are $\Delta\beta$-type switches, which may be electro-optically actuated. An alternative splitter switch A is a balanced MZI interferometer-based, thermally actuated switch. Referring to FIG. 26b, an illustrative set of drop-port response spectra 310 demonstrate that the resonant passband is gradually switched off, without introducing any crosstalk from adjacent channels, as the switches A and A' are actuated from 100 to 0% cross-state transmission. Referring to FIG. 26c, through-port responses 320 are shown demonstrating the change of state from extinguishing the dropped channel to fully passing all input to the through-port, as the switches A and A' are actuated from 100% to 0% cross-state transmission. The hitless switch preferably has a $\pi$ phase difference between the two optical paths 304, 306 and thus recombine signal split among the paths 304, 306, in any switch state, to the single device output. Ideally with a filter 302 present, there is preferably no effect on any of the adjacent express channels. However, when the filter 302 that is inserted in one of the optical paths 304, 306 introduces phase dispersion into that optical path 304 at wavelengths near a channel-drop resonance, the filter 302 may substantially add phase dispersion, thus modifying at near-resonance wavelengths the $\pi$ differential phase shift between the two optical paths 304, 306 and may cause some loss in adjacent channels during the switching operation, i.e., "hit loss," while the light is partially split between the two optical paths 304, 306 of the hitless switch 300. In FIG. 26c, which assumes ring-resonator filters with 40 GHz-wide passbands, the filter has an adjacent channel edge 80 GHz away (for a 100 GHz spaced WDM channel grid), and over the adjacent channel passband <0.2 dB of hit loss may be seen during switching, which may be deemed acceptable. Non-adjacent channels are substantially unaffected.

Referring to FIGS. 27a and 27b, a cascade of two and three such 3-ring filters 320, 322, which may be made for improved through-port extinction, causes greater phase dispersion to be introduced into the bottom optical path 304 and thus higher respective hit losses of <0.9 dB and <2.2 dB, respectively are seen at the adjacent channel edges when the switch is at a 50% switching state. Non-adjacent channels see much less significant hit loss. Hit losses of the order of <1 dB may be tolerable. Otherwise, lower-dispersion filters, and/or fewer cascaded filter stages are preferably employed in this device geometry.

Figure 28:
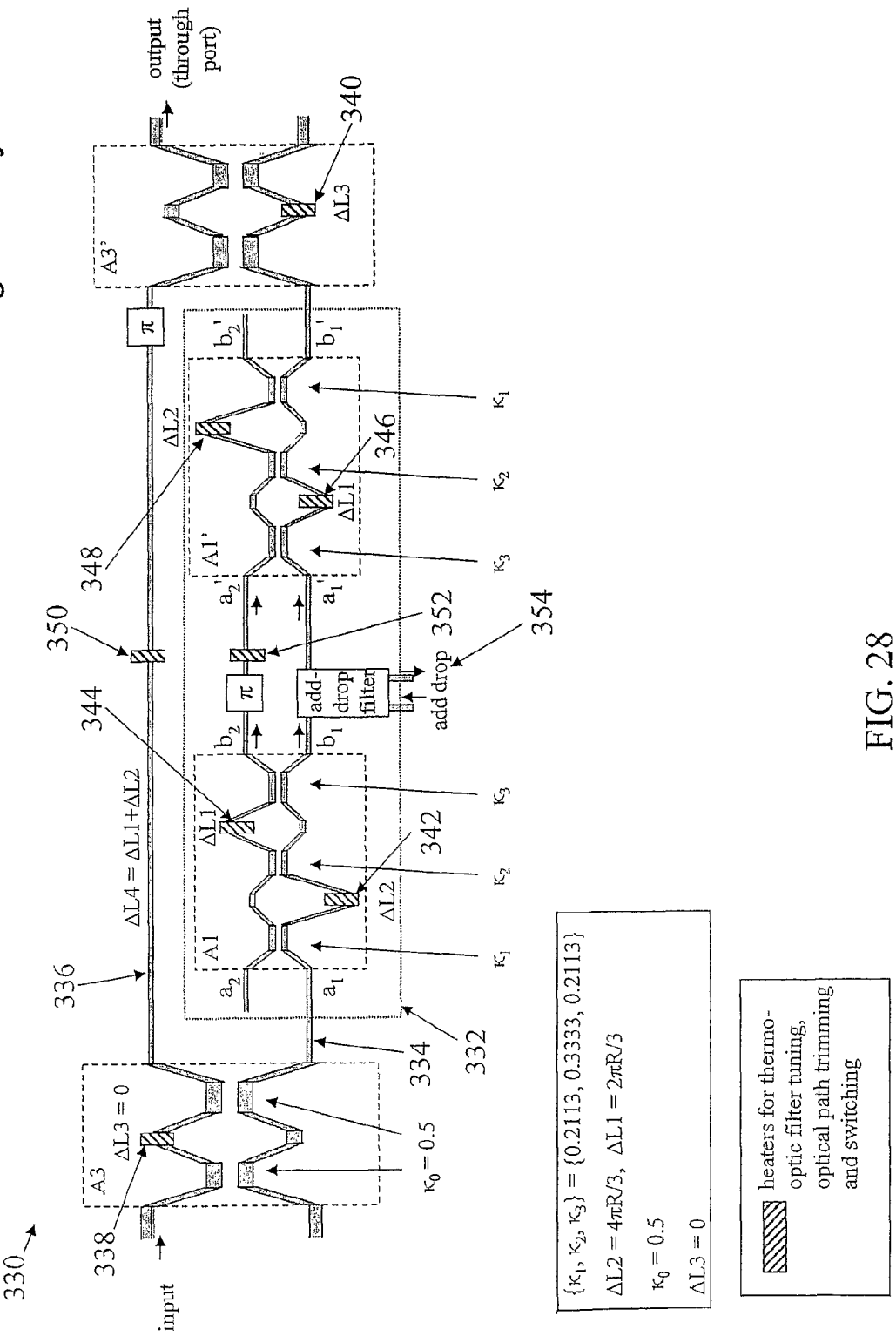
FIG. 28 is a schematic diagram illustrating an exemplary hitless-switchable FSR-extended tunable filter design.

An FSR extended filter, described herein, may be inserted into a hitless switch in to make it hitless switchable. Referring to FIG. 28, the FSR-tripled design 220 of FIG. 21a is employed, which incorporates the two-stage B, B' ring-resonator filter 222 comprising 3-ring stages of FIG. 21b. This FSR-tripled filter 220 is inserted as the add-drop filtering device 87 inside a spatial diversity device 80 according to the scheme of FIGS. 6 and 7, forming a hitless switch 330 that includes a splitting broadband switch A3, a combining switch A3', and connecting waveguides 334, 336. Referring to FIG. 28, in an embodiment, the switches are balanced Mach-Zehnder interferometers, each using two broadband 3 dB directional couplers, and actuated to switch between a bar state and a cross state thermo-optically via a resistive heater 338, 340. Additionally, the length of the waveguide in the top optical path 336 of the hitless switch 330 is chosen to have a group delay equal to that through the filter in the bottom optical path 334, and further to have a relative $\pi$ phase shift as required in FIGS. 6 and 7.

Figure 29:
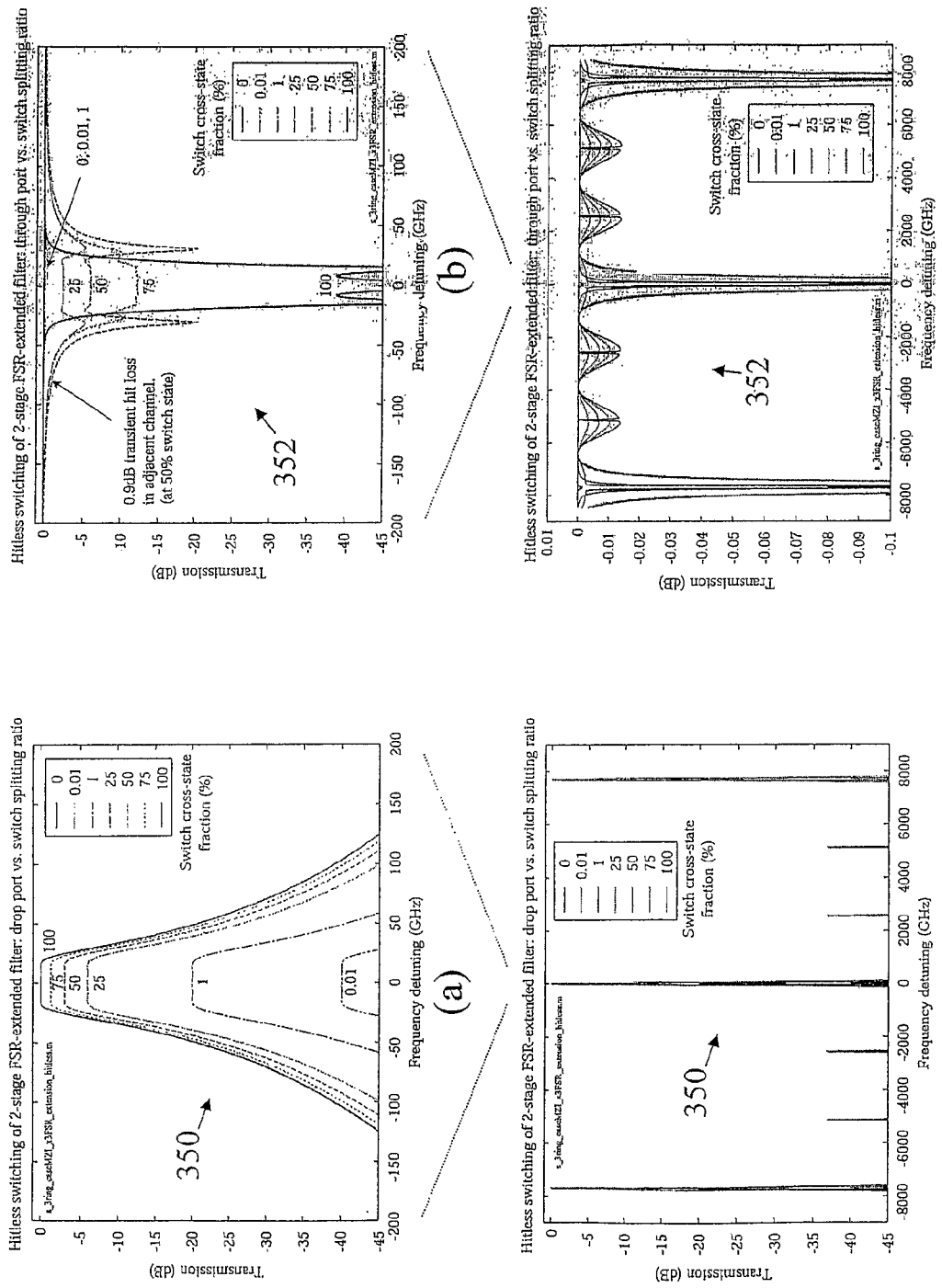
FIGS. 29a-29d are graphs illustrating the operation of the device of FIG. 28.

Referring to FIG. 29a, the drop port response 350 at the dropped channel wavelength, for a number of states of switches A3, A3', labeled by the corresponding cross-state transmission ratio, has been computed. Referring to FIG. 29, the dropped channel is extinguished without any interference with adjacent channels during switching, and without any substantial change to the state of the suppressed resonances. Referring to FIG. 29b, the through-port transmission spectra 352 likewise show continuous switching off of the dropped channel with the same hit loss of <0.9 dB in the adjacent channels as that seen in FIG. 27a for a regular filter, comprising two 3-ring filter stages, that could be disposed in the bottom arm 334 of the hitless switch 330. Therefore, since the filter 222 with two filter stages is employed as the embedded device 332 within the hitless switch 330, the FSR-extension scheme 332 does not introduce substantial extra dispersion and enables the filter with the extended FSR 332 to be switched in a hitless manner, employing the scheme of FIGS. 6 and 7. Referring to FIG. 29d, the through-port transmission 352 at all express channels, including the two suppressed resonances, is substantially high during switching, with <0.02 dB excess loss and the same variation in loss.

Referring to FIG. 28, if the FSR-extended filter 332 has a wavelength tunable channel-dropping passband, as enabled in this example by thermo-optic wavelength tuning of the splitter A1 and combiner A1' wavelength response via resistive heater 342, 344, 346, 348 actuation, and by similar thermo-optic tuning of the embedded resonant add-drop filter passband, then in order to preserve the required phase relationship in the hitless switch 330 during tuning of the splitter and combiner A1, A1' both the top waveguide path 336 and the filter path 334 are preferably tuned simultaneously. For this purpose, an additional heater 350 may be inserted into the top waveguide path 336; this element would be dynamically tuned along with the tuning of the filter's splitter and combiner A1, A1'. Finally a trimming heating element 352 may be included in the FSR-extended filter scheme to trim the phase relationship of the arms of the diversity scheme.

Referring again to FIG. 28a, high extinction in the switches A3 and A3' may be required for strong suppression of the resonance. Switches may be cascaded to increase their extinction. They may be arranged in a nested configuration, similarly to the nested FSR extension schemes in FIG. 24. Alternatively or in addition, a simple optical switch placed at the output drop port 354 of the add-drop filter may be used to further extinguish all dropped resonances in the drop port, if desired.

Figure 27:
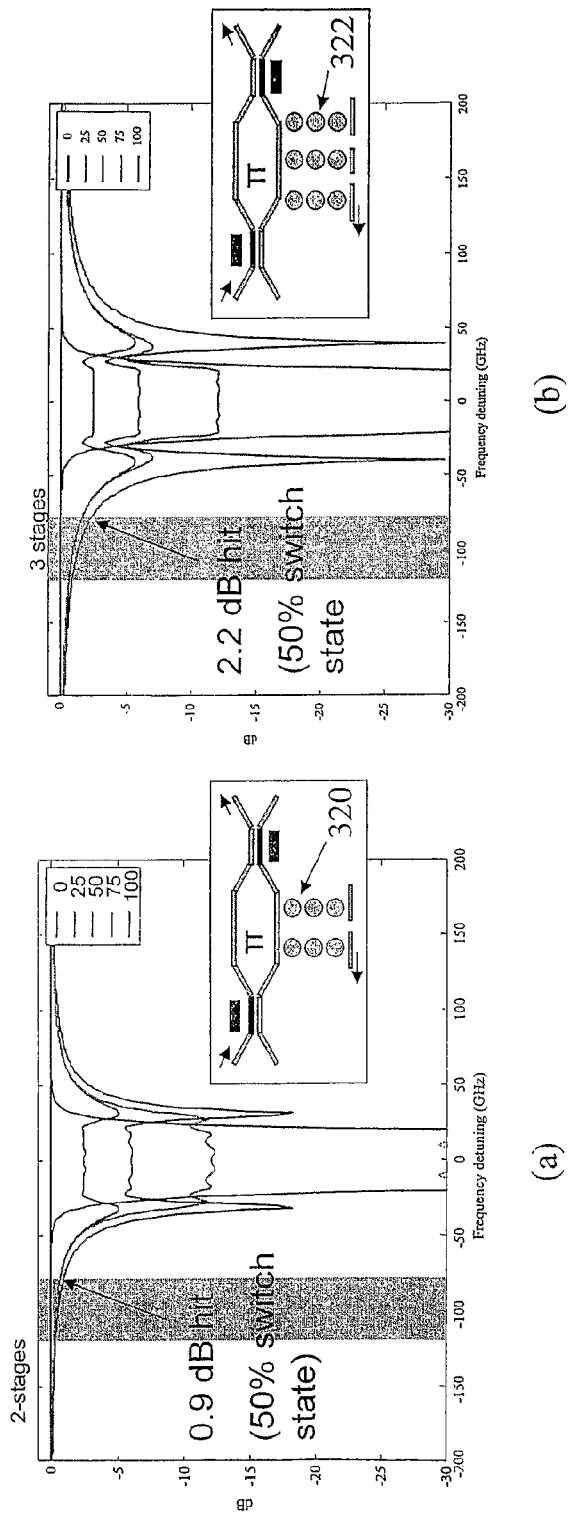
FIG. 27 are schematic diagrams and graphs illustrating hitless-switched filter responses with two- and three-stage embedded filters.

Referring to FIG. 27, if the FSR-extended filter 332 in the bottom waveguide 334 of the hitless switch 330 does not have a substantially flat group delay over the OWR of the complete filter 332, a straight waveguide in the top optical path 336 may not be used to balance the filter group delay. In this case, a balanced scheme similar to FIG. 24B may be employed where the FSR-extended filter device 332 is replicated in both optical paths of the hitless switch 330, but where the replica of the device 332 in top arm 336 contains no add-drop filter, while the device 332 in the bottom arm 334 contains one.

A comment is in order on the $\pi$ phase difference, substantially constant over the OWR, that is called for in the present designs and is preferably imposed between the two optical paths connecting A and A'. It may be noted that in the absence of a particular specified relationship between the two optical paths, they may in general have both different group delays (i.e., physical lengths, group indices), and any particular phase difference at a chosen reference wavelength. With differing group delays, the phase difference accumulated between the two optical paths in propagation through them varies with wavelength, and different losses in the two waveguides may cause differing proportions of the signal propagating in each path to arrive at the combiner device A' input ports. The family of interferometric devices 80 described with reference to FIG. 6 relies on a fixed differential phase relationship for propagation through the two optical paths 82, 84 across the OWR. This may alternatively be interpreted as two conditions: (1) a $\pi$ phase shift is imposed at a chosen reference wavelength in the OWR; or (2) the group delays for propagation through the two optical paths 82, 84 are matched, such that the phase response spectrum for propagation through each path has substantially the same slope of accumulated phase with frequency. In such a way, having parallel phase spectra, it is ensured that a $\pi$ phase difference may be maintained over a substantial bandwidth, preferably over the entire OWR. These are, therefore, relevant parameters for the two optical paths between the splitter and combiner in the present designs.

Although the present invention has been shown and described with respect to several preferred embodiments thereof, various changes, omissions and additions to the form and detail thereof, may be made therein, without departing from the spirit and scope of the invention.

What is claimed is:

1. An optical device comprising:
   a splitter device configured to split an input spectrum among a plurality of output ports, and a combiner device configured to combine at least a portion of the split input spectrum into a single output port, each of the splitter and combiner devices having respective first and second input ports, respective first and second output ports, and a respective transfer matrix;
   a first optical path optically coupling the first output port of the splitter device and the first input port of the combiner device;
   a second optical path optically coupling the second output port of the splitter device and the second input port of the combiner device; and
   an optical filter optically coupled to at least one of the first and the second optical paths,
   wherein the first and second optical paths are configured to introduce, at least at a wavelength of the input spectrum, a phase shift of $\pi$ radians to the optical radiation propagating through the first optical path with respect to the optical radiation propagating through the second optical path, said transfer matrix of the combiner device is a diagonal transpose of the transfer matrix of the splitter device, the splitter device is configured to split the input spectrum into the first and second optical paths such that (i) at a first wavelength of the input spectrum, a ratio of a portion of an input signal transferred to the first optical path to a portion of the input signal transferred to the second optical path is greater than 10 and (ii) at a second wavelength of the input spectrum, the ratio of the portion of the input signal transferred to the first optical path to the portion of the input signal transferred to the second optical path is less than 0.1, and a wavelength spacing between the first wavelength and the second wavelength is less than 100 nanometers.

2. The optical device of claim 1, wherein the filter comprises an add-drop filter, and one of the first and the second wavelengths coincides with a wavelength dropping passband of the filter.

3. The optical device of claim 1 wherein the first and second optical paths are configured to introduce, at substantially all wavelengths of the input spectrum within an operating wavelength range of the optical device, a phase shift selected from a range of $0.7\pi$ to $1.3\pi$ radians, to the optical radiation propagating through the first optical path with respect to the optical radiation propagating through the second optical path.

4. The optical device of claim 3, wherein the phase shift is selected from a range of $0.9\pi$ to $1.1\pi$ radians.

5. The optical device of claim 1, wherein the first optical path comprises a first optical waveguide and the second optical path comprises a second optical waveguide.

6. The optical device of claim 1, wherein the transfer matrix of the combiner device is substantially different from the transfer matrix of the splitter device.

7. The optical device of claim 1, wherein at least one of the splitter device or the combiner device comprises a resonator-based filter.

8. The optical device of claim 1, wherein at least one of the splitter device or the combiner device comprises a feed-forward interferometer filter.

9. The optical device of claim 8, wherein the feed-forward interferometer filter comprises at least two directional couplers.

10. The optical device of claim 1 wherein each of the splitter and combiner devices comprises a respective tuning element configured to enable wavelength tuning of a spectral response characteristic.

11. The optical device of claim 10, wherein a tuning range of each of the splitter and combiner devices spans at least an operating wavelength range of the optical device.

12. The optical device of claim 1, wherein the optical filter comprises a tuning mechanism.

13. The optical device of claim 12, wherein a tuning range of the optical filter spans at least one free spectral range of the filter.

14. The optical device of claim 1, further comprising a further splitter device configured to split an input spectrum among a plurality of output ports, and a further combiner device configured to combine at least a portion of the split input spectrum into a single output port, each of the further splitter and combiner devices having respective first and second input ports, respective first and second output ports, and a respective transfer matrix;
   a third optical path optically coupling the first output port of the further splitter device and the first input port of the further combiner device; and
   a fourth optical path optically coupling the second output port of the splitter device and the second input port of the combiner device,
   wherein the third and fourth optical paths are configured to introduce, at least at a wavelength of the input spectrum, a phase shift of $\pi$ radians to the optical radiation propagating through the third optical path with respect to the optical radiation propagating through the fourth optical path, said transfer matrix of the further combiner device is the diagonal transpose of the transfer matrix of the further splitter device, the first input port of the further splitter device is optically coupled to the first optical path, the first output port of the further combiner device is optically coupled to the first optical path, and said optical filter is optically coupled to at least one of the third and the fourth optical paths.

15. The optical device of claim 14, wherein the second optical path comprises an optical waveguide having a length selected to provide comparable group delay to balance a delay of the first optical path comprising the second optical device.

16. The optical device of claim 1, wherein the wavelength spacing between the first and the second wavelengths is substantially the same as a wavelength spacing of two adjacent passbands of the optical filter optically coupled to the first or the second optical paths in an operating wavelength range of the optical device.

17. The optical device of claim 16, wherein the splitter device is further configured to split the input spectrum into the first and second optical paths such that at a third wavelength of the input spectrum, a ratio of a portion of an input signal transferred to the first optical path to a portion of the input signal transferred to the second optical path is less than 0.1, a wavelength spacing between the first wavelength and the second wavelength is substantially the same as the wavelength spacing between the first wavelength and the third wavelength, and the second and third wavelengths are on opposite sides of the first wavelength.

18. The optical device of claim 1, wherein the splitter device is configured to split the input spectrum into the first and second optical paths such that at an intermediate wavelength between the first and the second wavelength of the input spectrum, a ratio of a portion of an input signal transferred to the first optical path to a portion of the input signal transferred to the second optical path is less than 10 and greater than 0.1, and the intermediate wavelength is at least one channel spacing away from at least one of the first wavelength and the second wavelength of the splitter device.

19. The optical device of claim 1, wherein the first wavelength is coincident with one passband of the optical filter, and the second wavelength is coincident with an adjacent passband of the optical filter.

20. A combination comprising:
first, second, and third optical devices, each comprising:
a splitter device configured to split an input spectrum among a plurality of output ports, and a combiner device configured to combine at least a portion of the split input spectrum into a single output port, each of the splitter and combiner devices having respective first and second input ports, respective first and second output ports, and a respective transfer matrix;
a first optical path optically coupling the first output port of the splitter device and the first input port of the combiner device;
a second optical path optically coupling the second output port of the splitter device and the second input port of the combiner device; and
an optical filter optically coupled to at least one of the first and the second optical paths,
wherein the first and second optical paths are configured to introduce, at least at a wavelength of the input spectrum, a phase shift of π radians to the optical radiation propagating through the first optical path with respect to the optical radiation propagating through the second optical path, said transfer matrix of the combiner device is a diagonal transpose of the transfer matrix of the splitter device, the splitter device is configured to split the input spectrum into the first and second optical paths such that (i) at a first wavelength of the input spectrum, a ratio of a portion of an input signal transferred to the first optical path to a portion of the input signal transferred to the second optical path is greater than 10 and (ii) at a second wavelength of the input spectrum, the ratio of the portion of the input signal transferred to the first optical path to the portion of the input signal transferred to the second optical path is less than 0.1, a wavelength spacing between the first wavelength and the second wavelength is less than 100 nanometers, the first optical device is disposed in a symmetric nested arrangement with the second and the third optical devices, the first optical path of the first optical device comprises the second optical device, the second optical path of the first optical device comprises the third optical device, the filter of the first optical device comprises one of the second and third optical devices, and the filter of at least one of the second and third optical devices comprises a straight waveguide.

21. A combination comprising:
a first optical device comprising
a splitter device configured to split an input spectrum among a plurality of output ports, and a combiner device configured to combine at least a portion of the split input spectrum into a single output port, each of the splitter and combiner devices having respective first and second input ports, respective first and second output ports, and a respective transfer matrix;
a first optical path optically coupling the first output port of the splitter device and the first input port of the combiner device;
a second optical path optically coupling the second output port of the splitter device and the second input port of the combiner device; and
an optical filter optically coupled to at least one of the first and the second optical paths,
wherein the first and second optical paths are configured to introduce, at least at a wavelength of the input spectrum, a phase shift of π radians to the optical radiation propagating through the first optical path with respect to the optical radiation propagating through the second optical path, said transfer matrix of the combiner device is a diagonal transpose of the transfer matrix of the splitter device, the splitter device is configured to split the input spectrum into the first and second optical paths such that (i) at a first wavelength of the input spectrum, a ratio of a portion of an input signal transferred to the first optical path to a portion of the input signal transferred to the second optical path is greater than 10 and (ii) at a second wavelength of the input spectrum, the ratio of the portion of the input signal transferred to the first optical path to the portion of the input signal transferred to the second optical path is less than 0.1, and a wavelength spacing between the first wavelength and the second wavelength is less than 100 nanometers, and a second optical device comprising:
a second splitter device configured to split an input spectrum among a plurality of output ports, and a second combiner device configured to combine at least a portion of the split input spectrum into a single output port, each of the second splitter and combiner devices having respective first and second input ports, respective first and second output ports, and a respective transfer matrix,
a third optical path optically coupling the first output port of the second splitter device and the first input port of the second combiner device; and
a fourth optical path optically coupling the second output port of the second splitter device and the second input port of the second combiner device, wherein the third and fourth optical paths are configured to introduce, at least at a wavelength of the input spectrum, a phase shift of π radians to the optical radiation propagating through the third optical path with respect to the optical radiation propagating through the fourth optical path, said transfer matrix of the second combiner device is the diagonal transpose of the transfer matrix of the second splitter device, the first optical device is disposed in a non-symmetric nested arrangement with the second optical device such that the third optical path of the second optical device comprises the first optical device.

22. The combination of claim 21, wherein the second splitter device comprises an optical switch having first and second states, configured so that in the first state of the optical switch, at least at a wavelength of the spectrum, a ratio of a portion of an input signal transferred from one input port of the second splitter device to the third optical path to a portion of the input signal transferred to the fourth optical path is greater than 10, and in the second state, a ratio of the portion of the input signal transferred to the third optical path to the portion of the input signal transferred to the fourth optical path is less than 0.1.

23. The combination of claim 22, wherein transmission of the second splitter device is substantially the same over an operating wavelength range of the second optical device.

24. A tunable optical device comprising:
a first and a second optical path;
an optical filter disposed in at least the first optical path;
a tunable wavelength-dependent optical splitter device for splitting input optical radiation into the first and second optical path, such that at one filter resonance, the splitter device has substantially unity transmission to the first optical path, at one or more adjacent filter resonances has substantially null transmission to the first optical path, and the splitter device is configured to split at least one wavelength channel substantially between both optical paths, the at least one wavelength channel selected from a range between the substantially-unity-transmission wavelength and the substantially-null-transmission wavelengths; and
a combiner device for combining into a single output optical path the outputs from the two optical paths,
wherein the first and second optical paths introduce a phase shift of π radians between optical radiation propagating through the first and the second optical paths.

25. The optical device of claim 24, wherein the splitter and combiner devices comprise two substantially identical devices, one of the identical devices being connected at an approximately 180 degrees rotation with respect to the other device.

* * * * *